(12) United States Patent
Reifman et al.

(10) Patent No.: US 12,518,866 B2
(45) Date of Patent: Jan. 6, 2026

(54) METHOD AND SYSTEM FOR MEASURING, PREDICTING AND OPTIMIZING HUMAN ALERTNESS

(71) Applicant: The Government of the United States, as Represented by the Secretary of the Army, Fort Detrick, MD (US)

(72) Inventors: Jaques Reifman, New Market, MD (US); Sridhar Ramakrishnan, Frederick, MD (US); Thomas J. Balkin, Silver Spring, MD (US); Francisco G. Vital-Lopez, Frederick, MD (US)

(73) Assignee: The Government of the United States, as Represented by the Secretary of the Army, Fort Detrick, MD (US)

( * ) Notice: Subject to any disclaimer, the term of this patent is extended or adjusted under 35 U.S.C. 154(b) by 1116 days.

(21) Appl. No.: 17/603,854

(22) PCT Filed: Apr. 16, 2020

(86) PCT No.: PCT/US2020/028559
§ 371 (c)(1),
(2) Date: Oct. 14, 2021

(87) PCT Pub. No.: WO2020/223033
PCT Pub. Date: Nov. 5, 2020

(65) Prior Publication Data
US 2022/0199227 A1    Jun. 23, 2022

Related U.S. Application Data

(60) Provisional application No. 62/853,147, filed on May 27, 2019, provisional application No. 62/834,822, filed on Apr. 16, 2019.

(51) Int. Cl.
*G06F 30/20* (2020.01)
*G16H 20/10* (2018.01)
(Continued)

(52) U.S. Cl.
CPC ............. *G16H 20/70* (2018.01); *G06F 30/20* (2020.01); *G16H 20/10* (2018.01); *G06F 2111/10* (2020.01)

(58) Field of Classification Search
CPC ......... G06F 30/20; G16H 20/70; G16H 20/10
(Continued)

(56) References Cited

U.S. PATENT DOCUMENTS 4,770,636 A    9/1988 Buschke
4,893,291 A    1/1990 Bick et al.
(Continued)

FOREIGN PATENT DOCUMENTS

WO    WO 88/10091 A1    12/1988
WO    WO 89/02098 A1    3/1989
(Continued)

OTHER PUBLICATIONS

Redmond et al., "Observations on the Design and Specifications of a Wrist-Worn Human Activity Monitoring System," Behavior Research Methods, Instruments, & Computers, 1985, pp. 659-669, vol. 17, Issue 6.
(Continued)

*Primary Examiner* — Andre Pierre Louis
(74) *Attorney, Agent, or Firm* — Leigh Z. Callander

(57) ABSTRACT

A system and method using a biomathetical model in conjunction with an optimization method for an individuals alertness impairment at a future time based on a known sleep schedule by adjusting the intake of caffeine over that schedule. In a further embodiment, placing constraints on the frequency, the dose amount, and/or total amount consumed
(Continued)

over the course of the future schedule. In a further embodiment, optimizing the sleep schedule (prior to or independent of caffeine optimization) to decrease the individuals alertness impairment at the future time(s). In a further embodiment, adjust both the sleep schedule and caffeine intake to decrease the individuals alertness impairment at the future time(s). In at least one embodiment, the system including a mobile based system and/or a networked computer-based system.

20 Claims, 39 Drawing Sheets

(51) Int. Cl.
    *G16H 20/70*     (2018.01)
    *G06F 111/10*     (2020.01)

(58) Field of Classification Search
    USPC .......................................................... 703/2
    See application file for complete search history.

(56) References Cited

U.S. PATENT DOCUMENTS

| | | | |
|---|---|---|---|
| 5,006,985 A | 4/1991 | Ehret et al. | |
| 5,197,489 A | 3/1993 | Conlan | |
| 5,230,346 A | 7/1993 | Leuchter | |
| 5,230,629 A | 7/1993 | Buschke | |
| 5,259,390 A | 11/1993 | MacLean | |
| 5,304,212 A | 4/1994 | Czeisler et al. | |
| 5,320,109 A | 6/1994 | Chamoun | |
| 5,348,370 A | 9/1994 | Fukuoka | |
| 5,433,223 A | 7/1995 | Moore-Ede et al. | |
| 5,566,067 A | 10/1996 | Hobson et al. | |
| 5,568,127 A | 10/1996 | Bang | |
| 5,570,698 A | 11/1996 | Liang et al. | |
| 5,573,013 A | 11/1996 | Conlan | |
| 5,585,785 A | 12/1996 | Gwin et al. | |
| 5,595,488 A | 1/1997 | Gozlan et al. | |
| 5,647,633 A | 7/1997 | Fukuoka | |
| 5,682,144 A | 10/1997 | Mannik | |
| 5,682,882 A | 11/1997 | Lieberman | |
| 5,689,241 A | 11/1997 | Clarke, Sr. et al. | |
| 5,691,693 A | 11/1997 | Kithil | |
| 5,720,294 A | 2/1998 | Skinner | |
| 5,762,072 A | 6/1998 | Conlan et al. | |
| 5,813,993 A | 9/1998 | Kaplan et al. | |
| 5,911,581 A | 6/1999 | Reynolds et al. | |
| 5,995,868 A | 11/1999 | Dorfmeister et al. | |
| 6,066,092 A | 5/2000 | Cady et al. | |
| 6,070,098 A | 5/2000 | Moore-Ede et al. | |
| 6,113,538 A | 9/2000 | Bowles et al. | |
| 6,241,686 B1 | 6/2001 | Balkin et al. | |
| 6,287,262 B1 | 9/2001 | Amano et al. | |
| 6,419,629 B1 | 7/2002 | Balkin et al. | |
| 6,527,715 B2 | 3/2003 | Balkin et al. | |
| 6,530,884 B2 | 3/2003 | Balkin et al. | |
| 6,553,252 B2 | 4/2003 | Balkin et al. | |
| 6,579,233 B2 | 6/2003 | Hursh | |
| 6,740,032 B2 | 5/2004 | Balkin et al. | |
| 6,743,167 B2 | 6/2004 | Balkin et al. | |
| 7,118,530 B2 | 10/2006 | Hursh et al. | |
| 7,619,005 B2 * | 11/2009 | Epstein ................ | A61K 31/137 514/654 |
| 7,621,871 B2 | 11/2009 | Downs, III et al. | |
| 7,766,827 B2 | 8/2010 | Balkin et al. | |
| 8,273,035 B2 | 9/2012 | Russo et al. | |
| 8,285,375 B2 | 10/2012 | Sing | |
| 8,712,827 B2 | 4/2014 | Mollicone et al. | |
| 8,781,796 B2 | 7/2014 | Mott et al. | |
| 2001/0056225 A1 | 12/2001 | DeVito | |
| 2002/0183644 A1 | 12/2002 | Levendowski et al. | |
| 2003/0018242 A1 | 1/2003 | Hursh et al. | |
| 2004/0049132 A1 | 3/2004 | Barron et al. | |
| 2005/0033122 A1 * | 2/2005 | Balkin ................... | G16H 15/00 600/300 |
| 2005/0177031 A1 | 8/2005 | Hursh | |
| 2006/0202037 A1 | 9/2006 | Gunawardena et al. | |
| 2008/0294019 A1 | 11/2008 | Tran | |
| 2009/0048540 A1 | 2/2009 | Otto et al. | |
| 2012/0191425 A1 | 7/2012 | Mott et al. | |
| 2012/0329020 A1 | 12/2012 | Mollicone et al. | |
| 2013/0018284 A1 | 1/2013 | Kahn et al. | |
| 2013/0072823 A1 | 3/2013 | Kahn et al. | |
| 2014/0149063 A1 | 5/2014 | Reifman et al. | |
| 2015/0104771 A1 | 4/2015 | Bernstein | |
| 2018/0289314 A1 * | 10/2018 | Reifman ................ | A61B 5/165 |
| 2019/0224445 A1 * | 7/2019 | Fernandes ............ | A61B 5/4809 |

FOREIGN PATENT DOCUMENTS

| | | |
|---|---|---|
| WO | WO 90/00777 A1 | 1/1990 |
| WO | WO 00/26840 A1 | 5/2000 |
| WO | WO 02/26841 A1 | 5/2000 |
| WO | WO 02/073342 A1 | 9/2002 |
| WO | WO 02/073343 A2 | 9/2002 |
| WO | 2015054134 A1 | 4/2015 |

OTHER PUBLICATIONS

Rosekind et al., "Alertness Management in Long-Haul Flight Operations," Proceedings of the 39.sup.th Annual Corporate Aviation Safety Seminar, 1994, pp. 167-178 (printed from the NASA website).

Shi et al., "Using Artificial Neural Network for Sleep/Wake Discrimination from Wrist Activity: Preliminary Results," Proceedings of the 20.sup.th Annual International Conference of the IEEE Engineering in Medicine and Biology Society, 1998, pp. 1113-1115, vol. 20, No. 3.

Sing et al., "High-Frequency EEG as Measure of Cognitive Function Capacity: A Preliminary Report," Aviation, Space and Environmental Medicine, Jul. 2005, pp. C114-C135, vol. 7, No. 7, Section II.

"Science & Technology Watch," Aviation, Space, and Environmental Medicine, Dec. 2007, p. 1178, vol. 78, No. 12.

Wesensten et al., "Reversal of Triazolam and Zolpidem-Induced Memory Impairment by Flumazenil," Psychopharmacology, 1995, Abstract, vol. 121.

Thorne et al., "Plumbing Human Performance Limits During 72 Hours of High Task Load," Proceedings of the 24th DRG Seminar on the Human as a Limiting Element in Military Systems, pp. 1-24.

Van Someren, Eus J.W., "Actigraphic Monitoring of Movement and Rest-Activity Rhythms in Aging, Alzheimer's Disease, and Parkinson's Disease," IEEE Transactions on Rehabilitation Engineering, Dec. 1997, pp. 394-398, vol. 5, No. 4.

Walsleben et al., "Sleep Habits of Long Island Rail Road Commuters," Sleep, Sep. 1999, pp. 728-734, vol. 22, No. 6.

Wesensten et al., "Performance and Alertness Effects of Caffeine, Dextroamphetamine, and Modafinil During Sleep Deprivation," Journal of Sleep Research, 2005, pp. 255-266, vol. 14.

Cambridge Neurotechnology, "The Actiwatch-Score," pre-1999.
Cambridge Neurotechnology, "The Actiwatch Software," pre-1999.
Cambridge Neurotechnology, "The Actiwatch and Actiwatch Plus," pre-1999.
Cambridge Neurotechnology, "Actiwatch from Cambridge Neurotechnology," printed from company website at http://www.camntech.co.uk/main.html, Sep. 18, 1998.

National Highway Traffic Safety Administration, "Drowsy Driving and Automobile Crashes", NCSDR/HTSA Expert Panel on Driver Fatigue and Sleepiness (DOT HS 808 707), Apr. 1998, pp. 1-30.

The Center for National Truck Statistics, "Truck and Bus Accident Factbook 1994," Oct. 1996, pp. 1-103.

WCBS, "Exclusive: Nuclear Plant Guards Asleep on the Job. Exelon to Terminate Deal with Security Firm also under Contract with Major Federal Agencies," WCBSTV.com, Sep. 25, 2007, printout http://wcbstv.com/politics/peach.bottom.nuclear.2.291442.html.

(56) References Cited

OTHER PUBLICATIONS

"AASM Publishes New Scoring Manual," Sleep Review, Apr. 18, 2007, printed from http://www.sleepreviewmag.com/sleep-report/2007-04-18-01.asp.
U.S. Patent and Trademark Office, International Search Report for Application No. PCT/US2020/028559, Jan. 12, 2021, pp. 1-4.
U.S. Patent and Trademark Office, Written Opinion for Application No. PCT/US2020/028559, Jan. 12, 2021, pp. 1-9.
U.S. Patent and Trademark Office, International Search Report, PCT/US2016/036532, Sep. 27, 2016.
U.S. Patent and Trademark Office, Written Opinion, PCT/US2016/036352, Sep. 27, 2016.
Avinash et al., "Parameter Estimation for a Biomathematical Model of Psychomotor Vigilance Performance Under Laboratory Conditions of Chronic Sleep Restriction," NSWO 16, 2005, Jan. 2005, pp. 39-42.
Biotechnology HPC Software Applications Institute (BHSAI), "2B-Alert Smartphone App," www.tartc.org, May 8, 2015, p. 1.
Rajdev et al., "A Unified Mathematical Model to Quantify Performance Impairment for Both Chronic Sleep Restriction and Total Sleep Deprivation," Journal of Theoretical Biology, vol. 331, Apr. 23, 2013, Elsevier Ltd., U.S., pp. 66-77.
Ramakrishnann et al., "A Biomathematical Model of the Restoring Effects of Caffeine on Cognitive Performance During Sleep Deprivation," Journal of Theoretical Biology, vol. 319, Nov. 23, 2012, Elsevier Ltd., U.S., pp. 22-33.
Ramakrishnan et al., "Dose-Dependent Model of Caffeine Effects on Human Vigilance During Total Sleep Deprivation," Journal of Theoretical Biology, vol. 358, May 20, 2014, Elsevier Ltd., U.S., pp. 11-24.
Ramakrishnann et al., "Modeling Individual Differences During Sleep Loss: Can a Mathematical Model Predict an Individual's Trait-Like Response to Both Total and Partial Sleep Loss?," Journal of Sleep Research, vol. 24, Jun. 2015, European Sleep Research Society, pp. 262-269.
Skeldon et al., "Mathematical Models for Sleep-Wake Dynamics: Comparison of the Two-Process Model and a Mutual Inhibition Neuronal Model," PLoS ONE, vol. 9, Issue 8, Aug. 2014, pp. 1-16.
Akerstedt et al., "Subjective and Objective Sleepiness in the Active Individual," International Journal of Neuroscience, 1990, pp. 29-37, vol. 52.
Akerstedt et al., "The Three-Process Model of Alertness and Its Extension to Performance, Sleep Latency, and Sleep Length," Chronobiology International, 1997, pp. 115-123, vol. 14, No. 2.
Anderer et al., "An E-Health Solution for Automatic Sleep Classification According to Rechtschaffen and Kales: Validation Study of the Somnolyzer 24x7 Utilizing the Siesta Database," Neuropsychobiology, Apr. 18, 2005, pp. 115-133, vol. 51.
Angus et al., "Effects of Sleep Loss on Sustained Cognitive Performance During a Command and Control Stimulation," Behavior Research Methods, Instruments, & Computers, 1985, pp. 55-67, vol. 17, No. 1.
Balkin et al., "Comparison of the Daytime Sleep and Performance Effects of Zolpidem Versus Triazolam," Psychopharmacology, 1992, Abstract, pp. 83-88, vol. 107.
Beersma, Domien G.M., "Models of Human Sleep Regulation," Sleep Medicine Reviews, 1998, pp. 31-43, vol. 2, No. 1.
Belenky et al., "Patterns of Performance Degradation and Restoration During Sleep Restriction and Subsequent Recovery: A Sleep Dose-Response Study," European Sleep Research Society, J. Sleep Res., 2003, pp. 1-12, vol. 12.
Belenky, Gregory, "Sleep, Sleep Deprivation, and Human Performance in Continuous Operations," 1997, Walter Reed Army Institute of Research, United State Army Medical Research and Materiel Command, pp. 1-12.
Belenky et al., "Sustaining Performance During Continuous Operations: The U.S. Army's Sleep Management System," Proceedings of the Army Science Conference, 1996, pp. 1-5.

Bonnet, M.H., "Sleep Restoration as a Function of Periodic Awakening, Movement, or Electroencephalographic Change," Sleep, 1987, pp. 364-373, vol. 10, No. 4.
Boot, Max, "The New American Way of War," Foreign Affairs, Jul./Aug. 2003, available at https://www.foreignaffairs.com/articles/united-states/2003-07-01/new-american-way-war, pp. 1-13.
Braver et al., "Long Hours and Fatigue: A Survey of Tractor-Trailer Drives," Journal of Health Policy, 1992 Autumn, Abstract, vol. 13 (3).
Colburn et al., "An Ambulatory Activity Monitor with Solid State Memory," paper presented at the 13.sup.th Annual Rocky Mountain Bioengineering Symposium and 13.sup.th International ISA BioMedical Sciences Instrumentation Symposium (Instrument Society of America), May 3-5, 1976, pp. 117-122.
Cole et al., "Automatic Sleep/Wake Identification from Wrist Activity," Sleep, 1992, pp. 461-469, vol. 15, No. 5.
Dawson et al., "A Quantitative Model of Work-Related Fatigue: Background and Definition," Ergonomics, Feb. 10, 2001, pp. 144-163, vol. 44, No. 2.
Dijk et al., "Paradoxical Timing of the Circadian Rhythm of Sleep Propensity Serves to Consolidate Sleep and Wakefulness in Humans," Neuroscience Letters, pp. 63-68, vol. 166, No. 1.
Dinges et al., "Cumulative Sleepiness, Mood Disturbance, and Psychomotor Vigilance Performance Decrements During a Week of Sleep Restricted to 4-5 Hours per Night," Sleep, 1997, pp. 267-277, vol. 20, No. 4.
Dinges et al., "Principles and Guidelines for Duty and Rest Scheduling in Commercial Aviation," NASA Technical Memorandum 110404, May 1996, pp. 1-10.
Edgar et al., "Effect of SCN Lesions on Sleep in Squirrel Monkeys: Evidence for Opponent Processes in Sleep-Wake Regulation," Journal of Neuroscience, Mar. 1993, pp. 1065-1079, vol. 13, No. 3.
Fischler, Benjamin, "Review of Clinical and Psychobiological Dimensions of the Chronic Fatigue Syndrome: Differentiation from Depression and Contribution of Sleep Dysfunctions," Sleep Medicine Reviews, 1999, pp. 131-146, vol. 3, No. 2.
Fletcher et al., "A Predicative Model of Work-related Fatigue Based on Hours of Work," Journal of Occupational Safety, 1997, pp. 471-485, vol. 13, No. 5.
Goldstein, Harry, "Resetting the Circadian Clock," The Pennsylvania Gazette, May 1999, available at http://www.upenn.edu/gazette/0599/goldstein.html, pp. 1-7.
Hendy et al., "Combining Time and Intensity Effects in Assessing Operator Information-Processing Load," Human Factors, 1997, pp. 30-47, vol. 39, No. 1.
Herridge, Catherine, "Pilot, 1st Officer Slept While Approaching Denver, Lawmaker Says," Fox News, Nov. 1, 2007, available at http:www.foxnews.com/story/0,2933,307019,00.html, pp. 1-3.
Hockey, G. Robert J., "Compensatory Control in the Regulation of Human Performance Under Stress and High Workload: A Cognitive-Energetical Framework," Biological Psychology, 1997, pp. 73-93, vol. 45.
Hoddes et al., "Quantification of Sleepiness: A New Approach," Pyschophysiology, Jul. 1973, pp. 431-436, vol. 10, No. 4.
Horne, James A., "Human Sleep, Sleep Loss and Behavior. Implications for the Prefrontal Cortex and Psychiatric Disorder," Br. J. Psychiatry, Mar. 1993, Abstract, pp. 413-419, vol. 162.
Horne, James A., "Sleep Loss and 'Divergent' Thinking Ability," Sleep, 1988, pp. 528-536, vol. 11, No. 6.
Johns, Murray, "Daytime Sleepiness, Snoring, and Obstructive Sleep Apnea: The Epworth Sleepiness Scale," Chest, Jan. 1993, pp. 30-36, vol. 103, No. 1.
Johns, Murray, "Rethinking the Assessment of Sleepiness," Sleep Medicine Reviews, 1998, pp. 3-15, vol. 2, No. 1.
Kaplan, R.F., "An Innovative EEG Based Approach to Drowsiness Detection," Department of Systems and Control Engineering, Case Western Reserve University, May 1996, pp. 1-242.
Knipling et al., "Crashes and Fatalities Related to Driver Drowsiness/Fatigue," U.S. Department of Transportation, Research Note, Nov. 1994, pp. 1-8.
Kripke et al., "Wrist Actigraph Measures of Sleep and Rhythms," Electoencephalography and Clinical Neurophysiology, 1978, pp. 674-676, vol. 44.

(56) References Cited

OTHER PUBLICATIONS

Lawlor, Maryann, "Personal Physiological Monitors Find Warfighter-Effectiveness Edge," Signal, Aug. 2000, pp. 47-50, vol. 54, No. 12.

Lubin et al., "Effects of Exercise, Bedrest and Napping on Performance Decrement During 40 Hours," Psychophysiology, pp. 334-339, Jul. 1976, vol. 13, No. 4.

McNally et al., SAIC Contract No. MDA903-88-D-1000: Evaluation of Sleep Discipline in Sustaining Unit Performance, Oct. 1989, pp. 1-35, Mclean, VA: Science Applications International Corporation.

Mitler et al., "Methods of Testing for Sleepiness," Behavioral Medicine, 1996, pp. 171-183, vol. 21.

Monk et al., "A Parallelism between Human Body Temperature and Performance Independent of the Endogenous Circadian Pacemaker," Journal of Biological Rhythms, Apr. 1998, pp. 113-122, vol. 13, No. 2.

Newhouse et al., "Stimulant Drug Effects on Performance and Behavior After Prolonged Sleep Deprivation: A Comparison of Amphetamine, Nicotine, and Deprenyl," Military Psychology, 1992, pp. 207-233, vol. 4.

Newhouse et al., "The Effects of d-Amphetamine on Arousal, Cognition, and Mood After Prolonged Total Sleep Deprivation," Neuropsychopharmacology, 1989, Abstract, vol. 2, No. 2.

O'Neill, Timothy R., "Effects of Operating Practices on Commercial Driver Alertness" United States Office of Motor Carrier and Highway Safety, Trucking Research Institute, 1999, pp. 1-118.

Penetar et al., "Amphetamine Effects on Recovery Sleep Following Total Sleep Deprivation," Human Psychopharmacology, 1991, pp. 319-323, vol. 6.

Penetar et al., "Caffeine Reversal of Sleep Deprivation Effects on Alertness and Mood," Psychopharmacology, 1993, Abstract, pp. 359-365, vol. 112.

Penetar et al., "Effects of Caffeine on Cognitive Performance, Mood, and Alertness in Sleep-Deprived Humans," In B.M. Marriot (Ed.), Food Components to Enhance Performance, National Academy Press, Washington, DC, pp. 407-431.

Petz et al., "Studies of Psychophysiological and Temporal Conditions of Work," Archives of Industrial Hygiene and Toxicology, Dec. 1999, pp. 405-421, vol. 50, No. 4.

Priest, Dana, "War and Sleep," The Washington Post Magazine, Nov. 19, 2000, pp. 16-20, 26-28.

Proctor et al., "Effect of overtime work of cognitive function in automotive workers," Scandinavian Journal of Work, Environment & Health, Apr. 1996, pp. 124-132, vol. 22, No. 2.

Ray et al., "Coping and Other Predictors of Outcome in Chronic Fatigue Syndrome: A 1-Year Follow-Up," Journal of Psychosomatic Research, Oct. 1997, Abstract, pp. 405-415, vol. 43, No. 4.

Rechstschaffen et al., "A Manual of Standardized Technology, Techniques and Scoring System for Sleep Stages of Human Subjects," U.S. Department of Health, Education, and Welfare, Public Health Service—National Institutes of Health, 1968 (reprinted 1971), pp. 1-58.

* cited by examiner

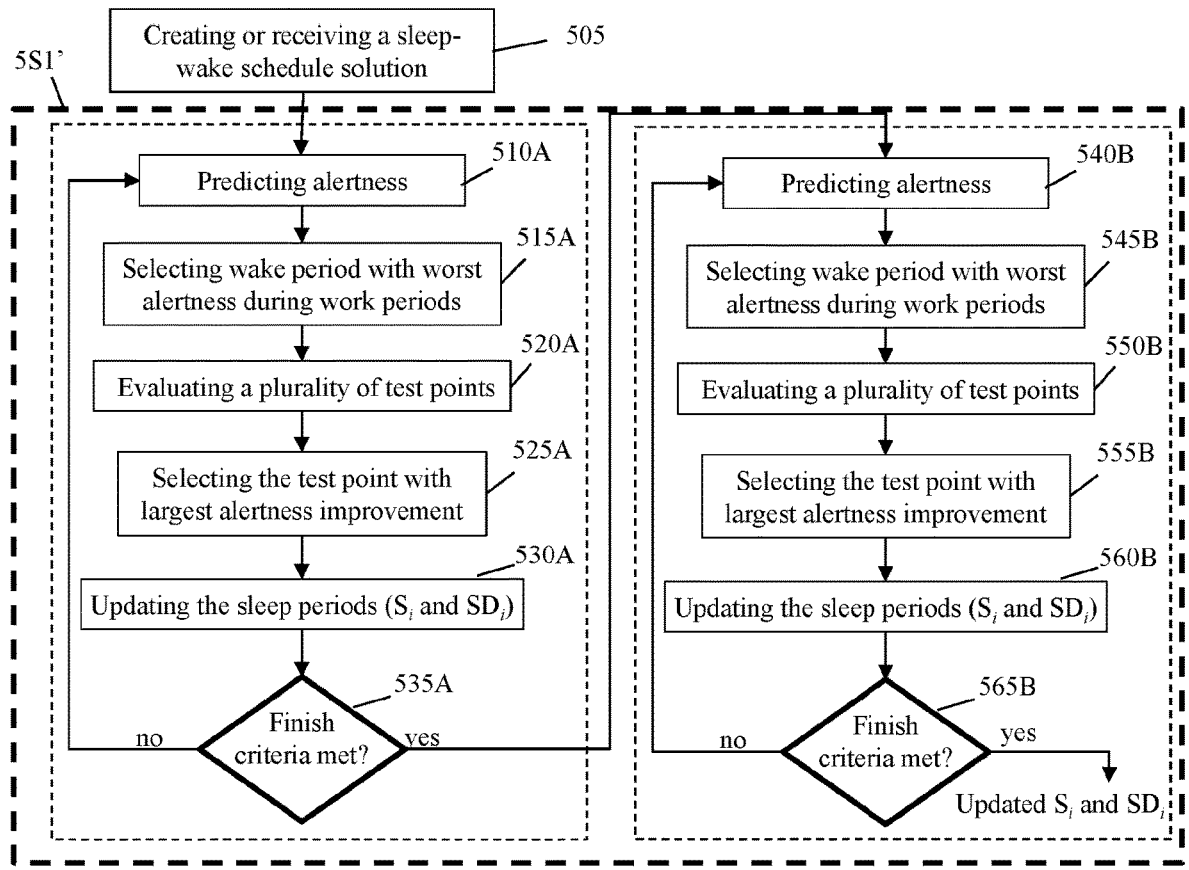
FIG. 5D
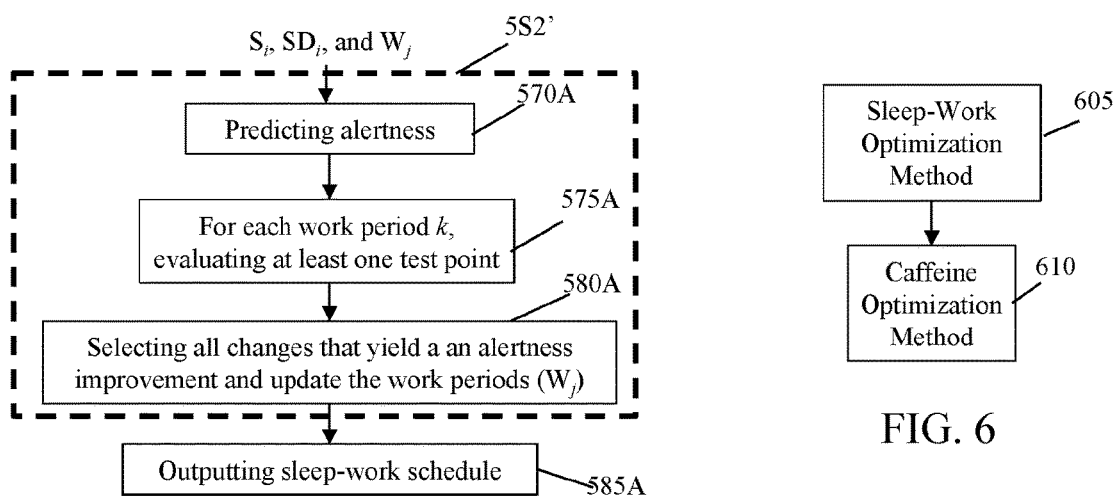
FIG. 5E
FIG. 6

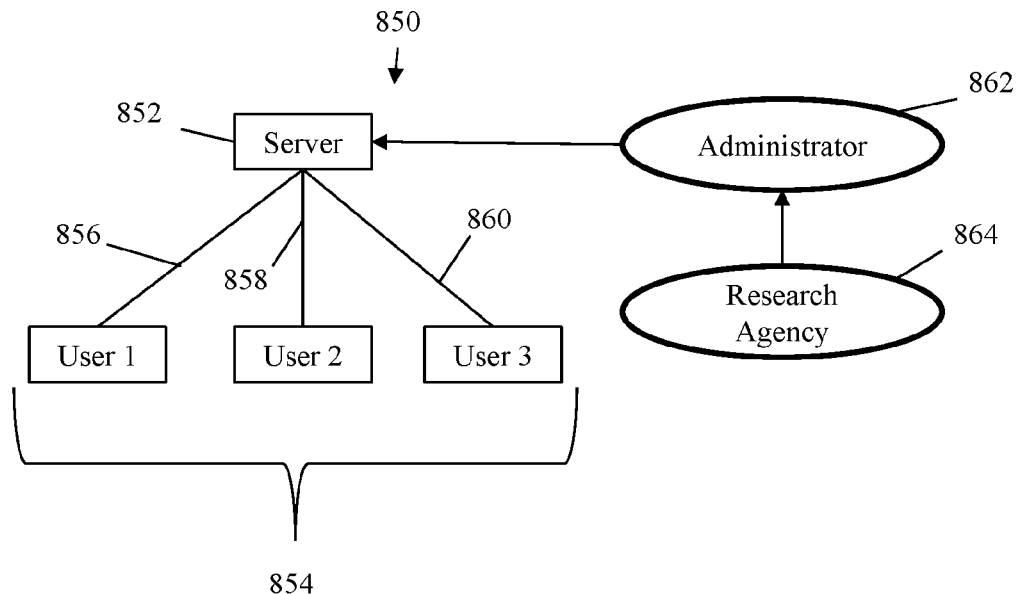
FIG. 8B
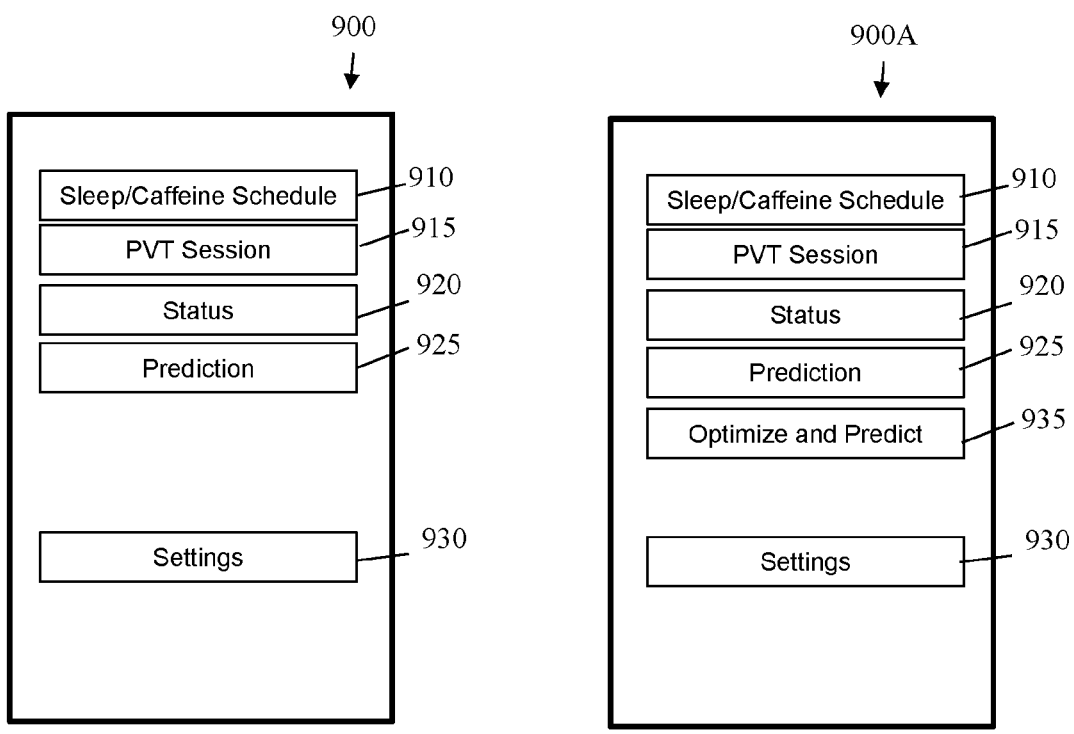
FIG. 9A
FIG. 9B

FIG. 11C

Schedule — 1130
OVERVIEW | SLEEP | CAFFEINE — 1140

Schedule
OVERVIEW | SLEEP | CAFFEINE | PEAK ALERTNESS 0  2  4  6  8  10  12  14  16  18  20  24

- SAT Apr. 20 — 1165
- FRI Apr. 19 — 8h 0m — 1150
- THU Apr. 18 — 8h 0m
- WED Apr. 17 — 8h 0m — 1165
- TUE Apr. 16 — 8h 0m
- MON Apr. 15 — 8h 0m
- SUN Apr. 14
- SAT Apr. 13
- FRI Apr. 12 — 10h 0m

FIG. 11E

Schedule — 1120 — 1140
OVERVIEW | SLEEP | CAFFEINE | PEAK ALERTNESS

1110:
- 8 hours — 4/18/19 @ 11:00 PM
- 8 hours — 4/17/19 @ 11:00 PM
- 8 hours — 4/16/19 @ 11:00 PM
- 8 hours — 4/15/19 @ 11:00 PM
- 8 hours — 4/14/19 @ 11:00 PM
- 10 hours — 4/11/19 @ 9:00 PM

FIG. 12A

Schedule — 1130
Sleep — 1120 | Caffeine — 1140

1240:
- Chewing Gum (100mg) — 2015/03/22 @ 12:00 PM
- Chewing Gum (100mg) — 2015/03/28 @ 3:00 AM
- Chewing Gum (100mg) — 2015/03/28 @ 5:00 AM
- Chewing Gum (100mg) — 2015/03/28 @ 7:00 AM

FIG. 20

| New caffeine event | |
|---|---|
| ✗ Cancel | ✓ Save |
| Day | |
| 05/02/2015 | |
| Time | |

Caffeine amount
- 8 oz ●
- 12 oz ○
- 16 oz ○
- Cancel

| Product (Caffeine Strength) |
|---|
| Weak coffee (Medium) |
| Strong coffee (High) |
| Espresso (High) |
| Tea (Low) |
| Soft drink (Low) |
| Red Bull (Low) |
| 5-hour ENERGY (High) |
| Military Energy Gum (Medium) |
| Monster Energy (Medium/High) |
| Rockstar (Medium/High) |
| Amp Energy (Low) |
| Raw dose in mg |

FIG. 22A

| Session |
|---|
| Model |
| Practice — Do not save this session ☐ |
| Reset — Ignore all previous sessions and re-train the model from scratch ☐ |
| Schedule |
| Update schedule |
| Begin |
| Begin session |

2210 → Practice
2220 → Reset
2230 → Update schedule
2240 → Begin session

*Schedule:* Optimal caffeine solution for 36 h of TSD

| Sleep | | | | Peak Alertness | | | | Caffeine | | |
|---|---|---|---|---|---|---|---|---|---|---|
| Start | | End | | Start | | End | | | | |
| Day | Time | Day | Time | Day | Time | Day | Time | Day | Time | Dose (mg) |
| 0 | 23:00 | 1 | 07:00 | 2 | 00:00 | 2 | 14:00 | 2 | 01:00 | 100 |
| 2 | 19:00 | 3 | 03:00 | | | | | 2 | 03:00 | 200 |
| | | | | | | | | 2 | 05:00 | 200 |
| | | | | | | | | 2 | 07:00 | 100 |
| | | | | | | | | 2 | 09:00 | 200 |

METHOD AND SYSTEM FOR MEASURING, PREDICTING AND OPTIMIZING HUMAN ALERTNESS

This patent application is a national stage application from PCT App. No. PCT/US2020/028559, filed on Apr. 16, 2020, which claims priority to U.S. Pat. App. No. 62/834,822 filed on Apr. 16, 2019 and U.S. Pat. App. No. 62/853,147 filed on May 27, 2019, which are all hereby incorporated by reference.

I. FIELD OF THE INVENTION

At least one embodiment of this invention is intended to optimize human cognitive performance and alertness. In at least one embodiment, the system includes a portable computing device, such as a smartphone, and software that allows users to measure their current level of cognitive performance and/or alertness based on alertness impairment, in a further embodiment, to make predictions about their future cognitive performance (using predicted alertness impairment as representative of cognitive performance), and, in a still further embodiment, to provide an optimized caffeine consumption and/or sleep-wake schedule to optimize alertness (or minimize alertness impairment) for a desired period(s) such as a work period or non-work period. In at least one embodiment, the cognitive performance and/or alertness is determined using a model with or without individualized parameters. In at least one embodiment, the model uses a sleep latency and/or sleep duration model with or without the above-mentioned embodiments. In at least one embodiment, the system includes a plurality of portable computing devices and at least one server that is configured to communicate with portable computing devices continually and/or intermittently.

II. BACKGROUND OF THE INVENTION

Irregular work-rest schedules often result in poor sleep hygiene and, consequently, cognitive performance impairments similar to those caused by consuming 3 or 4 alcoholic drinks Individuals in certain occupations, such as healthcare workers, first responders, pilots, safety and security officers, and military members engaged in operations, are often on irregular work schedules that preclude them from obtaining adequate sleep. This leads to poor sleep hygiene, which is reflected in increased sleepiness and impaired measures of cognitive performance, including deficits in alertness and sustained attention (Akerstedt, 1988). For example, medical residents on a heavy call rotation (~80 hours per week, including a shift of ~35 consecutive hours) undergo alertness impairments similar to those induced by a blood alcohol concentration of 0.05% (Arnedt et al., 2005), which causes marked deterioration of driving skills (Council on Scientific Affairs of the American Medical Association, 1986). Poor sleep hygiene is also exacerbated by practical and social factors, as well as by sleep periods that occur at times of day when circadian rhythms make it difficult to sleep. For instance, after being awake for 24 hours, an individual might expect to recover by sleeping for 8 hours. However, if the sleep period were to start at around 0700, the individual may remain asleep for only about 4.5 hours (Akerstedt and Gillberg, 1981) and the recovery would be truncated. Therefore, planning effective sleep schedules that improve sleep hygiene requires knowing whether the schedule is physiologically favorable and feasible—that is, whether an individual can actually fall asleep at the proposed time and stay asleep for the desired duration, given their recent sleep history and time of day.

To address these questions, a few computational models have been previously proposed. In a seminal study, Borbely (1982) proposed the two-process model, which postulates that sleep is regulated by 1) a homeostatic process S that depends on sleep history and 2) a sleep-independent circadian process C. Process S is assumed to continuously increase while an individual is awake, leading to a monotonic increase in sleepiness. During subsequent sleep, process S monotonically decreases, resulting in full restoration when the individual follows a regular schedule. The level of sleepiness is also non-monotonically modulated by process C, depending on the time of day, where its effects become evident when an individual transitions from feeling drowsy in the afternoon to feeling refreshed in the evening. In subsequent work based on the two-process model, Borbely et al. (1989) proposed a theoretical modeling framework to predict how long it takes an individual to fall asleep (i.e., sleep latency). It was hypothesized that sleep latency was proportional to the difference between the homeostatic process S and an upper threshold H that accounted for circadian variation. They proposed a sinusoidal function to represent H and chose its amplitude and skewness so that the simulated sleep latencies qualitatively agreed with the temporal pattern observed during sleep deprivation: relatively long sleep latencies during the regular waking period followed by a steep reduction to short sleep latencies during sleep deprivation (Akerstedt and Gillberg, 1981). However, they did not estimate the parameters of H to quantitatively predict sleep latency. Subsequently, Akerstedt and Folkard (1995) proposed a model of alertness regulation that linked the combined levels of processes S and C to a subjective measure of alertness and, based on experimental observations, extended the model to predict sleep latency as an exponential function of the predicted alertness (Akerstedt and Folkard, 1996). The authors used experimental data from 2 laboratory studies to estimate the parameters of the sleep-latency model and showed that the model correctly predicted sleep latencies in 1 laboratory study and 2 field studies, including 23 distinct time points from 44 subjects.

The aforementioned two-process model of Borbely (1982) also offers a theoretical framework to predict how long an individual can remain asleep (i.e., sleep duration) as a function of the time of day and sleep history. In this model, sleep was assumed to cease when the homeostatic process S decreased below a lower threshold L that accounted for circadian variation. Borbely (1982) showed that the model could be fitted to account for the variation in sleep duration as a function of the sleep onset time in a laboratory study, in which bedtime was delayed over a 24-hour period from the regular time (at 2300) in 4-hour increments to 2300 the next day (Akerstedt and Gillberg, 1981). However, the model was not validated using data from independent studies. Inspired by Borbély's work, Akerstedt and Folkard (1996) extended their sleep-latency model to predict sleep duration as well, by assuming that sleep terminated spontaneously when the level of process S, as predicted by their model of alertness regulation (Akerstedt and Folkard, 1995), reached an upper threshold that accounted for circadian variation. It was estimated that the parameters of the model using data from 2 laboratory studies, and validated the model by comparing its predictions of sleep duration with experimental measurements from 3 studies, including 5 distinct time points from 36 subjects (Akerstedt and Folkard, 1996).

Cognitive performance decrement due to sleep loss is recognized as a threat to safety and productivity in both civilian and military settings, prompting the investigation of pharmacological countermeasures against the adverse effects of reduced sleep on cognitive performance (Balkin et al., 2004; Caldwell and Caldwell, 2005). Among the various pharmacological sleep and fatigue countermeasures available, caffeine is the most widely used stimulant drug in both occupational and non-occupational settings. Results of numerous laboratory and field studies in which caffeine was administered as either a single or repeated dose have demonstrated that, when used at appropriate doses, caffeine can restore or maintain performance in sleep-deprived individuals, with minimal side effects (Bonnet et al., 2005).

The pharmacokinetics (PK) of caffeine and its dose-dependent metabolism in humans have been well characterized (Denaro et al., 1990) and the mechanism of action (antagonism of adenosine receptors) is also well-understood (Bertorelli et al., 1996). However, only very few attempts have been made to quantify or model the performance-enhancing effects of caffeine in humans and the inventors know of no developed practical systems or applications for enhancing cognitive performance in the face of sleep deprivation using biomathematical models.

Substantial inter-individual variability exists with regard to response to sleep loss and is known to be trait-like (S. Ramakrishnan et al. 2015). This trait-like variability preferably is accounted for when modeling the effects of sleep loss and caffeine dosing in order to be effective in assessing and predicting the current and future states of a particular subject.

Computational tools have been increasingly used across a range of public and commercial sectors (e.g., aviation, mining, and nuclear power plant operations) as components of fatigue risk management systems aimed at optimizing duty-time alertness and thereby minimizing fatigue-related errors and accidents. These tools are based on biomathematical models that predict daily variations in neurobehavioral performance as a function of sleep/wake amounts and time of day. Such tools are particularly beneficial in industries that are engaged in 24-hour operations and require shift-work schedules. However, to date, there are no open-access tools available, and none of the commercially available tools contain biomathematical models that also predict the performance-improving effects of caffeine.

III. SUMMARY OF THE INVENTION

A system, a method and an apparatus in at least one embodiment includes a biomathetical model for optimizing cognitive performance in the face of sleep deprivation that integrates biomathematical models for quantifying performance impairment for both chronic sleep restriction and total sleep deprivation; the dose-dependent effects of caffeine on human vigilance; and the pheonotypical response of a particular user to caffeine dosing, chronic sleep restriction and total sleep deprivation in user-friendly software application which itself may be part of a networked system.

In at least one embodiment, the system includes a portable computing device, such as a smartphone, and software that allows users to measure their current level of cognitive performance and alertness, and make predictions about their future cognitive performance to optimize alertness during desired time periods. The predictions can represent the alertness level of an "average" individual or can be customized, via an artificial intelligence (AI) algorithm, to represent the alertness of the user. Such predictions are based on the user's prior sleep history and caffeine consumption, which in at least one embodiment are provided by the user via a graphical interface. Sleep history can also be provided directly by a physiological-monitoring device, such as a Fitbit, via wireless Bluetooth technology or other wireless technologies. For customized predictions via the AI algorithm in at least one embodiment, users measure their cognitive performance and alertness multiple times over a period of days. In one scenario, the testing could be 4 or 5 times a day for about one week although other schedules are also possible as discussed in this disclosure. This allows the system to "learn" how changes in the user's sleep patterns and caffeine consumption affect the user's cognitive performance and alertness levels. In at least one embodiment, predictions of performance of an "average" individual, there is no need to measure cognitive performance of the user.

In at least one embodiment, users are also able to explore how future actions, such as naps, sleep/wake schedules, and timing and dosing of caffeine, would affect their future performance and alertness levels, thus allowing users to reach cognitive performance peaks and prolonged peak performance at the desired times. In another embodiment, the system provides an optimized schedule for sleep, work, and/or caffeine consumption.

In at least one embodiment, a score for a solution for future sleep-wake periods having a plurality of caffeine doses is based on cognitive performance terms and a penalty term in a solution model that uses an output of an alertness model. In at least one embodiment, the solution model score is based on the following equation:

$$\min_{t_i, D_i} Z = 50 \frac{AUC_C(t_i, D_i)}{AUC_{NC}} + 50 \frac{WP_C(t_i, D_i)}{WP_{NC}} + 250 \max\{C(t_i, D_i) - C_{max}, 0\} \quad (S1)$$

where $t_i$ represents the time into the solution for these $D_i$, i represents the number of the caffeine dose, $C(t_i, D_i)$ denotes the level of caffeine in the blood, the subscripts C and NC denote caffeine and no caffeine, $C_{max}$ denotes the maximum caffeine level achieved by a single does, AUC is an area under the alertness model-predicted psychomotor vigilance task (PVT) mean response time (RT) curve produced by an alertness model above a baseline, and WP is a difference between a peak of the mean RT curve produced by the alertness model and the baseline. In a further embodiment, the weights assigned to the cognitive performance terms are adjustable or set at different ratios. In a further embodiment, the penalty term is omitted.

In at least one embodiment, a method for optimizing a sleep-work schedule for an individual includes creating, receiving or retrieving an initial sleep-wake schedule and/or constraints; predicting a series of alertness impairments for the sleep-work schedule; selecting a wake period having the largest alertness impairment during a work period of said wake period; evaluating a plurality of test points using the selected wake period as a reference point; selecting the test point having the largest alertness impairment improvement for the selected wake period; updating the sleep-wake schedule using the selected test point; repeating the above steps beginning with predicting when neither a predetermined number of iterations has been reached nor no more wake periods remain; and outputting sleep-wake schedule. In a further embodiment to the previous embodiment, the method after repeating and before outputting further includes: predicting a series of alertness impairments for the sleep-work schedule; selecting a wake period having the largest alertness impairment during a non-work period of said wake period; evaluating a plurality of test points using the selected wake period as a reference point; selecting the test point having the largest alertness impairment improvement for the selected wake period; updating the sleep-wake schedule using the selected test point; and repeating the above steps beginning with predicting when neither a predetermined number of iterations has been reached nor no more wake periods remain. In a further embodiment to the previous two embodiments, the method before outputting further includes: predicting a new series of alertness impairments for the sleep-wake schedule; and for each work period, evaluating a plurality of test points and selecting the test point that decreases the alertness impairment level for the work period the most.

In at least one embodiment, an alertness impairment model that predicts alertness impairment $[P_c(t)]$ includes $$P_c(t)=(S(t)+\kappa C(t))^* g_{PD}(t,c) \tag{S2}$$

where C and S denote the circadian and homeostatic processes of the two-process model at time t, respectively, and κ represents the circadian amplitude. The $g_{PD}$ denotes the caffeine effect based at least on time and consumption, which may be omitted in one or more embodiments. In a further embodiment to the previous method embodiments, the method further includes providing future alertness impairment, for example by using 1) a sleep history provided by the user, 2) a projected sleep history based on recent sleeping patterns such that an average bedtime and an average wake time are used to determine when sleep will occur, 3) assumption that no sleep will occur between a current time and the time for the future cognitive level, and/or 4) an optimized sleep-work/wake schedule.

In at least one embodiment, a computer program product for optimizing the time and amount of caffeine consumption for a future wake-sleep schedule for an individual, said computer program product including: a computer readable storage medium having stored thereon: first program instructions executable by a device to cause the device to obtain a solution for a sleep-wake schedule having a plurality of caffeine doses; second program instructions executable by a device to cause the device to divide the sleep-wake schedule into epochs between caffeine doses and/or sleep periods; third program instructions executable by a device to cause the device to determine a score for each epoch based on a solution model that uses an alertness model output; fourth program instructions executable by a device to cause the device to select the epoch having the largest score; fifth program instructions executable by a device to cause the device to, when a sum of any cognitive performance terms in the solution model is larger than a penalty term in the solution model, evaluating a plurality of test points to reduce the performance impairment for the selected epoch by producing a series of scores for that epoch, otherwise evaluating a plurality of test points to reduce a total caffeine consumption level over the selected epoch by producing a series of scores for that epoch where each test point produces one score for the selected epoch; sixth program instructions executable by a device to cause the device to select the test point with the smallest score for the selected epoch for the solution; and seventh program instructions executable by a device to cause the device to repeat the above steps when neither a predetermined number of iterations has been reached nor no more mathematical feasible solutions are left, and wherein if the test point falls within a sleep period, the test point is relocated until after the sleep period is complete. In a further embodiment, obtaining includes receiving the solution from a user directly or through a storage device, creating the solution based on stored information and/or received information from the user, or a sleep optimization method.

In at least one embodiment, a computer program product for optimizing the sleep-wake schedule for an individual, said computer program product including: a computer readable storage medium having stored thereon: first program instructions executable by a device to cause the device to create, receive or retrieve an initial sleep-wake schedule and/or constraints; second program instructions executable by a device to cause the device to predict a series of alertness impairments for the sleep-work schedule; third program instructions executable by a device to cause the device to select a wake period having the largest alertness impairment during a work period of said wake period; fourth program instructions executable by a device to cause the device to evaluate a plurality of test points using the selected wake period as a reference point; fifth program instructions executable by a device to cause the device to select the test point having the largest alertness impairment improvement for the selected wake period; sixth program instructions executable by a device to cause the device to update the sleep-wake schedule using the selected test point; seventh program instructions executable by a device to cause the device to repeat the above steps beginning with predicting when neither a predetermined number of iterations has been reached nor no more wake periods remain; and ninth program instructions executable by a device to cause the device to display sleep-wake schedule. In a further embodiment, the computer readable storage medium further having stored thereon program instructions for execution before the ninth program instructions: tenth program instructions executable by a device to cause the device to predict a series of alertness impairments for the sleep-work schedule; eleventh program instructions executable by a device to cause the device to select a wake period having the largest alertness impairment during a non-work period of said wake period; twelfth program instructions executable by a device to cause the device to evaluate a plurality of test points using the selected wake period as a reference point; thirteenth program instructions executable by a device to cause the device to select the test point having the largest alertness impairment improvement for the selected wake period; fourteenth program instructions executable by a device to cause the device to update the sleep-wake schedule using the selected test point; and fifteenth program instructions executable by a device to cause the device to repeat the above steps beginning with tenth program instructions when neither a predetermined number of iterations has been reached nor no more wake periods remain. In a further embodiment the computer readable storage medium further having stored thereon program instructions for execution before the ninth program instructions: sixteenth program instructions executable by a device to cause the device to predict a new series of alertness impairments for the sleep-wake schedule; and seventeenth program instructions executable by a device to cause the device to for each work period, evaluating a plurality of test points and selecting the test point that decreases the alertness impairment level for the work period the most.

The various features of novelty that characterize at least one embodiment are pointed out with particularity in the claims annexed to and forming a part of this disclosure. For a better understanding of the invention, operating advantages and specific objects attained by use of at least one embodiment, reference is made to the accompanying drawings and descriptive matter in which a preferred embodiment of the invention is illustrated.

IV. BRIEF DESCRIPTION OF THE DRAWINGS

FIGS. 5D and 5E illustrate an alternative sleep-work schedule optimization method embodiment according to the invention.

FIG. 6 illustrates a combination optimization method according to at least one embodiment of the invention.

FIG. 8B illustrates a block diagram regarding another system embodiment according to the invention.

FIGS. 9A and 9B illustrate examples of home-page graphical user interface displays according to at least two embodiments.

FIGS. 11A-11C illustrate graphical user interface displays providing a user sleep log.

FIGS. 11D and 11E illustrate alternative graphical user interface displays providing user sleep logs. FIG. 11D displays a peak alertness period as a dashed white line.

Figure 12B:
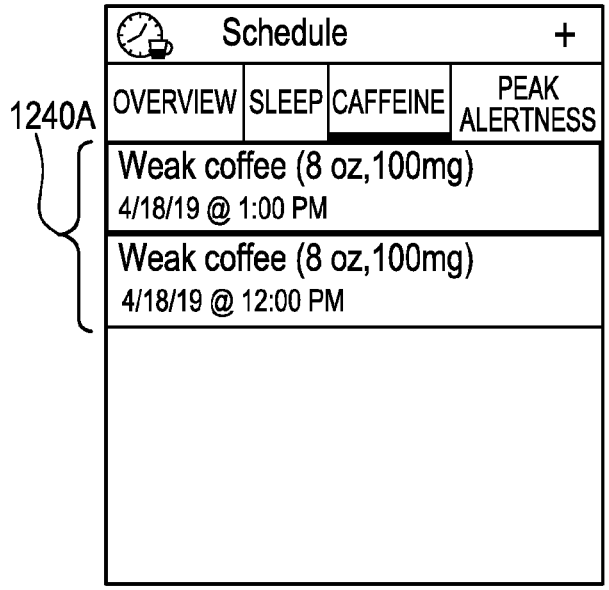
Figure 12C:
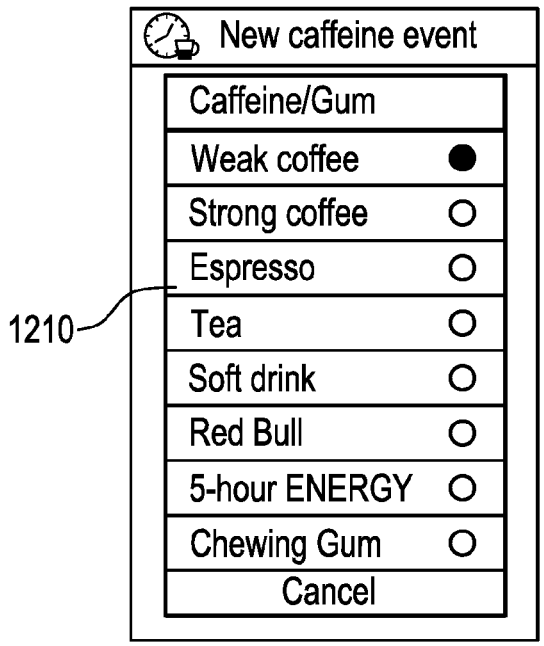

FIG. 12A illustrates a graphical user interface display showing a user's caffeine consumption. FIG. 12B illustrates an alternative graphical user interface display showing a user's caffeine consumption. FIG. 12C illustrates a graphical user interface display showing how caffeine consumption might be logged into the system according to at least one embodiment of the invention.

Figure 13A:
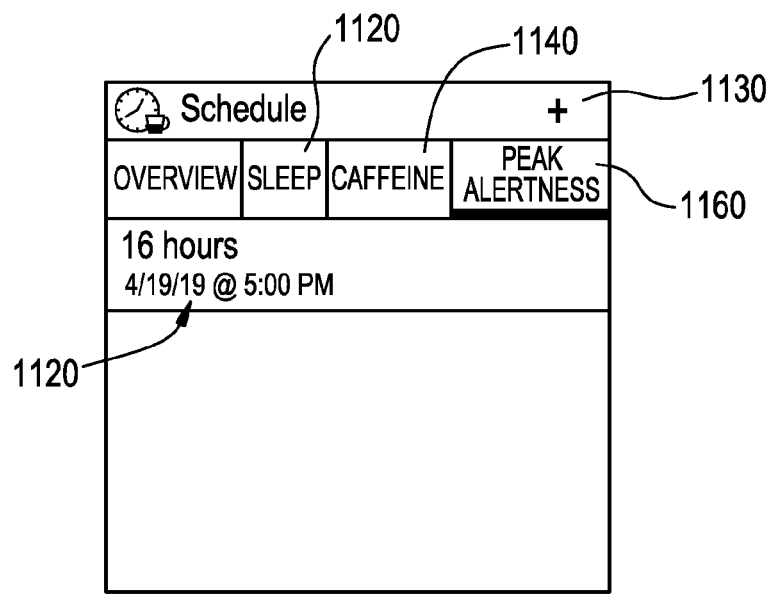
Figure 13B:
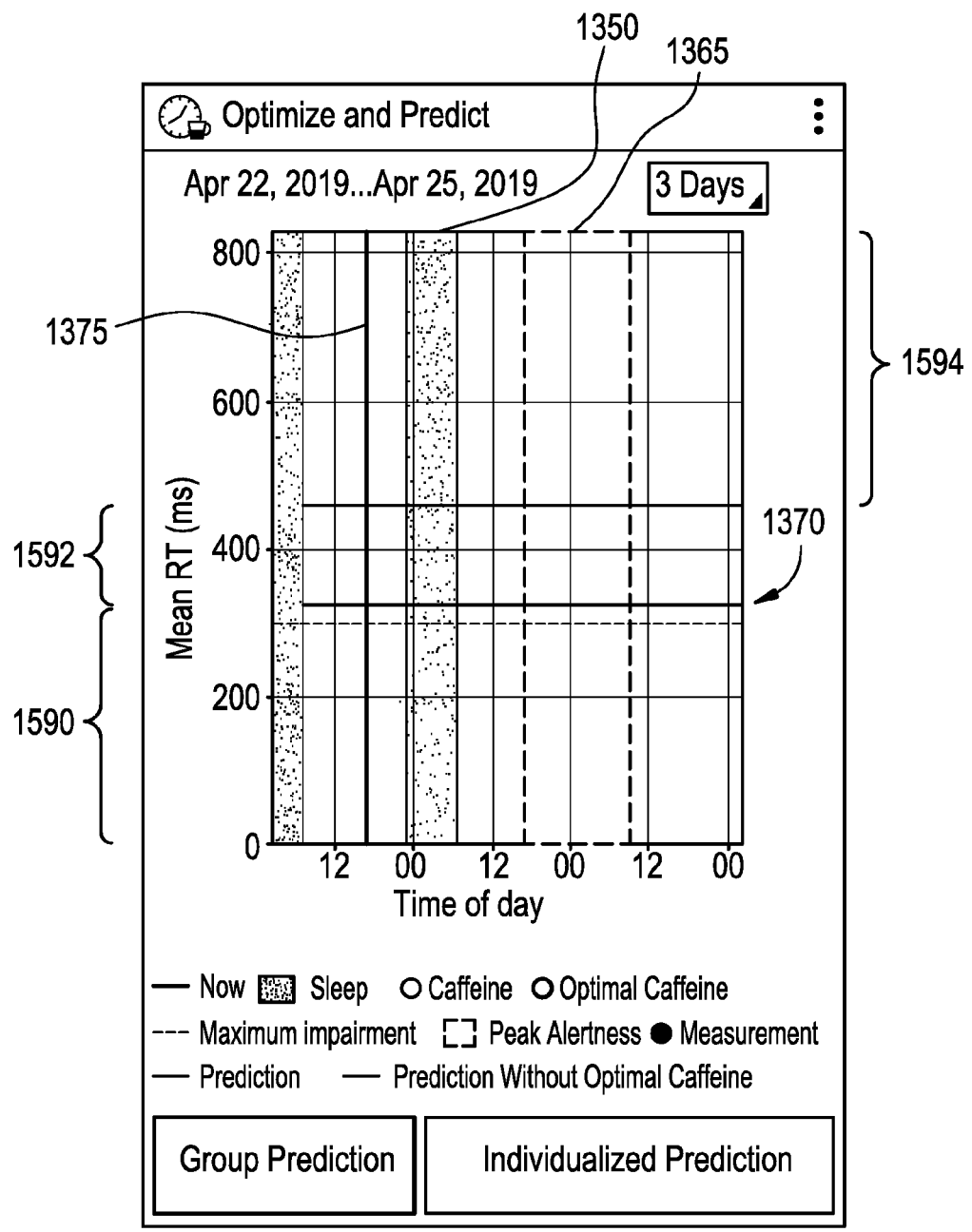

FIGS. 13A and 13B illustrate a graphical user interface display providing a requested peak alertness period for the user (or the individual).

Figure 14:
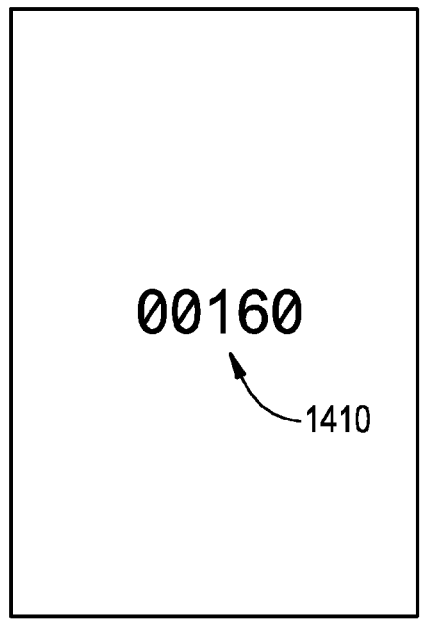

FIG. 14 illustrates a graphical user interface display providing a visual reaction time PVT test.

Figure 15:
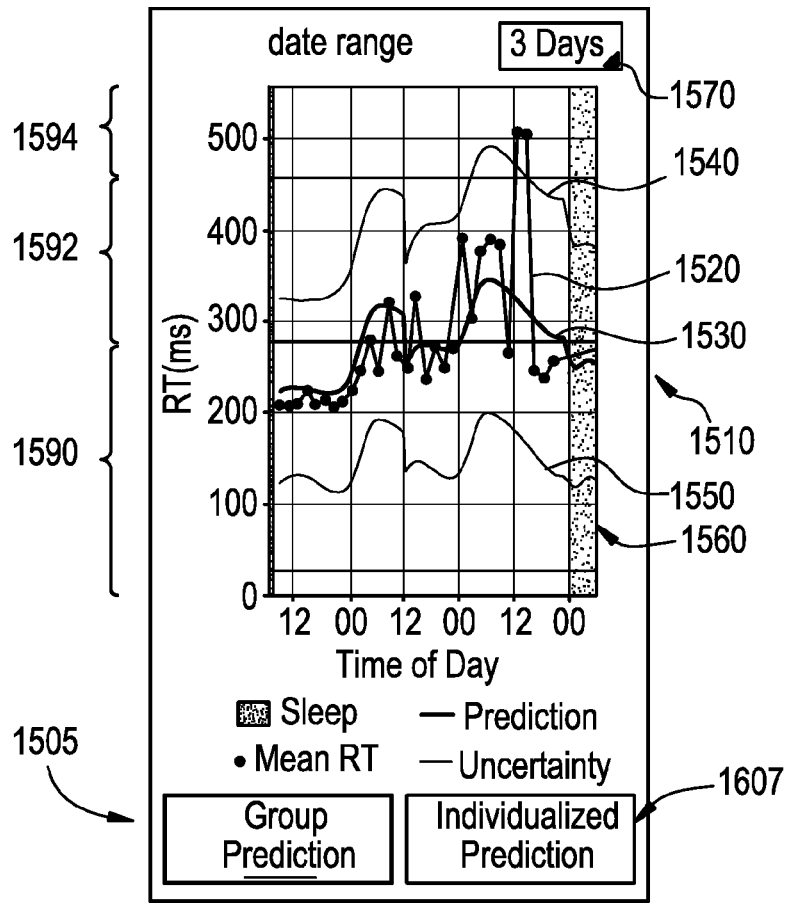

FIG. 15 illustrates a graphical user interface display providing the results of a prediction of alertness impairment using group statistics.

Figure 16A:
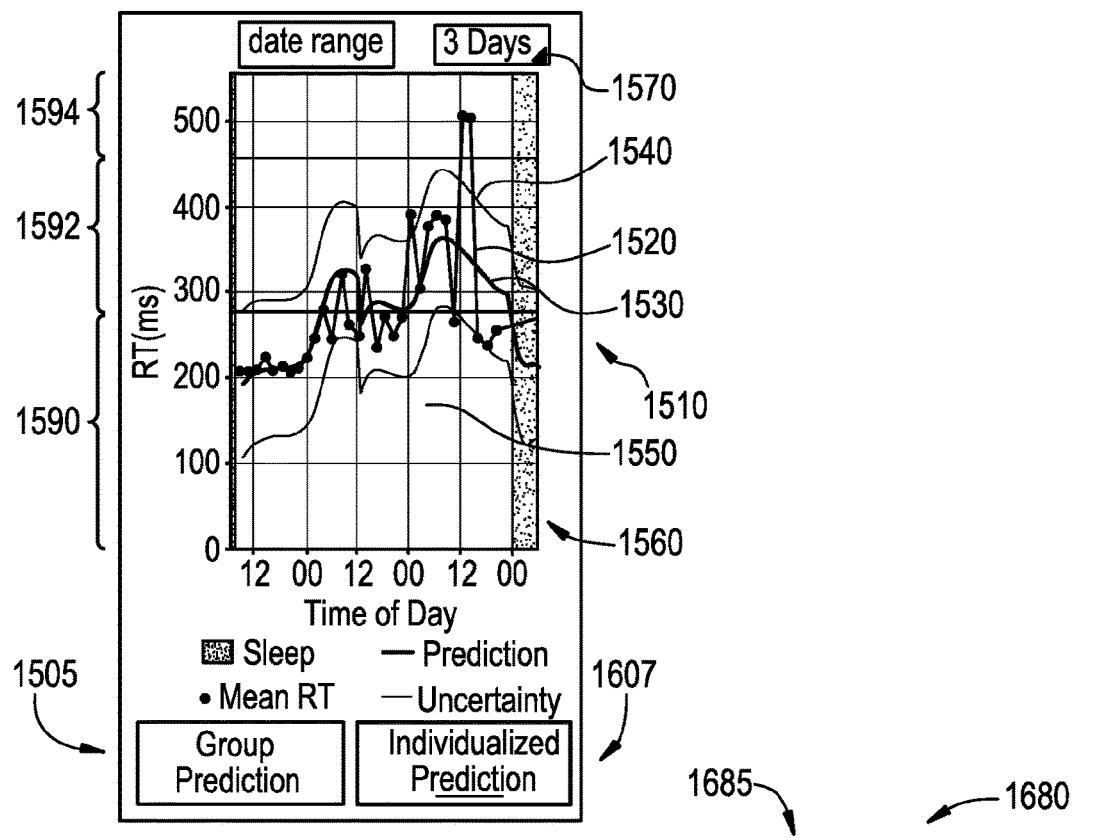
Figure 16B:
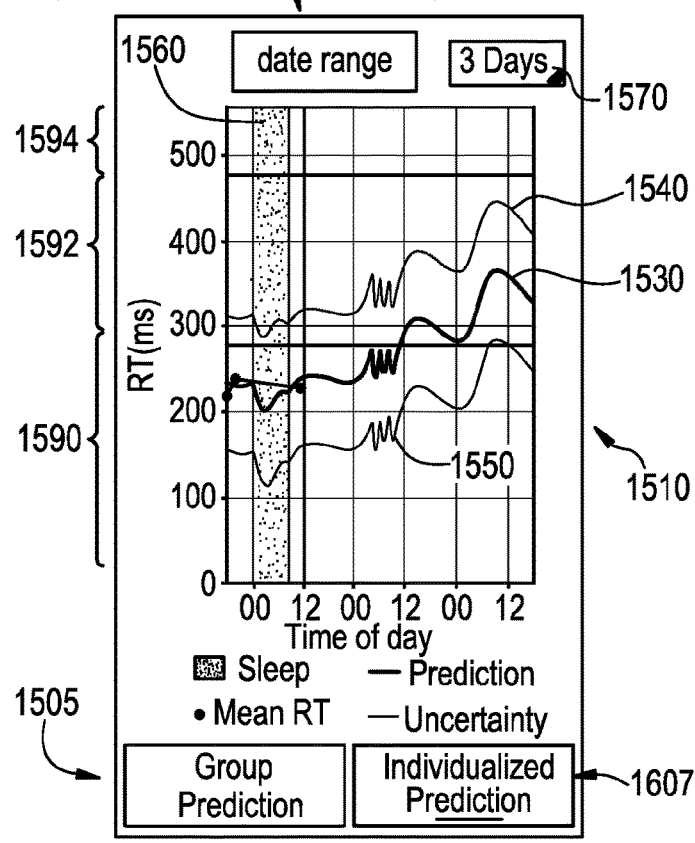
Figure 16C:
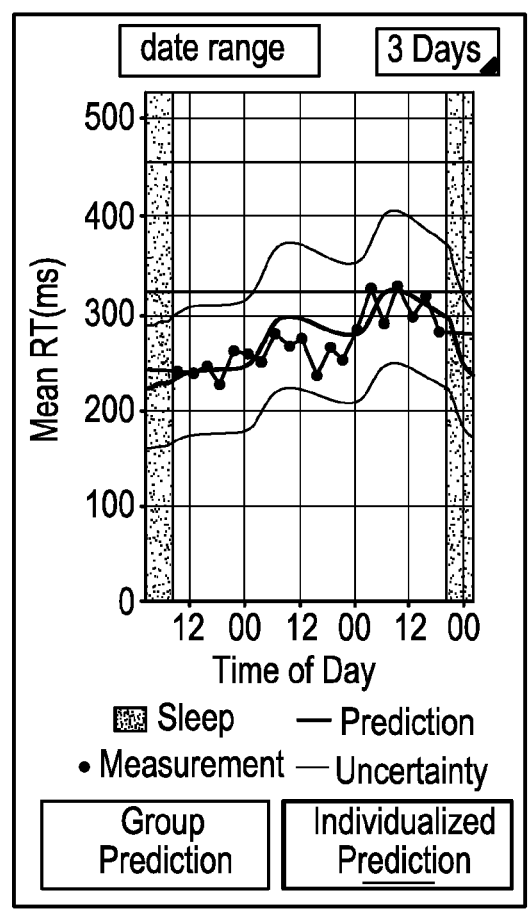

FIGS. 16A and 16C illustrate graphical user interface displays providing the results of a prediction of alertness impairment using individual statistics.

FIG. 16B illustrates a graphical user interface display providing the results of a prediction of alertness impairment using individual statistics after an interval of sleep.

Figure 17A:
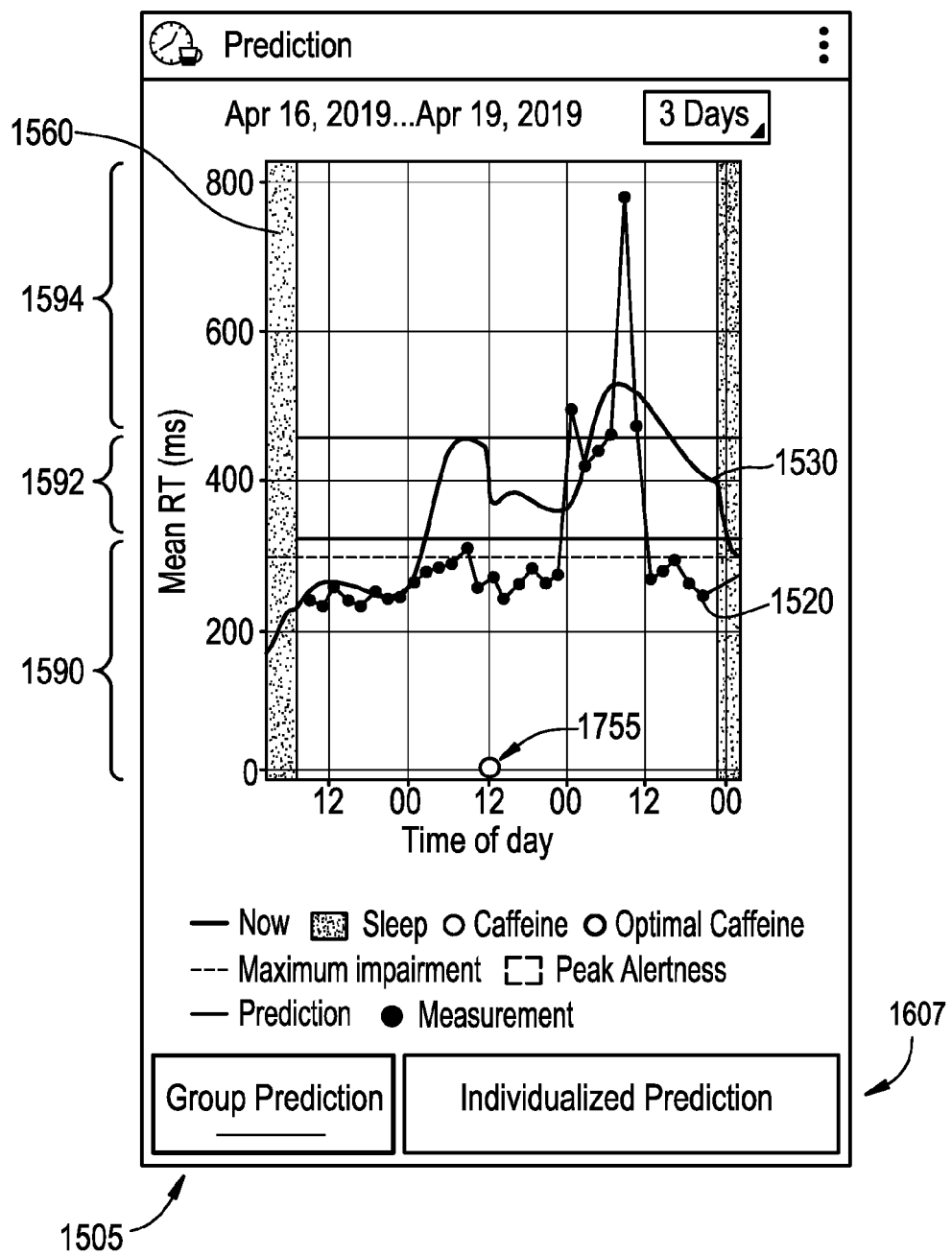
Figure 17B:
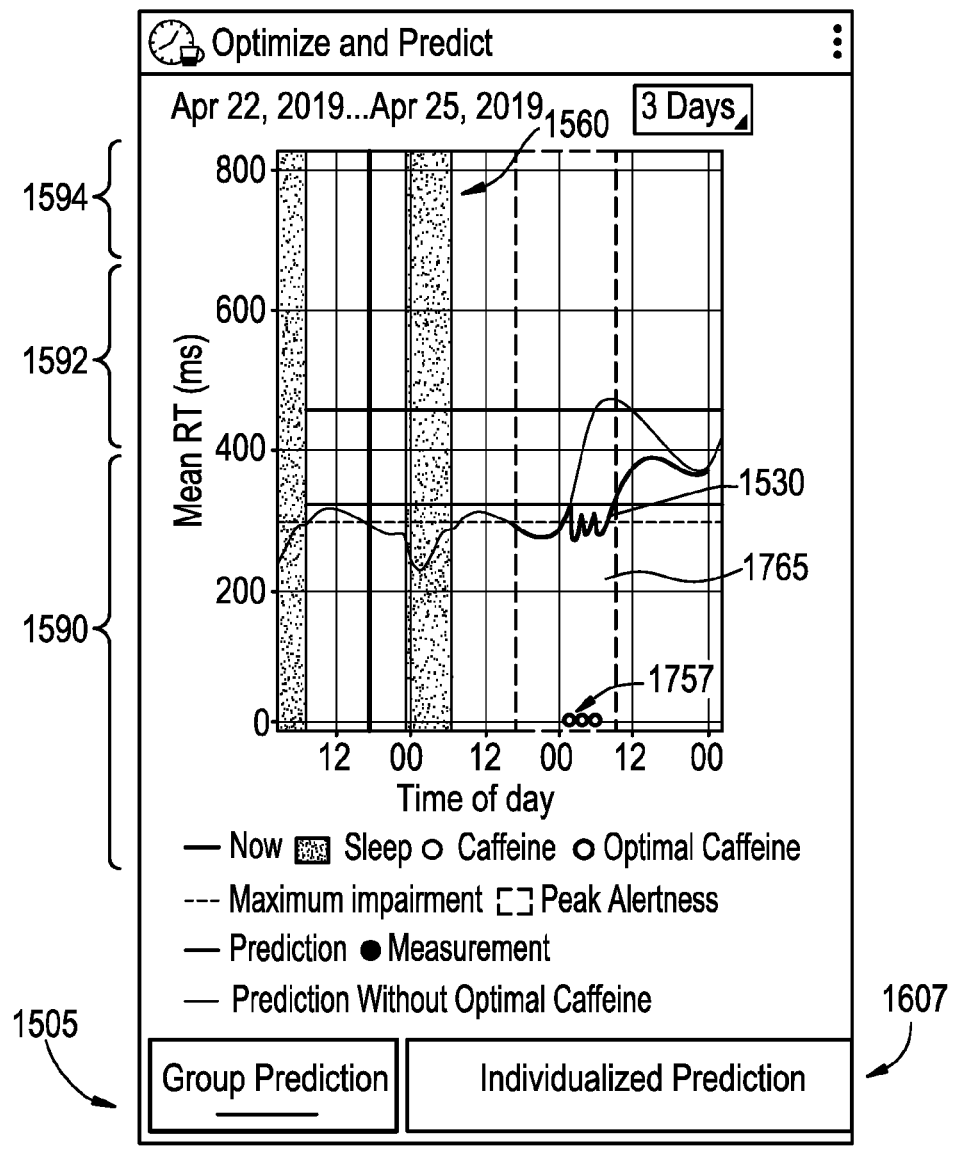

FIGS. 17A and 17B illustrate graphical user interface displays providing a prediction based on a group alertness impairment model with FIG. 17B also illustrating how the optimization solution is displayed.

Figure 18A:
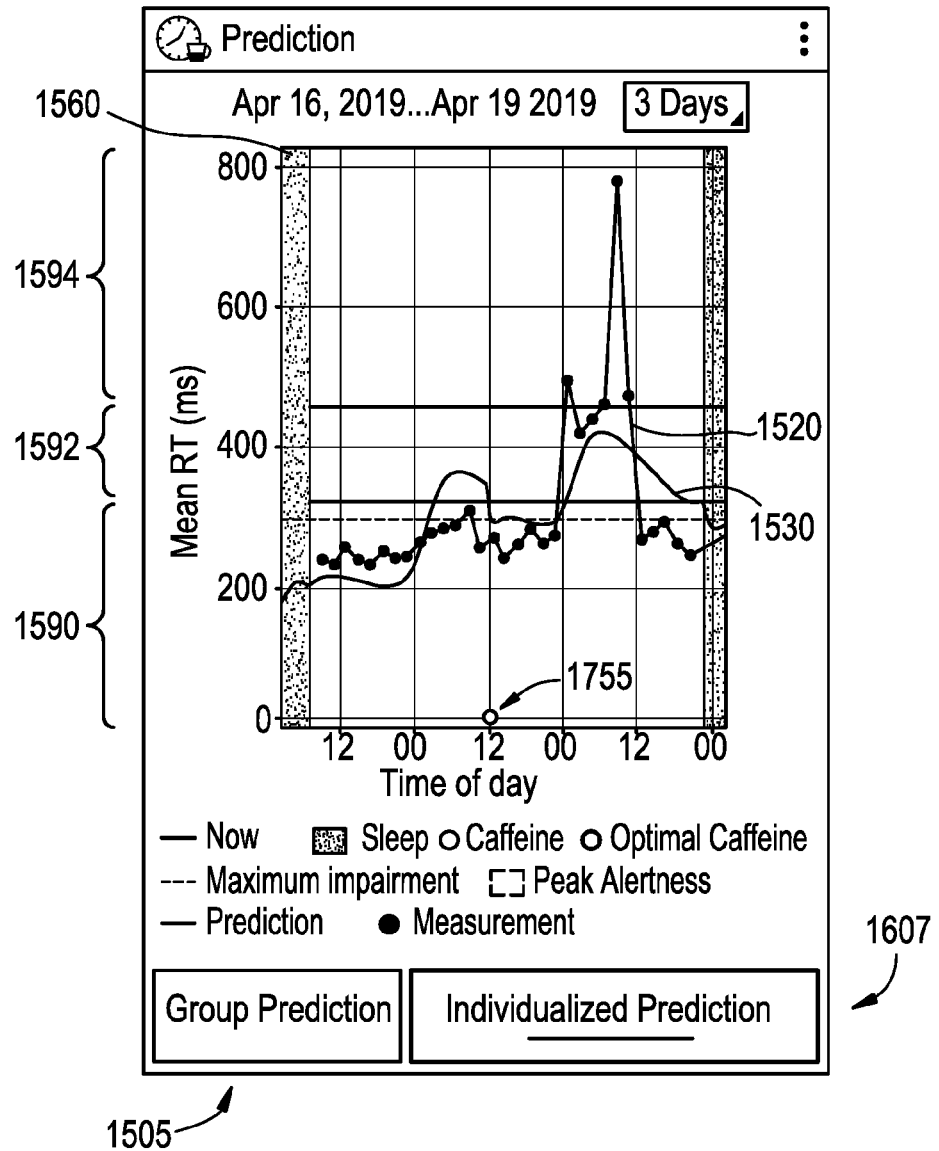
Figure 18B:
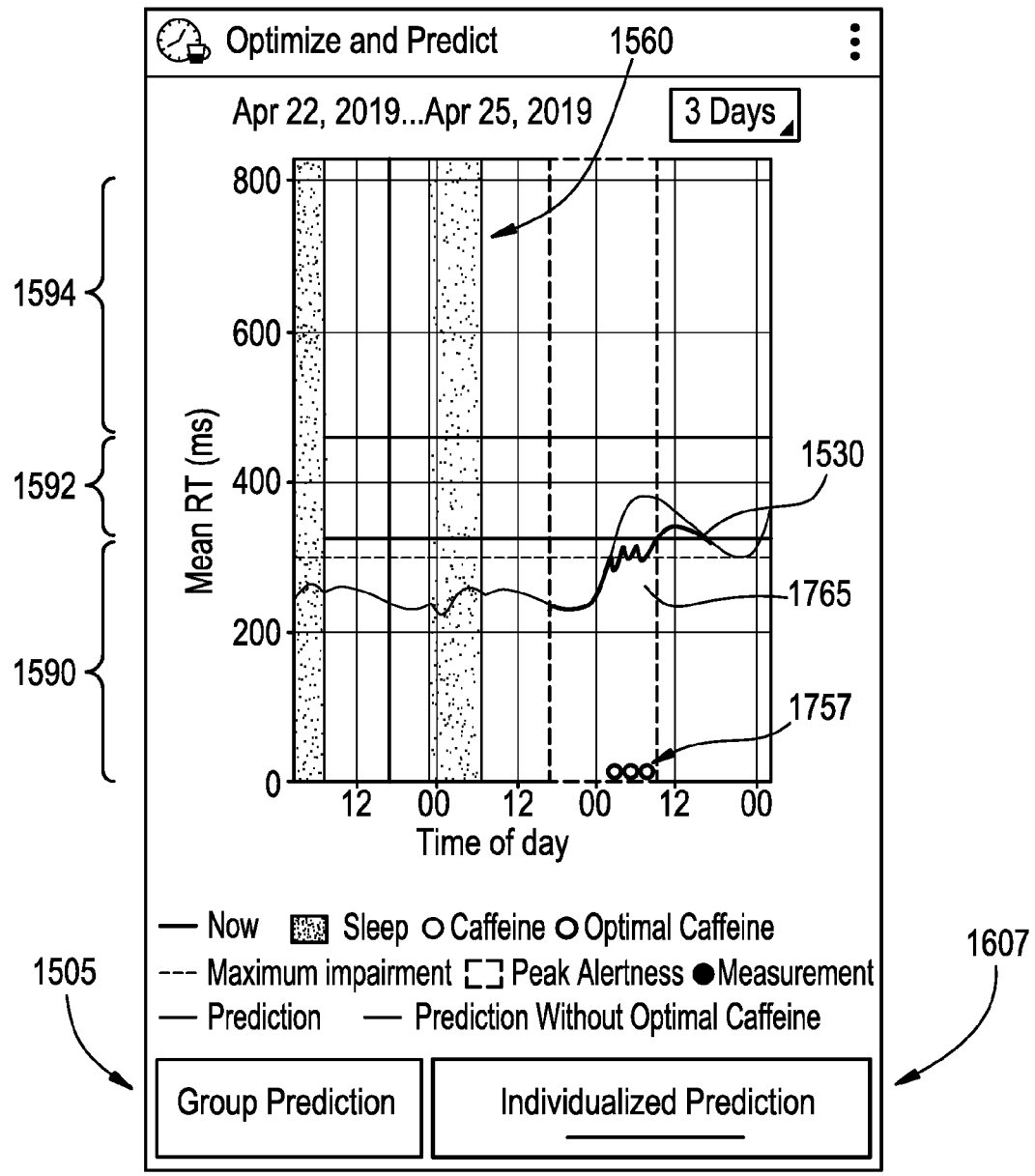

FIGS. 18A and 18B illustrate graphical user interface displays providing a prediction based on an individualized alertness model with FIG. 18B also illustrating how the optimization solution is displayed.

Figure 19A:

FIG. 19A illustrates a graphical user interface display providing a user sleep log.

Figure 19B:

FIG. 19B illustrates a graphical user interface display providing a date input interface.

Figure 19C:

FIG. 19C illustrates a graphical user interface display providing a time input interface.

FIG. 20 illustrates a graphical user interface display providing a user caffeine input interface.

FIG. 21 illustrates a graphical user interface display for selection of caffeine products by the user.

FIG. 22A illustrates a graphical user interface display providing a model training session interface.

FIGS. 22B-22E illustrate an alternative graphical user interface relating to settings for at least one embodiment of the invention.

Figure 22B:
Figures 22C, 22D, 22E, 23A:
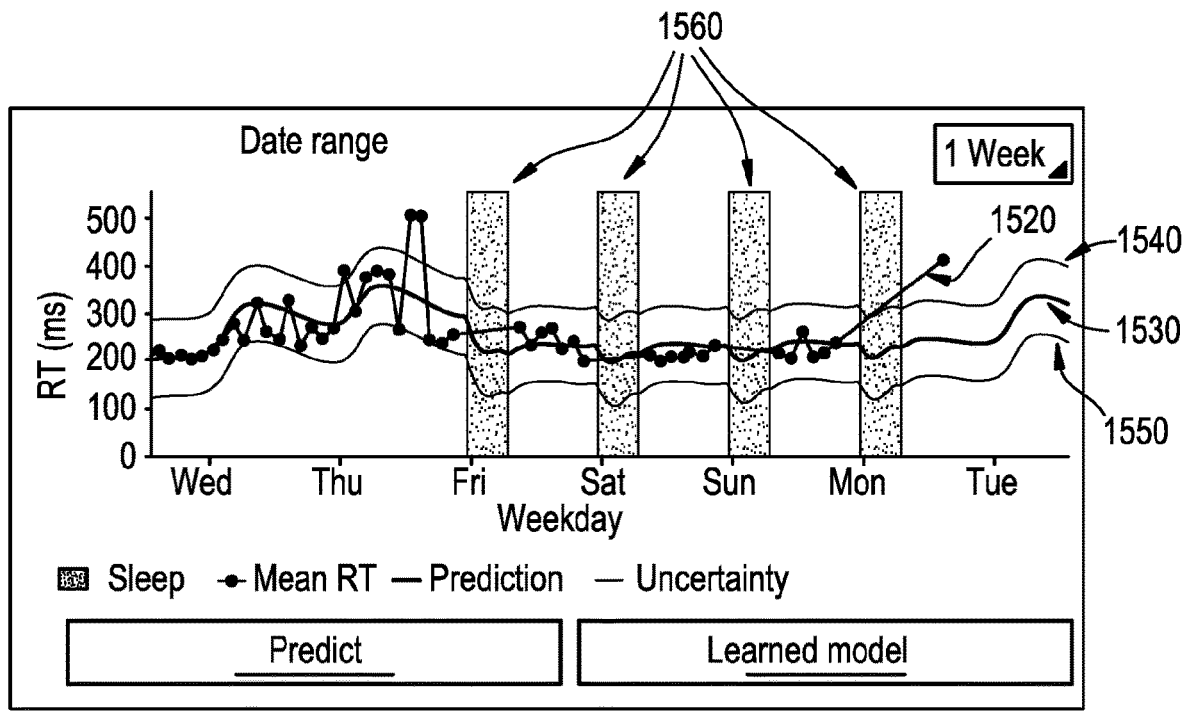

FIG. 23A illustrates a graphical user interface display providing the results of a trained model.

Figure 23B:
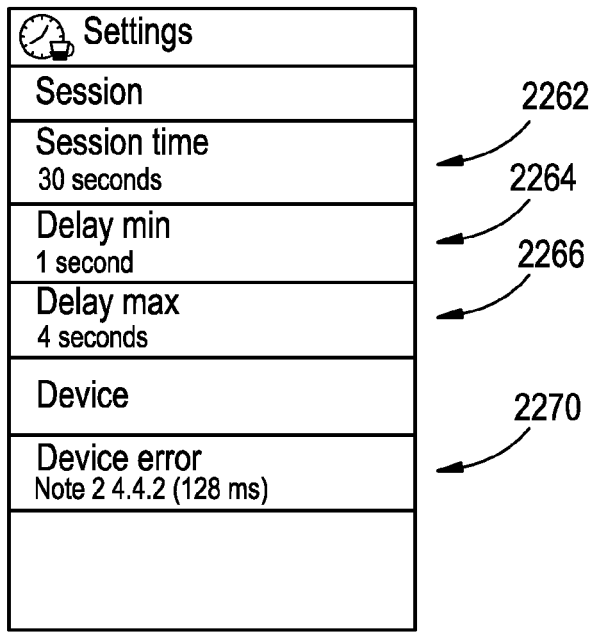

FIG. 23B illustrates a graphical user interface display providing the user-defined settings of the PVT test used to train the prediction model.

Figure 23C:
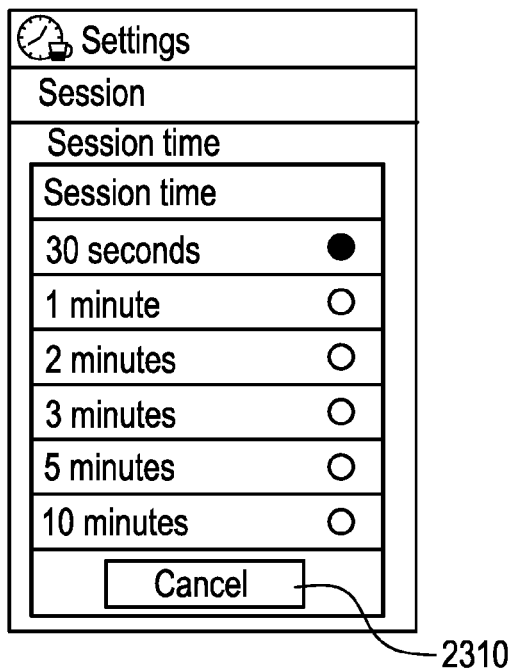

FIG. 23C illustrates a graphical user interface display providing the user-defined session time for the PVT test.

Figure 24:
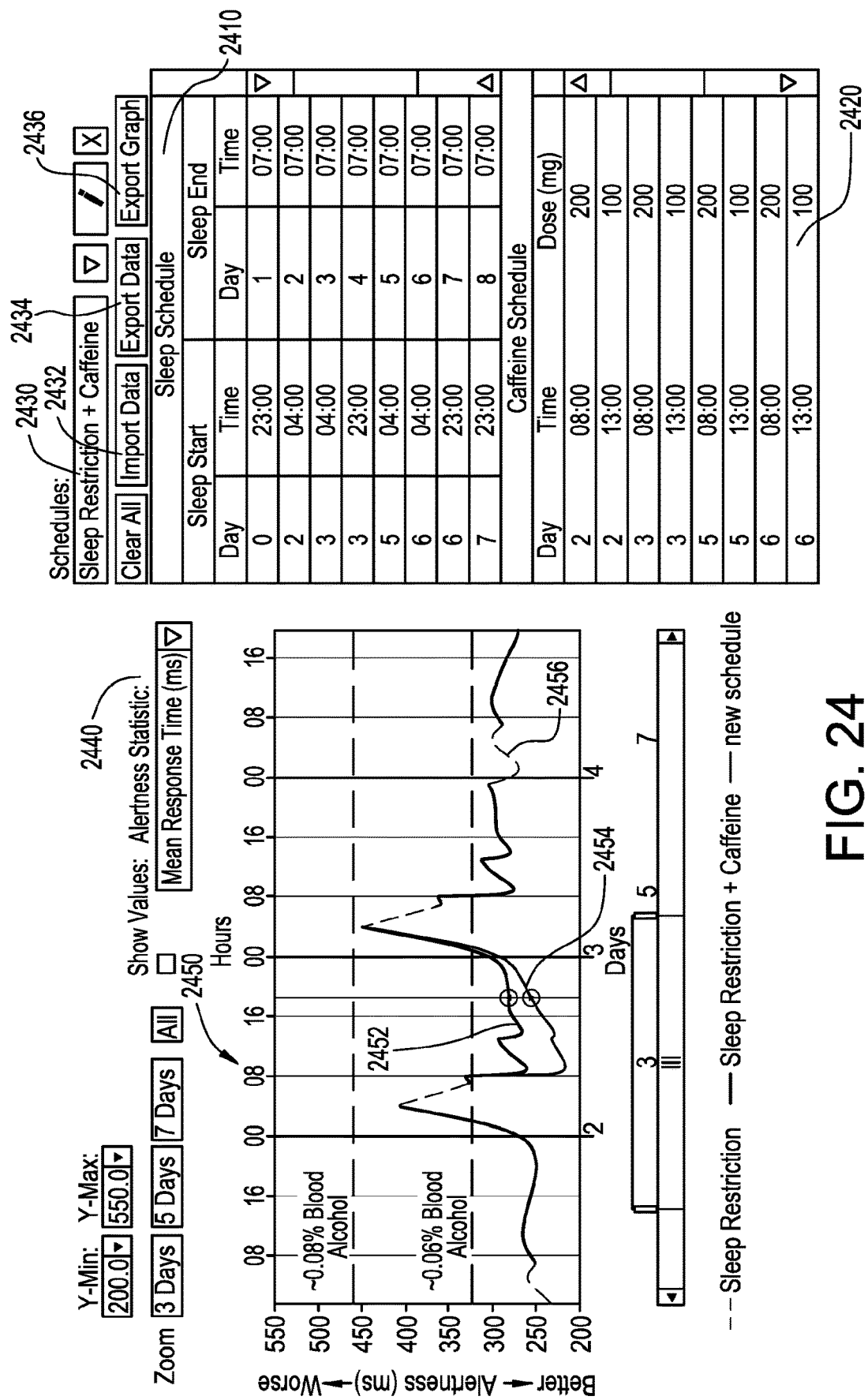
Figure 25:
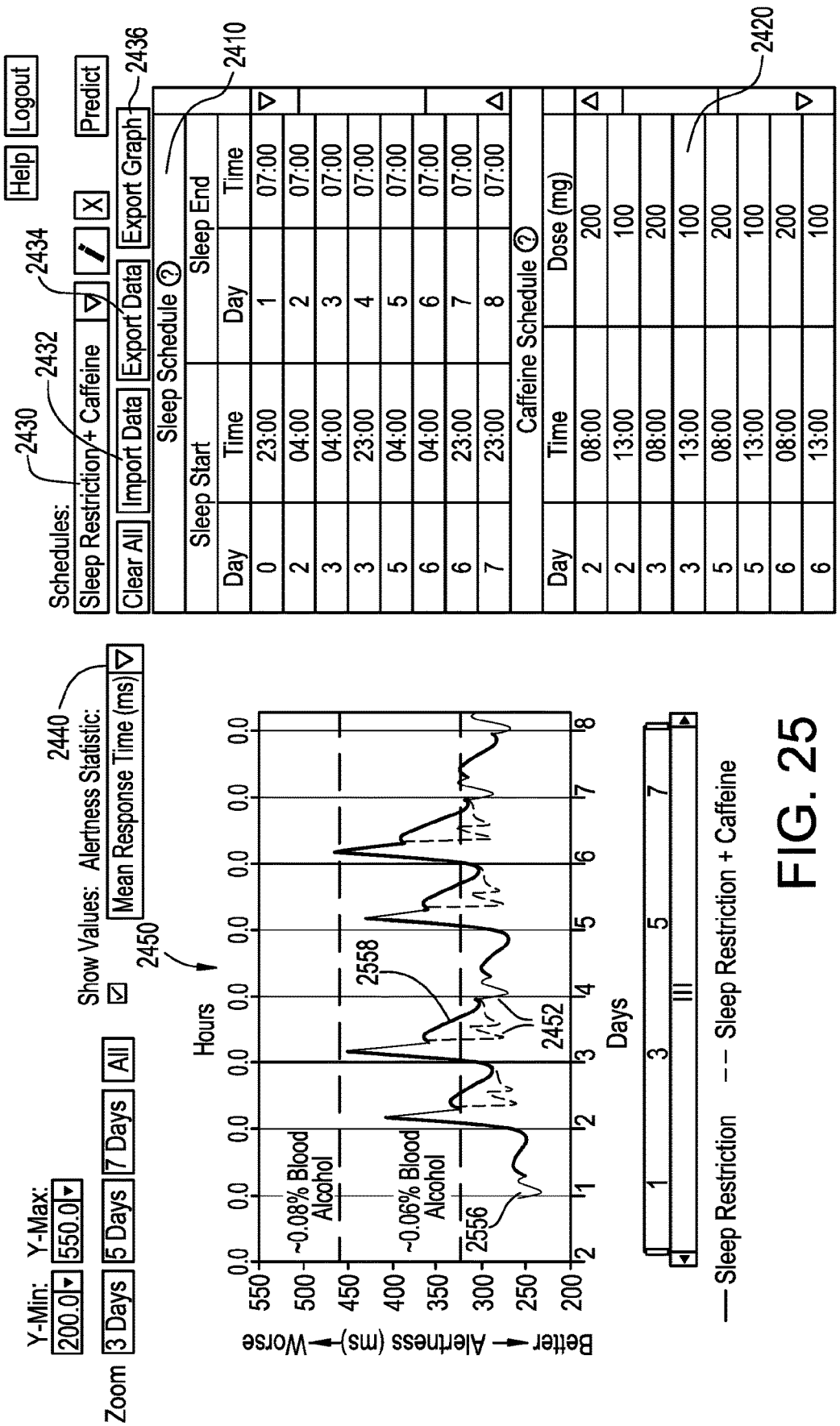

FIGS. 24 and 25 illustrate different user interfaces for interacting with at least one server embodiment according to the invention.

Figure 26A:
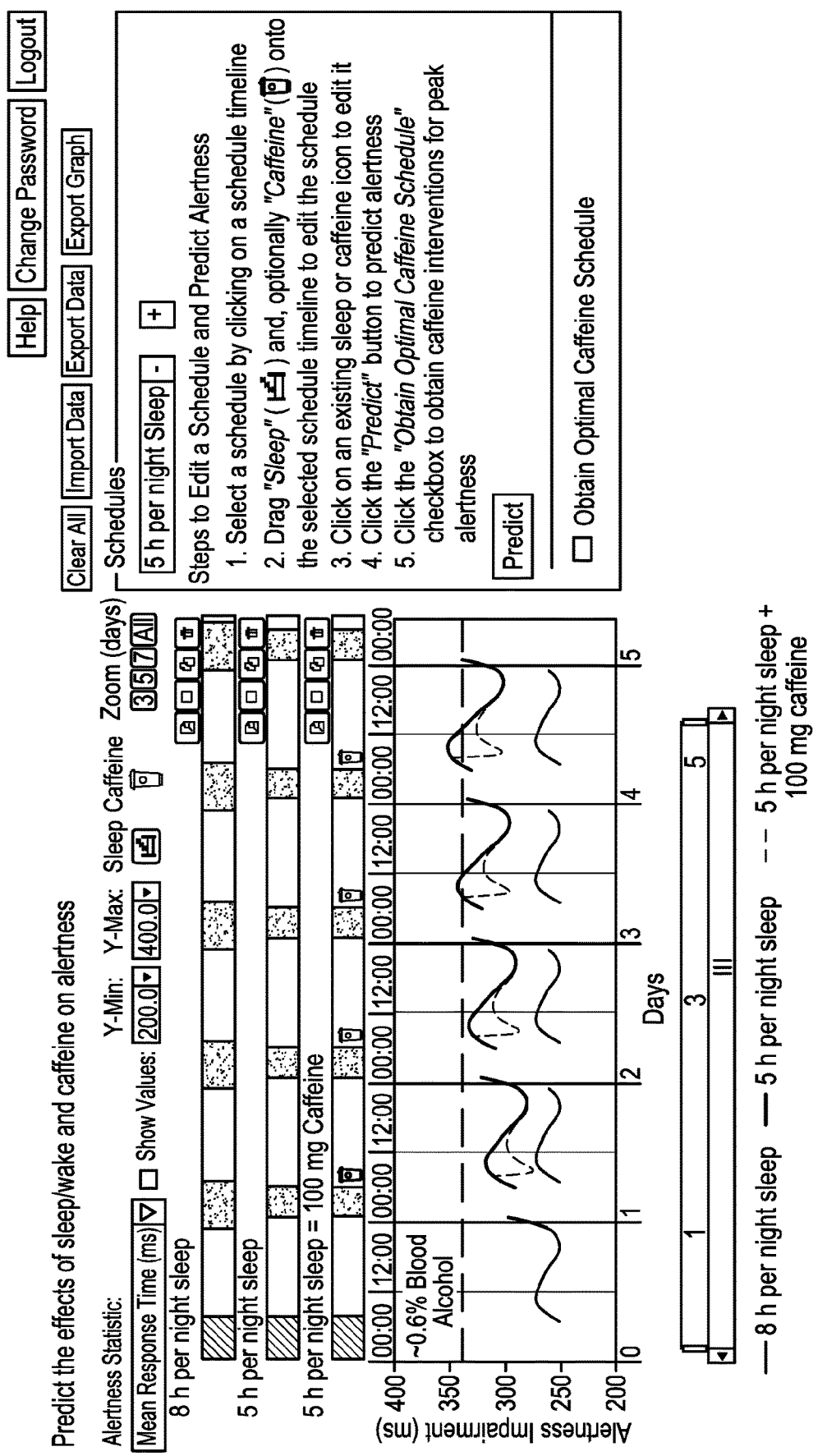
Figure 26B:
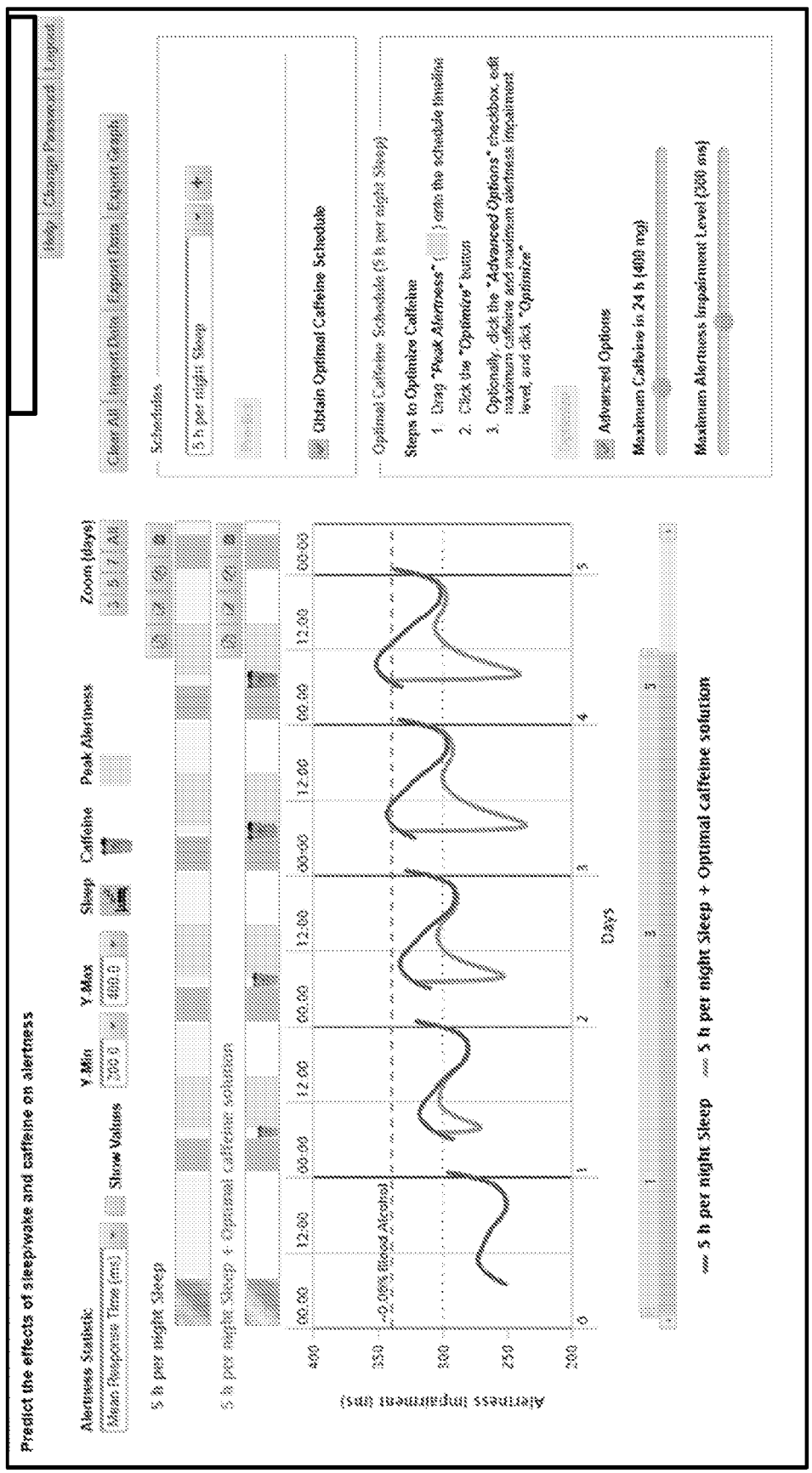
Figure 26C:
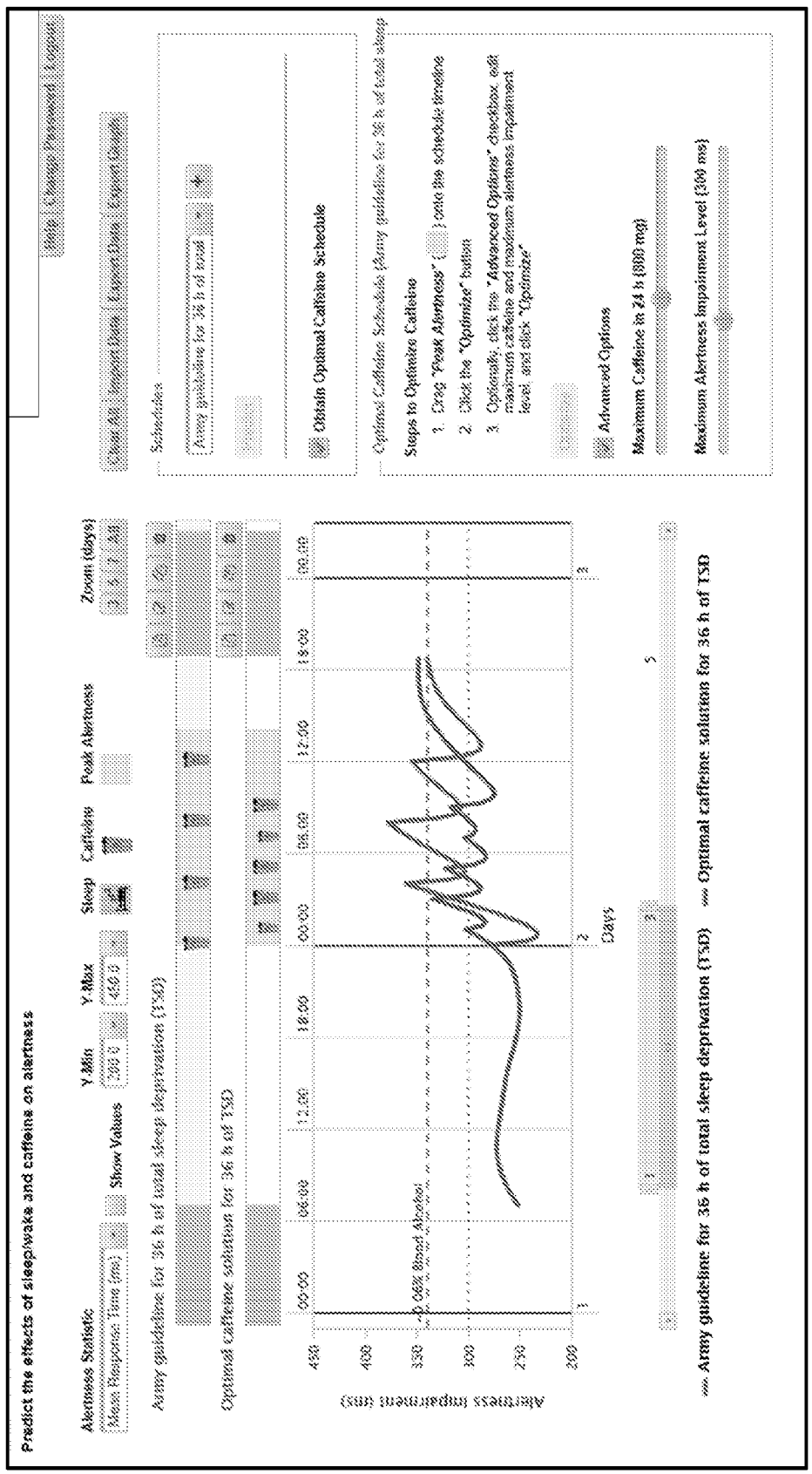

FIGS. 26A-26C illustrate an interface for another system embodiment according to the invention.

Figures 26D, 27:
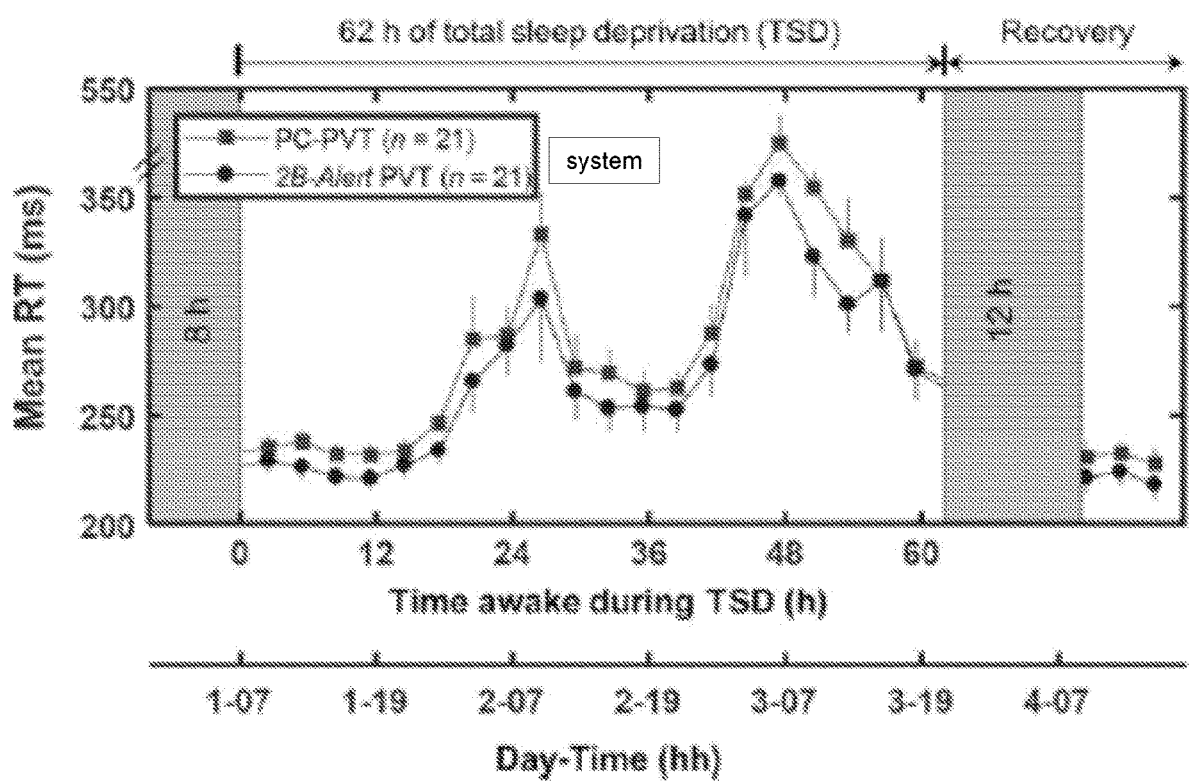

FIG. 26D illustrates an example schedule that can be exported from the system interface illustrated in FIG. 26C.

FIG. 27 illustrates group-averaged PVT mean RT data (standard errors) from the PC-PVT and an implement system PVT during 62 hours of TSD and following 12 hours of recovery sleep.

Figure 28A:
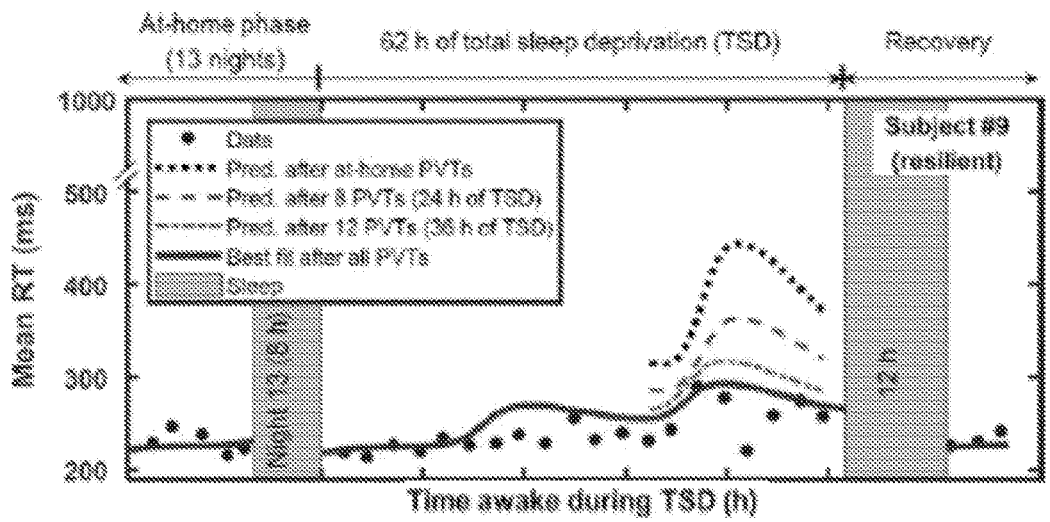
Figure 28B:
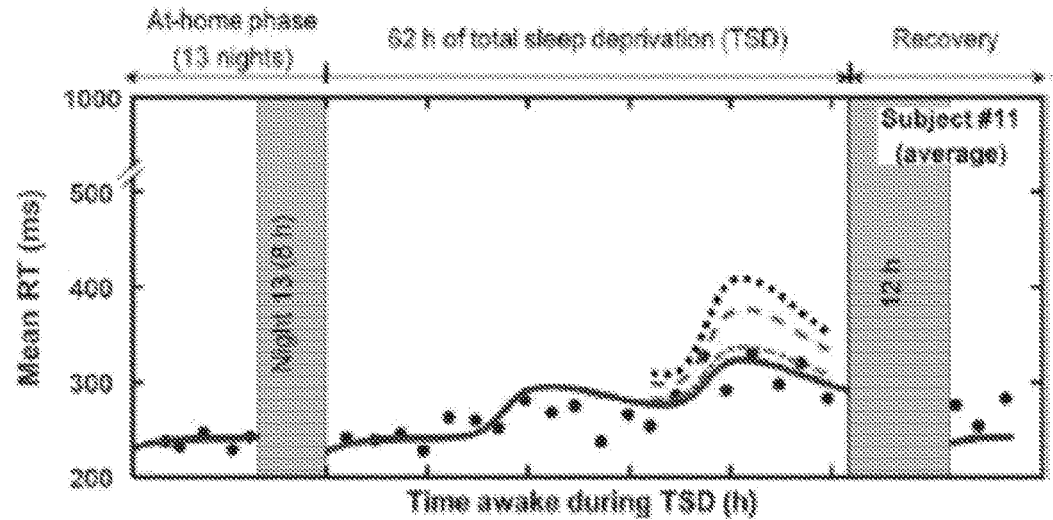
Figure 28C:
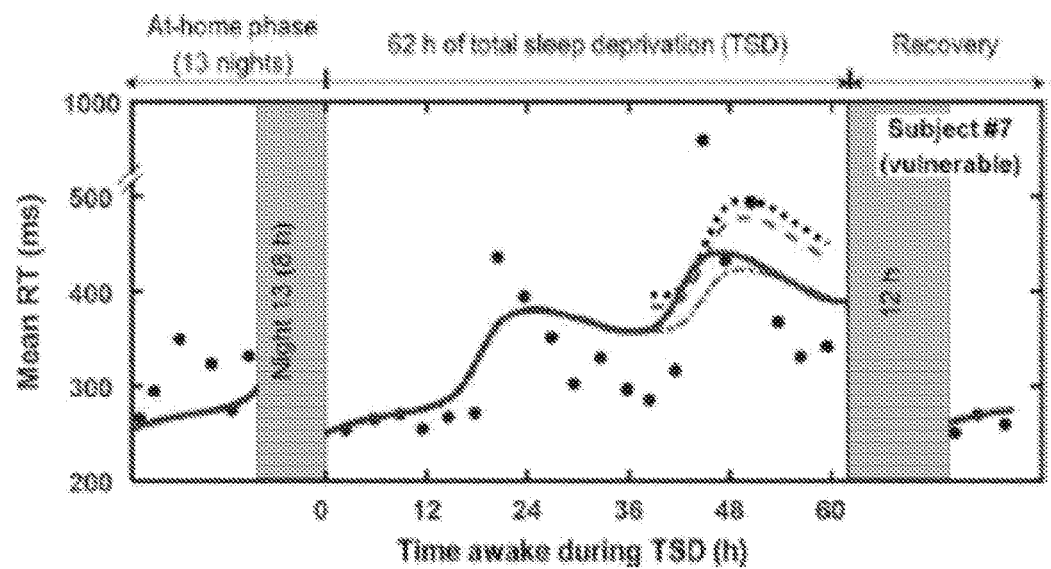

FIGS. 28A-28C illustrate mean RT data for the last day of an at-home phase of the study, 62 hours of TSD, and recovery day for three subjects (#7, #9, and #11), who exhibited different patterns of response to sleep loss with the dotted lines representing the implemented system's predictions as more data was accumulated.

Figure 29:
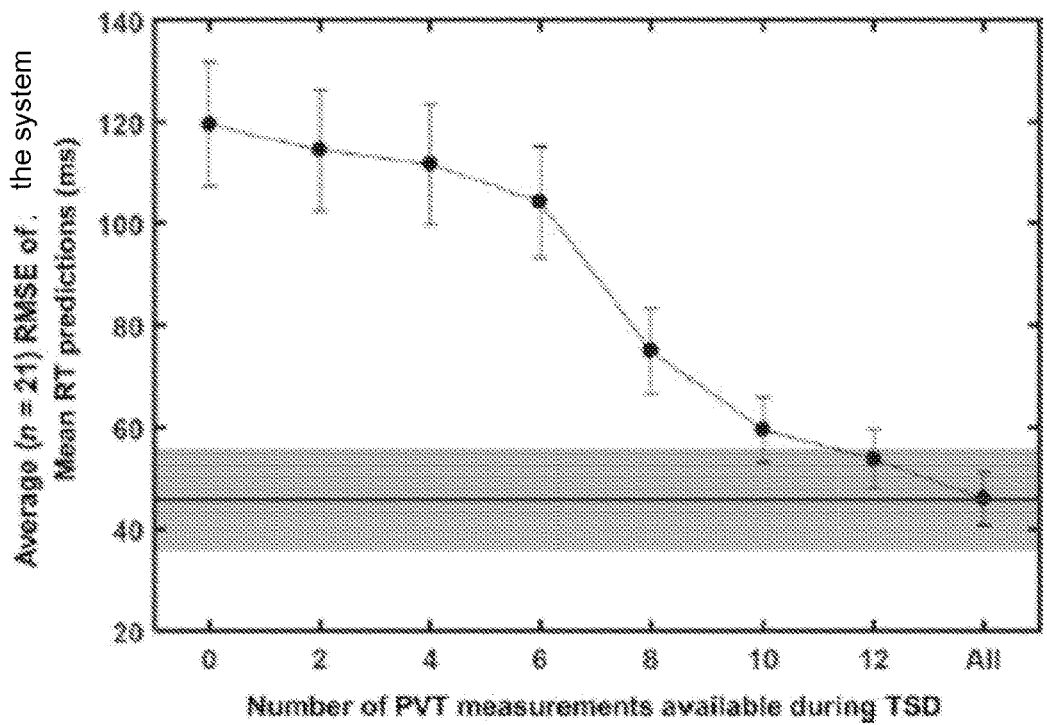

FIG. 29 illustrates the average root mean squared error (RMSE) of the implemented system's individualized mean RT predictions for the last 24 hours of TSD, as a function of the number of PVT measurements available (and used by the system) during TSD for model customization.

Figure 30:
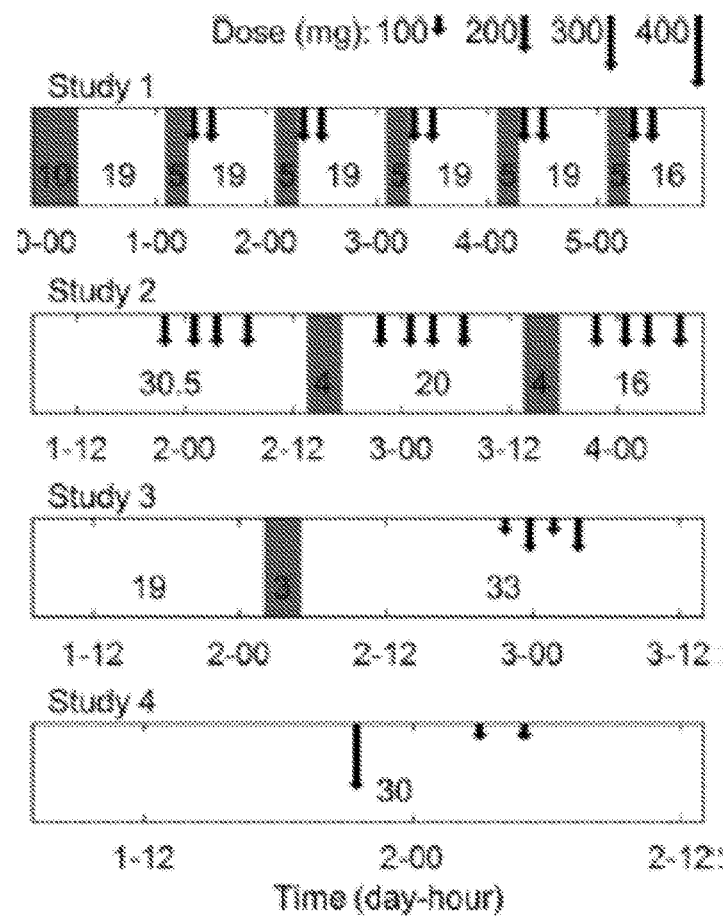

FIG. 30 illustrates schematic representations of caffeine dosing and sleep schedules for four studies used to assess the benefits of the caffeine optimization method.

Figure 31:
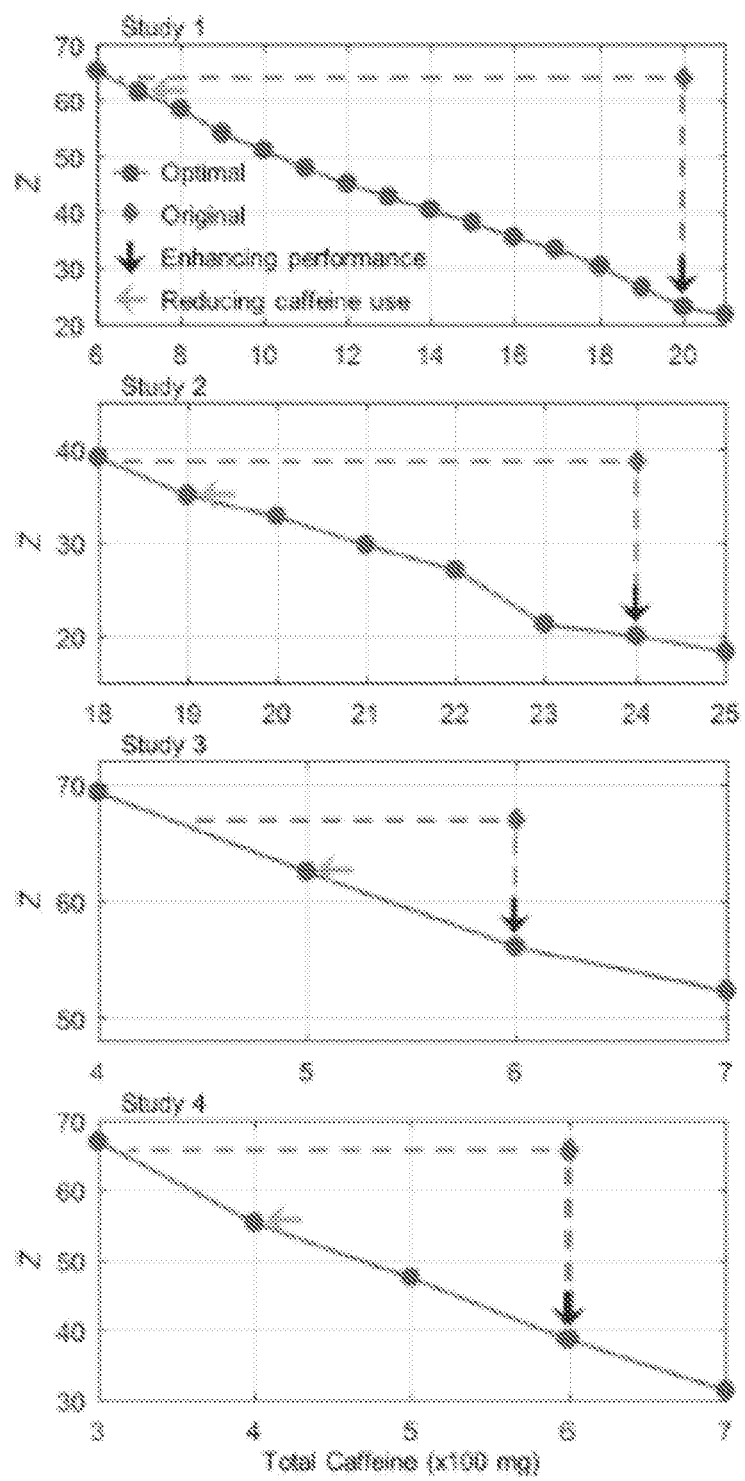

FIG. 31 illustrates objective function (Z) for optimal caffeine-dosing strategies and for the original respective study.

Figure 32:
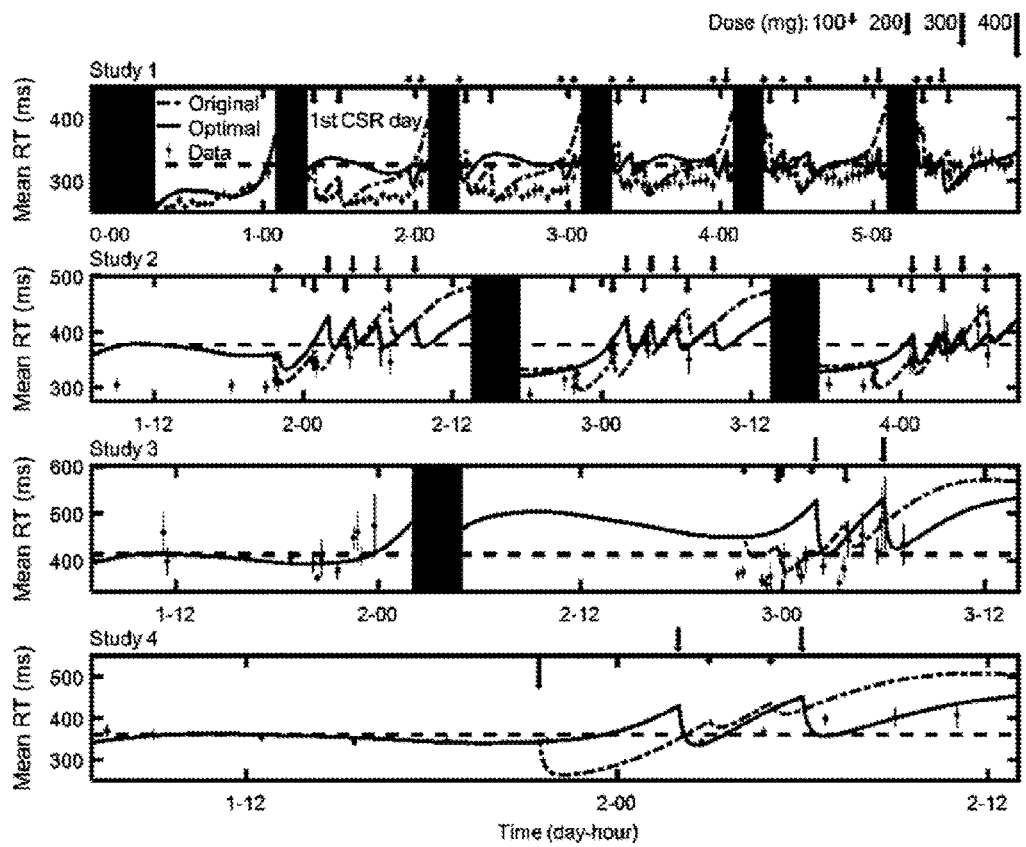

FIG. 32 illustrates optimal strategies to enhance neurobehavioral performance using the same amount of caffeine as in the original studies.

Figure 33:
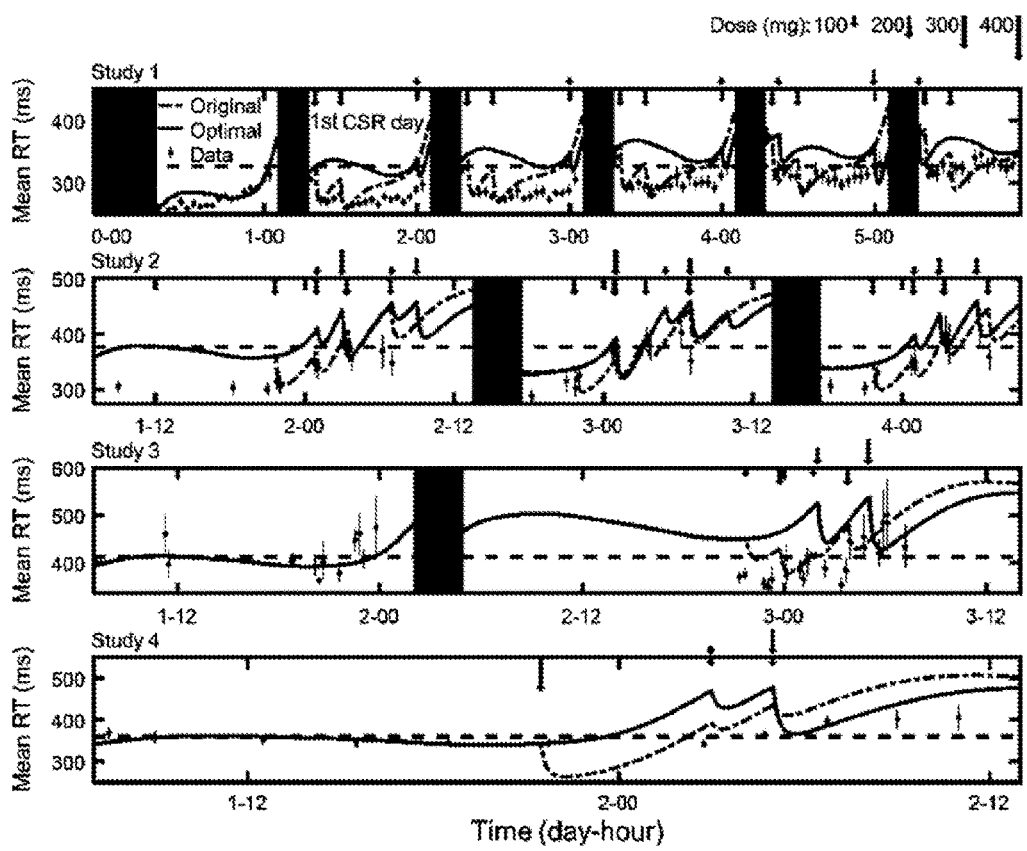

FIG. 33 illustrates optimal strategies to reduce caffeine consumption dosing while maintaining at least the same performance as in the original studies.

V. DETAILED DESCRIPTION a. Definitions

To aid in understanding at least one embodiment of the invention, several terms are defined below.

The terms "response," "outcome" or "dependent variable" are used for measurements that are free to vary in response to other variables called "predictor variables," "independent variables" or "explanatory variables."

Dependent and independent variables may be measured using the following nomenclature.

"Nominal Variables" are binary, dichotomous or binomial discrete variables consisting of only two categories. Variables comprising more than two distinct sets of categories are called "multinomial" or "polytomous."

"Ordinal Variables" are variables describing discrete, categorical, qualitative data that are organized by natural or ranked order that could include count or frequency per category data.

"Continuous Variables" are variables whose measurements fall on a continuous scale that could include both interval and ratio scale measurements or other quantitative data. Continuous Variables are also known as "covariates."

A "Factor" is a qualitative, explanatory variable whose categories are subdivided into levels.

As used herein, the terms "coefficients" and "coefficient values," unless otherwise explicitly specified, are intended to include within their scope that only coefficients, but also any constant or other terms that may be necessary for a model. Such terms may include, for example, an intercept term, a mean squared error term, and/or a number of degrees or freedom term. In addition, "coefficient" data, as used herein, also includes, unless explicitly stated, data computed "on-the-fly" from one or more parent parameters (e.g., the data is computed as a function of and other parameter that is retrieved from a database or requested as input).

The term "PVT" means psychomotor vigilance task which includes, but is not limited to a simple (one choice) reaction-time task in which subjects press a button in response to a visual stimulus that is presented on a random interval (2-10 seconds) schedule over a 10-minute period, resulting in ~100 stimulus-response pairs (Dorrian et al., 2005). It may also include mathematical processing, running memory, and visual analogue scale of fatigue.

The phrase "chronic sleep restriction (CSR)" means instances of sustained periods of time with suboptimal sleep, for example 7 days of 3 hours nightly time in bed although different lengths and number of hours of nightly sleep are possible as one of ordinary skill in the cognitive/sleep field would understand this phrase.

The phrase "total sleep deprivation (TSD)" means periods of acute instances where a subject has no sleep, for example no sleep for a period of 64 hours although different lengths are possible as one of ordinary skill in the cognitive/sleep field would understand this phrase.

The terms "display" and "accept" as used in the description herein referred to a suitably programmed computing apparatus "outputting" or "accepting" data, not to a person "outputting" or "accepting" something. A person might, however view the display data on an output device on a page produced by an output device or supplied except the data using an input device.

b. Alertness Impairment Model Overview

At least one embodiment is directed at a system and method for determining a cognitive level of an individual using a model taking into account circadian and homeostatic processes optionally along with caffeine consumption of the individual. In a further embodiment, the variable (or parameter) weights in the model are adjusted for a particular individual based on results of at least one PVT test. In a still further embodiment, the system communicates with a server (or central processing system) to provide for planning including for the individual and a group of individuals such as a workforce. The alertness impairment model may be used in a variety of the other models discussed in this disclosure.

The model assumes for caffeine-free performance that the temporal pattern of alertness impairment can be represented as the additive interaction of two separate processes: (1) the homeostatic process S, which rises monotonically during wakefulness and declines monotonically during sleep (Daan et al., 1984) and (2) a circadian process C, which is a 24-hour periodic, self-sustaining oscillator modeled as a five-harmonic sinusoidal equation. In at least one embodiment, the model is as follows:

$$P_c(t) = (S(t) + \kappa C(t)) \tag{1a}$$

where C and S denote the circadian and homeostatic processes of the two-process model at time t, respectively, and $\kappa$ represents the circadian amplitude. When the model optionally includes caffeine, a caffeine effect acts as a multiplicative effect. In at least one embodiment, the model with the optional caffeine component is as follows:

$$P_c(t) = (S(t) + \kappa C(t)) * g_{PD}(t,c) \tag{1b}$$

The $g_{PD}$ denotes the caffeine effect based at least on time and consumption. FIG. 4A provides an example of the alertness model result P being based on components C and S.

Process C (circadian) in at least one embodiment is independent of sleep/wake history and represents a self-sustaining oscillator with a 24-hour period although there could be difference from this period for particular individuals. The circadian process C in at least one embodiment is as follows:

$$C(t) = \sum_{i=1}^{5} a_i \sin\left[i\frac{2\pi}{\tau}(t+\Phi)\right] \tag{2}$$

where $a_i$, i=1, . . . , 5, represent the amplitude of the five harmonics ($a_1$=0.97, $a_2$=0.22, $a_3$=0.07, $a_4$=0.03, and $a_5$=0.001), $\tau$ denotes the period of the circadian oscillator (~24 hours), and $\Phi$ denotes the circadian phase.

Process S (sleep homeostasis) in at least one embodiment is dependent on the individual's sleep/wake history, increases exponentially with time awake and decreases exponentially with sleep/recovery time to a basal value, whose rates of increase/decrease are individual-specific, assumed to be constant, and have unknown values. The homeostatic process S in at least one embodiment is as follows:

$$S(t) = \begin{cases} U - (U - S_0)\exp(-t/\tau_w) & \text{during wakefulness} \\ -2U + (2U + S_0)\exp(-t/\tau_s) + & \text{during sleep} \\ (2U + L_0)[\tau_{LA}/(\tau_{LA} - \tau_s)][\exp(-t/\tau_{LA}) - \exp(-t/\tau_s)] & \end{cases} \quad (3)$$

where U and L denote the upper and lower asymptotes of process S, respectively, $\tau_w$ and $\tau_s$ denote the time constants of the increasing and decreasing sleep pressure during wakefulness and sleep, respectively, and $\tau_{LA}$ denotes the time constant of the exponential decay of the effect of sleep history on performance. $S(0)=S_0$ and $L(0)=L_0$ correspond to the initial state values for S and L, respectively.

In at least one embodiment, the model incorporates sleep debt into the two-process model by describing changes in an individual's capacity to recover during sleep as a function of Debt(t), i.e., the lower asymptote L(t) of the homeostatic process is allowed to increase or decrease with increased or decreased Debt(t), respectively, while the upper asymptote U remains constant in at least one embodiment.

The values of L(t) during sleep and wake were chosen so that if an individual sleeps 8 hours, the recommended optimum sleep time per night, the area under the curve (AUC) for L(t) over a 24-hour period is equal to zero (16×1+(−2)×8). In the differential equation defining the dynamics of Debt(t), sleep losses or sleep extensions that occurred in the remote past have a much weaker influence on the present sleep debt than comparable events in the more recent past. For an individual restricted to 8-hours time in bed (TIB) each day, the AUC for L(t) each day would be zero, and the lower asymptote L(t) would oscillate around zero, reaching its highest point before bed-time and its lowest point at awakening. If the time constant $\tau_{LA}$ is slow (e.g., $\tau_{LA}=120$ hours), the magnitude of this oscillation would be 0.06 U, and thus the model would closely approximate Borbelys two-process model.

To initialize the model in at least one embodiment, Debt(0) is set to any value between −2 and 1, which ensures that Debt(t) lies in this range for all t>0. Although in at least one embodiment, the Debt(0) is set based upon the recent sleep history for the individual being monitored.

The lower asymptote L of process S:

$$L(t) = \begin{cases} \max[U - (U - L_0)\exp(-t/\tau_{LA}), -0.11U] & \text{during wakefulness} \\ \max[-2U + (2U + L_0)\exp(-t/\tau_{LA}), -0.1U] & \text{during sleep} \end{cases} \quad (4)$$

In at least one embodiment, the above model processes include a total of eight parameters: S(0), U, L(0), $\tau_w$, $\tau_s$, $\varphi$, $\kappa$, and $\tau_{LA}$.

The caffeine effect ($g_{PD}$):

$$g_{PD}(t, c) = \left[1 + M_c \frac{k_a}{k_a - k_c}\{\exp[-k_c(t - t_0)] - \exp[-k_a(t - t_0)]\}\right] \quad (5a)$$

for $t \geq t0$ $$M_c = M_0 c \text{ and } k_c = k_0\exp(-z \cdot c) \quad (5b)$$

where $M_c$ and kc denote the amplitude factor and elimination rate for a caffeine dose c administered at time $t_0$, respectively. $M_0$, $k_0$, z, and $k_a$ denote the amplitude slope, basal elimination rate, decay constant, and absorption rate, respectively.

In order to model repeated caffeine doses, Eq. 5a is modified to allow for an adjustment of the amplitude factor and the elimination rate on extant plasma caffeine concentration. Accordingly, the PD effect after j doses of caffeine of strengths $D_1$, $D_2$, ..., $D_j$ administered at discrete-time indices $t_1$, $t_2$, ..., $t_j$, respectively, can be expressed as follows:

$$g_{PD(t,D_j)} = \begin{cases} 1 & \text{for } t < t_1 \\ (1 + M_{Dj}\exp[-k_{Dj}T_s(t - t_j)])^{-1} & \text{for } t \geq t_j, j = 1, 2, \ldots \end{cases} \quad (6)$$

where $M_{Dj}$ and $k_{Dj}$ denote the effective amplitude factor and elimination rate parameters, respectively, that depend on the caffeine concentration at time $t_j$.

Using Eq. 6, these parameters can be expressed as follows:

$$M_{Dj}=M_0 \times +[D_j+E(t_j^-)] \text{ and } k_{Dj}=k_0 \exp\{-z[D_j+E(t_j^-)]\} \quad (7)$$

where $E(t_j)$ is the equivalent caffeine dose representing the caffeine concentration present at time $t_j$ immediately prior to the administration of dose $D_j$. The expression for $E(t_j)$ follows from the standard one-compartment PK model:

$$E(t_j^-) = \begin{cases} 0 & \text{for } j = 1 \\ [E(t_{j-1}^-) + D_{j-1}]\exp[-k_{Dj}T_s(t_j - t_{j-1})] & \text{for } j = 2, 3, \ldots \end{cases} \quad (8)$$

The repeated-dose model in Eq. 6 reduces to Eq. 5a under single dose conditions. However, the model in Eq. 6 assumes that: (1) each of the repeated caffeine doses are administered via the same formulation and (2) $g_{PK50}$ of the Hill equation, which affects the amplitude slope $M_0$, remains constant with repeated doses.

In at least one embodiment, an example of the beginning parameter values (standard errors) for both lapse and mean response time (RT) statistics are shown in Table 1 below.

TABLE 1

| Parameter | Lapse | Mean RT |
|---|---|---|
| U | 18.4 (0.7) lapses | 497 (31) ms |
| $\tau_w$ | 40.0 (3.2) h | 23.0 (3.2) h |
| $\tau_s$ | 2.1 (0.1) h | 4.0 (1.0) h |
| $S_0$ | 0.5 (0.7) lapses | 176 (15) ms |
| $\kappa$ | 3.3 (0.3) lapses | 75 (7) ms |
| $\varphi$ | 2.3 (0.3) h | 2.5 (0.2) h |
| $\tau_{LA}$ | 7.0 (1.7) d | 7.0 (2.6) d |
| $L_0$ | 0.0 (0.0) lapses | 140 (14) ms |
| $M_0$ | 9.86 (1.80) g$^{-1}$ | 3.59 (0.66) g$^{-1}$ |
| $k_0$ | 0.49 (0.17) h$^{-1}$ | 0.49 (0.17) h$^{-1}$ |

TABLE 1-continued

| Parameter | Lapse | Mean RT |
|---|---|---|
| Z | 1.63 (1.61) g$^{-1}$ | 1.63 (1.61) g$^{-1}$ |
| k$_a$ (capsule) | 2.06 (0.36) h$^{-1}$ | 2.06 (0.36) h$^{-1}$ |
| k$_a$ (gum)$^{21}$ | 3.21 (0.78) h$^{-1}$ | 3.21 (0.78) h$^{-1}$ |

In at least one embodiment, different types of caffeine sources have different absorption rates k$_a$ for use in alternative embodiments, where the user selects (or indicates) the type and amount of the caffeine being ingested.

In at least one embodiment, the system and/or method adjust the above variable (or parameter) weights based on PVT testing. There are different approaches for how the system may perform the adjustments, including post hoc individualization, Bayesian learning, and real-time recursive model individualization. U.S. Pat. App. Pub. No. 2018/0289314-A1, published on Oct. 11, 2018, provides a discussion of post hoc individualization, Bayesian learning, and real-time recursive model individualization, which sections are hereby incorporated by reference. This patent publication also discusses the number of PVT measurements required to learn an individual's trait-like response to sleep loss and the impact of PVT measurement frequency on model individualization, which sections are also hereby incorporated by reference.

c. Optimization Method for Future Caffeine Consumption

Figure 1A:
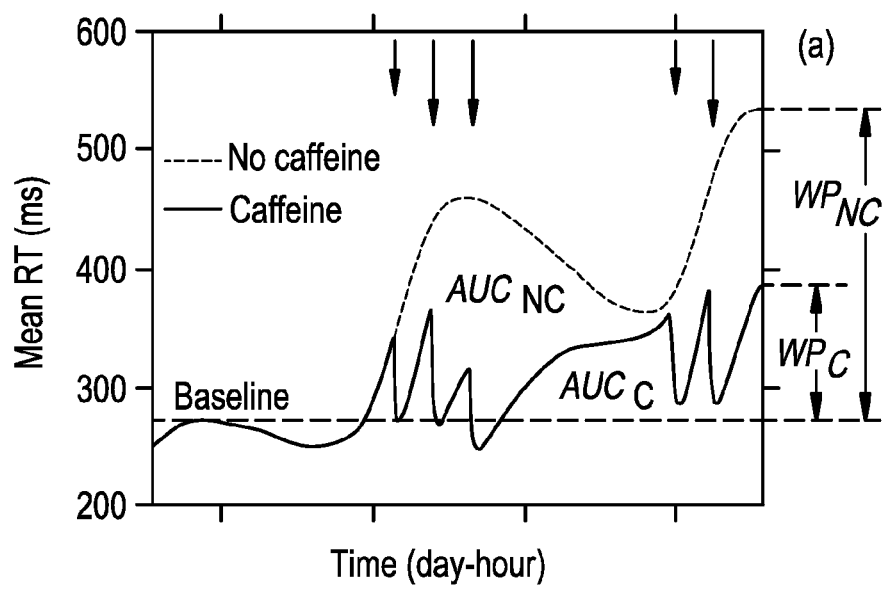
FIG. 1A illustrates PVT mean reaction times predicted by an alertness impairment model according to at least on embodiment of the invention.
Figure 1B:
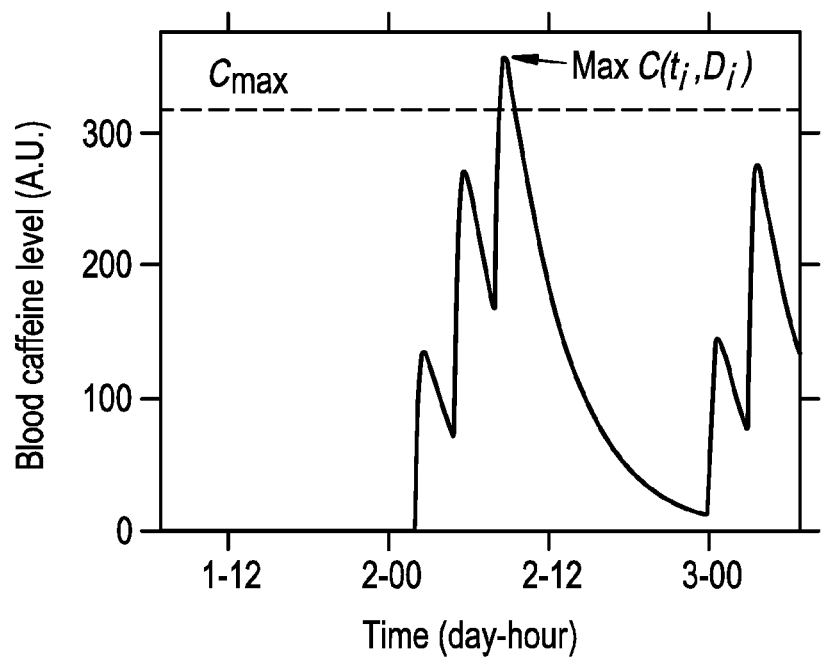
FIG. 1B illustrates the alertness impairment model predicted caffeine level in the blood for the same arbitrary strategy illustrated in FIG. 1A according to at least one embodiment of the invention.

In at least one embodiment, the system and method include an optimization for a caffeine-dosing strategy that strives to minimize neurobehavioral performance impairment based on the PVT for a given sleep-wake schedule and at least one period of peak alertness. The optimization may use an alertness model set for the average population (or subset of the population) or individual based on prior training of the alertness model, for example, where the alertness model may be based on Eq. 1 or any other alertness model. The optimization approach seeks to minimize a score from an objective function Z (Eq. 9), which considers both the area under the alertness impairment model-predicted PVT mean RT curve (AUC$_C$) (or average performance level term) that is above the baseline, and the worst performance (WP$_C$) (i.e., the difference between the peak of the mean RT curve and the baseline) (or spike of poor performance level term) as illustrated in FIG. 1A.

$$\min_{t_i, D_i} Z = 50 \frac{AUC_C(t_i, D_i)}{AUC_{NC}} + 50 \frac{WP_C(t_i, D_i)}{WP_{NC}} + 250 \max\{C(t_i, D_i) - C_{max}, 0\} \quad (9)$$

where the optimization variables $t_i$ and $D_i$ represent the time (in hours from the first wake-up time in the schedule) and the caffeine amount (in mg) of dose i, respectively, with i=1, 2, . . . , n (the number of doses), and C(t$_i$, D$_i$) denotes the level of caffeine in the blood. The subscripts C and NC denote caffeine and no caffeine, respectively. The last term penalizes the objective function when the maximum value of C(t$_i$, D$_i$) is higher than the maximum caffeine level achieved by a single dose of 400 mg, denoted by C$_{max}$ (FIG. 1B). The penalty term, in at least one embodiment, protects the individual from excessive caffeine consumption. In an alternative embodiment, the maximum caffeine level C$_{max}$ is adjusted for any number of circumstances to a different level, but for the purposes of explanation this disclosure uses 400 mg. In a further alternative embodiment, the caffeine penalty term is omitted from the function and/or set to account for maximum caffeine consumption in a consumption time period(s) (e.g., 24 hours). In an alternative embodiment, the weights for the AUC$_C$ and WP$_C$ terms are adjusted based on input from the user (or alternatively set at different levels) as to whether an average cognitive performance level or avoidance of spikes of poor cognitive performance when compared to a baseline are more desired over the course of the sleep-wake schedule.

In at least one embodiment there are a variety of optional constraints regarding the caffeine doses in terms of allowed levels, dosing times, time between doses, total amount of caffeine, and/or total number of doses. In a particular implementation, the constraints may be used in a variety of combinations including being omitted. Additionally, the below described constraints provide an example of how the constraints may be set. The allowed doses D$_i$ may be set at multiple levels, for example, 100, 200, and 300, but alternatively the doses could be set to the doses of the available caffeine options, for example, using the serving size of the options. The allowed dosing times t, could be set at different intervals, such as the number of hours since waking up, or beginning of the schedule, such that t$_i$ would be selected from 1, 2, . . . , t$_t$ hours, where t$_t$ is the total number of hours in the sleep-wake schedule. In an alternative embodiment, the time intervals could be tenths of hours, sixths of hours, thirds of hours, halves of hours or some multiple of hours with one trade-off being additional computation time and an adjustment of the equation to reflect the change in time intervals. Similarly, the time between doses may be other than one-hour gaps, where $t_{i+1} - t_i \geq 2$, for i being selected from 1, 2, . . . , n-1, where $n \leq n_T$ so that n$_T$ denotes the maximum number of doses although the inequality symbol could be replaced by the equality symbol. The total amount of caffeine may be based on $\Sigma_i D_i \leq D_T$, where D$_T$ denotes the maximum total caffeine intake although the inequality symbol could be replaced by the equality symbol.

As the baseline mean RT, the highest predicted value of mean RT is used when an average individual has no sleep debt, wakes up at 07:00 and is awake for 16 hours. AUC$_C$ and WP$_C$ are normalized by the corresponding values for the predicted mean RT curve without caffeine consumption, AUC$_{NC}$ and WP$_{NC}$, respectively. In addition, an optional penalty (or constraint) term in the objective function Z is included to limit the accumulation of caffeine in the blood [C(t$_i$, D$_i$)], which could result in unsafe caffeine consumption in view of recent studies. This optional term penalizes the score when the maximum level of caffeine in the blood is higher than the maximum level (C$_{max}$) achieved by a single 400-mg dose, as mentioned above the value of C$_{max}$ can be readily changed in the function. Hence, without considering the penalty term, the score varies from 0 (for a strategy that consistently maintains the mean RT below the baseline) to 100 (for a strategy that is no better than using no caffeine). Therefore, the smaller the score, the better the dosing strategy is.

The optimization variables are the time (t$_i$) and caffeine amount (D$_i$) of dose i, with i=1, 2, . . . , n (the number of doses used in the strategy). To obtain solutions in a practical computational time, the following constraints on the optimization variables are used: (i) D$_i$ was restricted to 100, 200 or 300 mg of caffeine (alternatively, the dosage levels may match available dosages or multiples thereof); (ii) the dosing time was restricted to occur on the hour (e.g. 18:00, 22:00 and 24:00); and (iii) the minimum time between doses was 2 hours. The minimum time between doses excluded strategies that prescribe doses too often, which could be too burdensome to follow in practice, but the minimum time may be set at other intervals based on the particular implementation, operational setting (e.g., operating a security desk versus being away from ready sources of caffeine). Two additional optional constraints are included to obtain solutions with a desired total amount of caffeine or number of doses. In a further or an alternative embodiment, a constraint is that a caffeine dose is not set for a period of time when the individual is scheduled to be sleeping. In a further embodiment, an additional constraint is a period of time before the individual is schedule to be sleeping is also not available for a caffeine dose. In at least one embodiment to the prior caffeine embodiments, when a test point places a dose during a sleep period, then the dose is relocated to when or after the sleep period ends. The objective function Z in Eq. 9 is a nonlinear function of $t_i$ and $D_i$, which in turn are discrete variables. Thus, the optimization problem is a mixed integer nonlinear problem (MINLP).

Standard algorithms for solving MINLPs (i.e., branch-and-bound and simulated annealing) were not able to solve the optimization problem in Eq. 9 in a reasonable computational time. To address this issue, an approximate solution was developed using the tabu search algorithm. Glover, *Future paths for integer programming and links to artificial intelligence*, Computers & Operations Research, vol. 13, pp. 533-549 (1986). The tabu search algorithm finds an optimal solution by evaluating the objective function Z at a number of test points in the neighborhood of a current solution and moving to the next tested point with the best solution. One feature of the method is how to select the next testing points. Although the selection of a large set of testing points may produce better results, this comes at the cost of higher computational times.

Figure 2A:
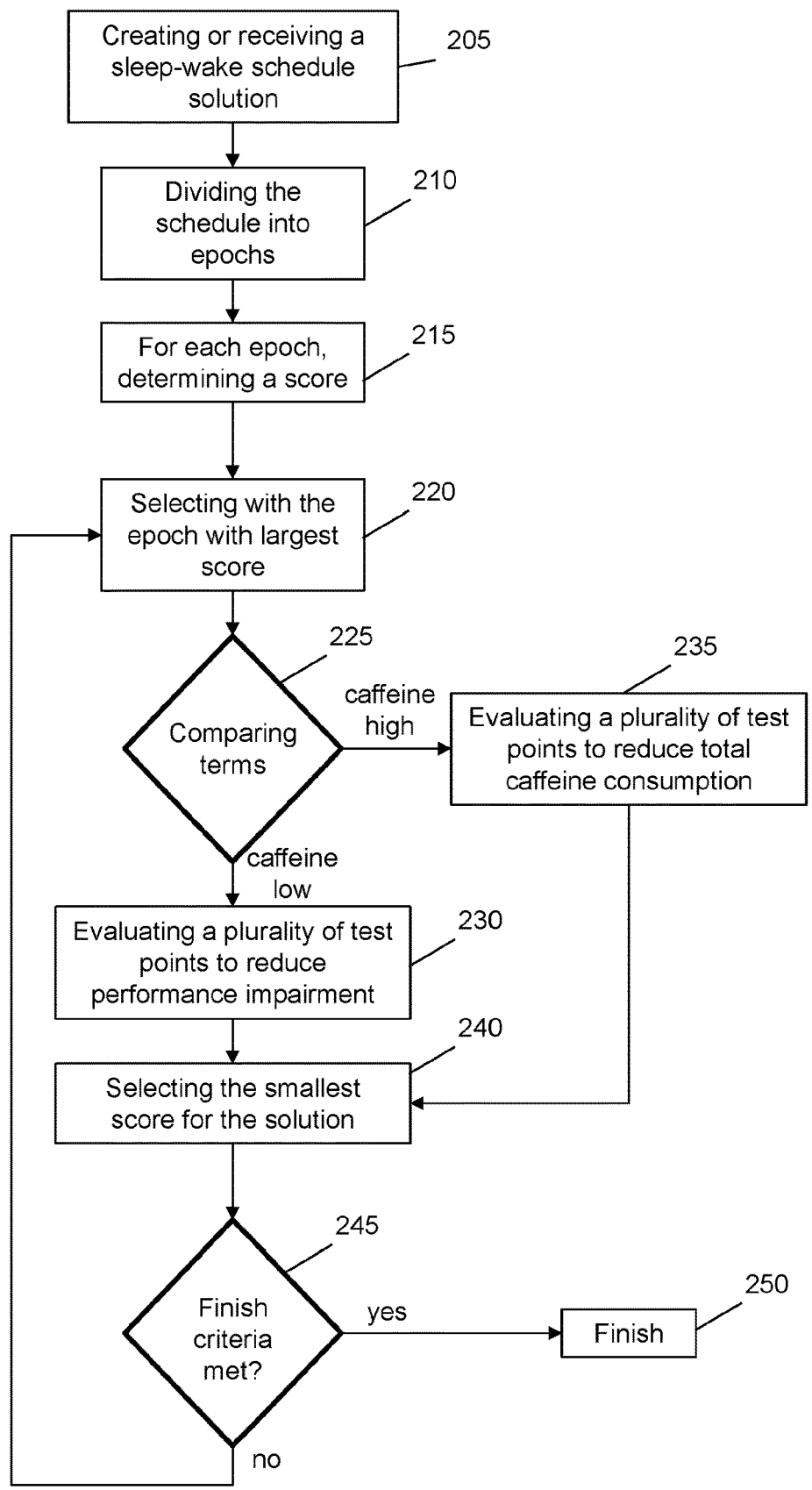
FIGS. 2A-2C illustrate alternative optimization methods for developing caffeine schedules according to multiple embodiments of the invention.
Figure 2B:
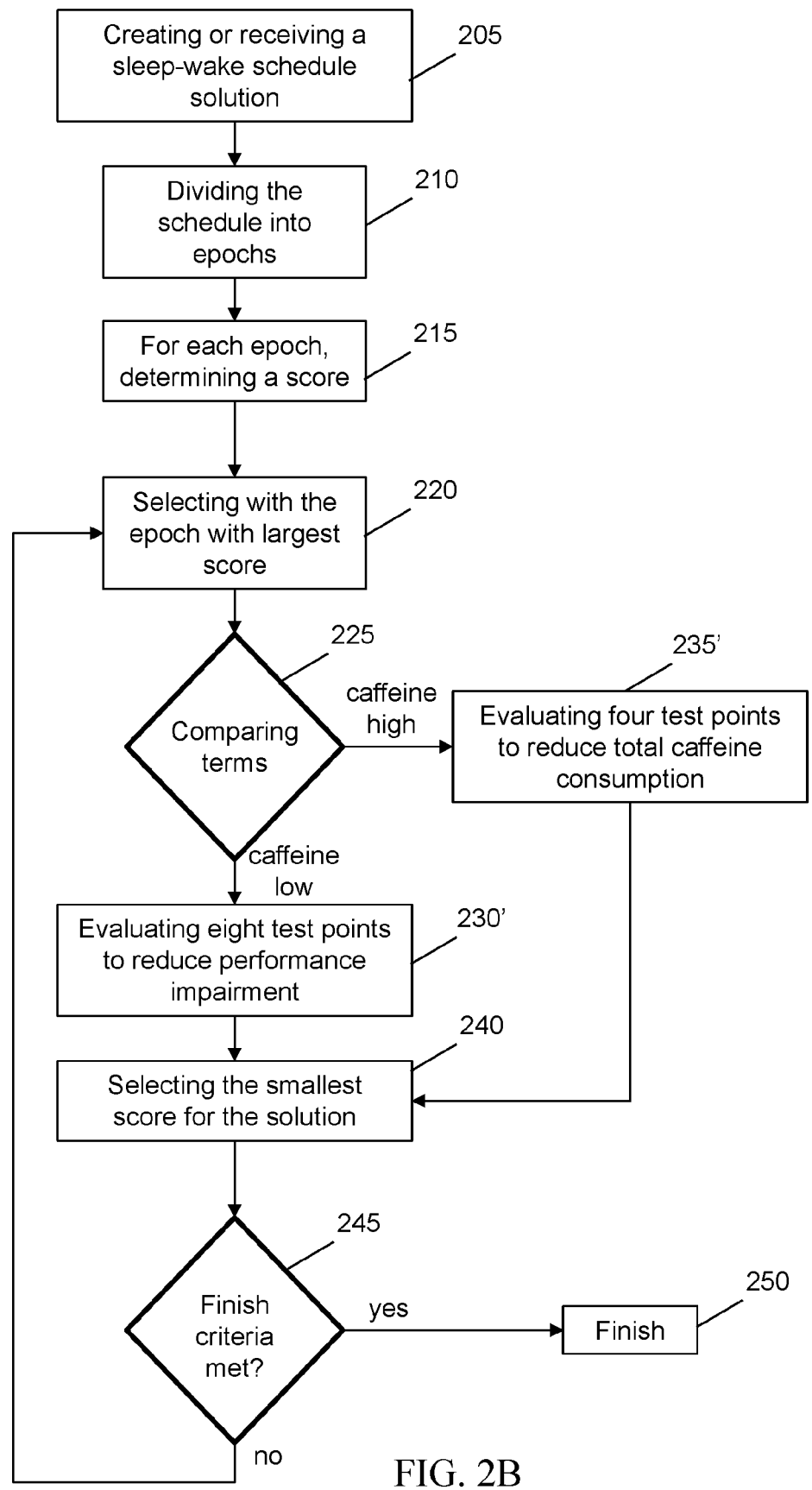
Figure 2C:
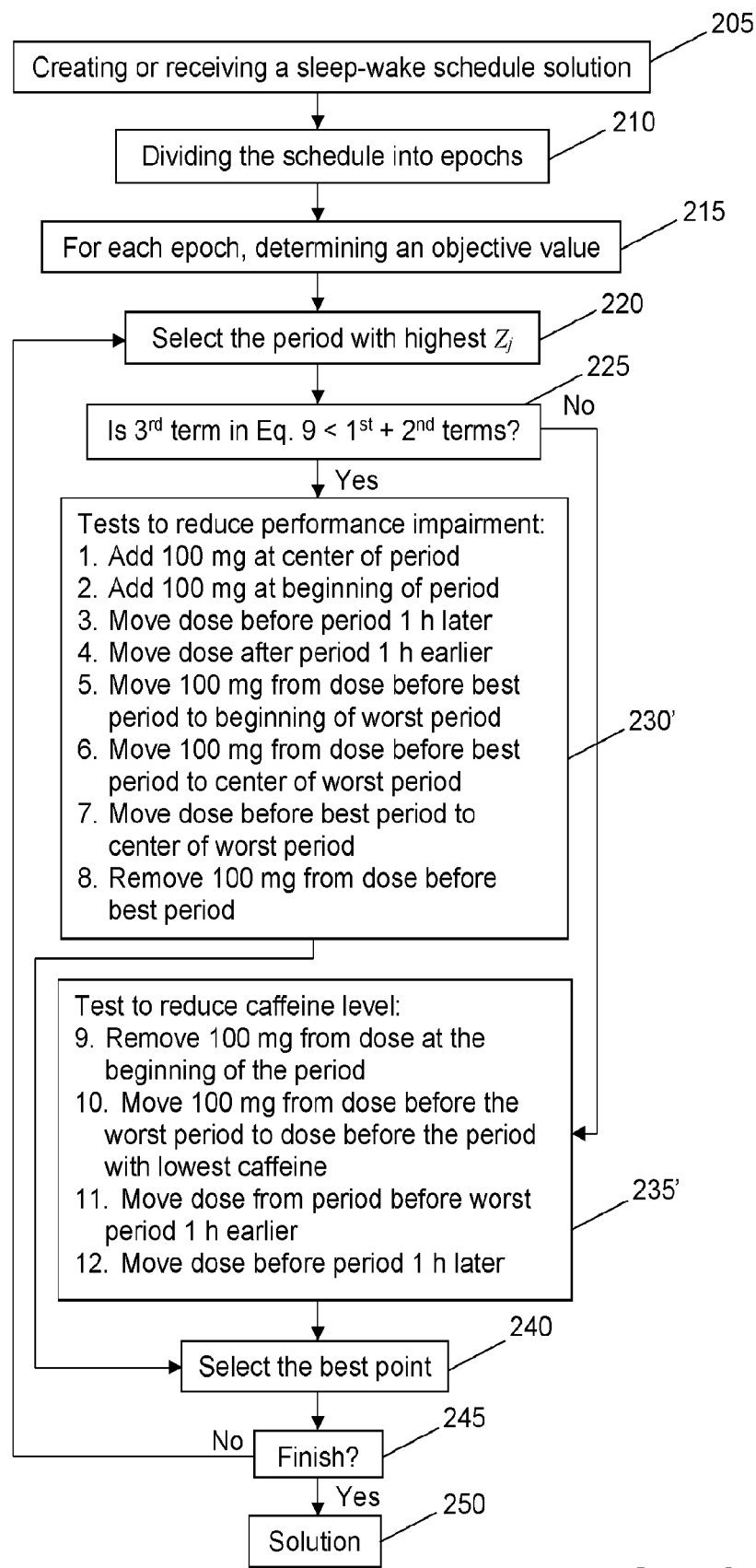
Figure 2D:
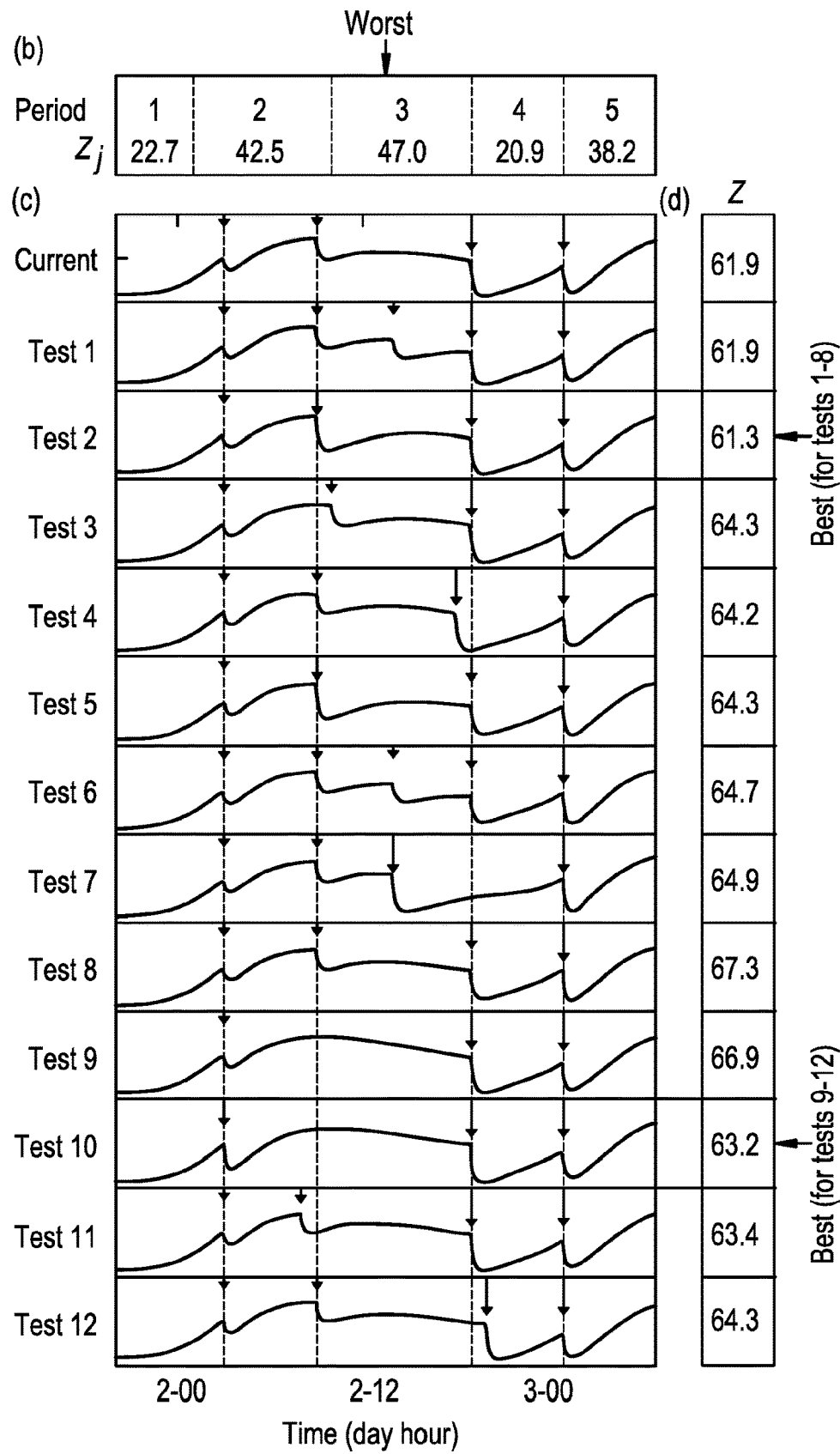
FIG. 2D illustrates an example of projected scores for a plurality of test points according to at least one embodiment of the invention.

FIG. 2A illustrates a method at a high-level for performing the optimization, while FIGS. 2B and 2C illustrate more detailed methods based on Eq. 9 and FIG. 2C illustrates particular test points. The methods begin with an initial solution (i.e., the alertness impairment prediction) having a sleep-wake schedule with at least one peak alertness period and a plurality of caffeine doses, 205. In at least one embodiment, the peak alertness period is associated with a desired maximum alertness impairment. The sleep-wake schedule is divided into a plurality of epochs, 210, for example, between caffeine doses throughout the sleep-wake schedule or during periods the individual is scheduled to be awake, distributed throughout the periods the individual is scheduled to be awake in the sleep-wake schedule, or evenly spaced through the sleep-wake schedule. In an alternative embodiment to the above caffeine embodiments, any period in which peak alertness is desired, that period is its own epoch. For each epoch, determining a score (in FIG. 2C—$Z_j$), 215, using the above-described alertness impairment model including any alternatives, for example, using the alertness impairment model in conjunction with Eq. 9 before selecting the epoch with the largest score, 220. The largest score is representative of the worst value in terms of alertness impairment for the individual. FIG. 2D illustrates periods between doses and the value of $Z_j$ in the corresponding epochs (or periods). The PVT mean response times are predicted by the alertness impairment model with the dotted lines indicating the dosing times for the current solution. In the illustrated epochs in FIG. 2D, epoch 3 is the worst epoch ($Z_j$=47.0).

As illustrated in FIG. 2A, when the average performance level term (or first term) plus the worst performing WP term (or second term) is greater than the penalty term (or third term), 225, then the method evaluates a plurality of test points to reduce the alertness impairment for the entire schedule or the at least one peak alertness epoch by producing a series of Z-scores for that schedule and at least one peak alertness epoch, 230. When this condition is not met, then the method evaluates a plurality of test points to reduce the total caffeine consumption level over the selected epoch by producing a series of Z scores for the entire schedule or the at least one peak alertness epoch, 235. Each test point produces one score for the entire schedule or the at least one peak alertness epoch. FIGS. 2B-2D illustrate the method in at least two embodiments, for example using eight test points to reduce performance impairment, 230', and four test points to reduce caffeine levels, 235'. In at least one embodiment, the number of test points is in a range of 2-16, in a range of 4-14, or in a range of 6-10. FIG. 2D illustrates new caffeine dosages where the small, medium and large arrows at the top of each subplot represent 100, 200, and 300 mg doses, respectively, as used in the test points prescribed by the first eight test points for reducing performance impairment while the last four test points are for reducing the total caffeine consumption. Along the right side of FIG. 2D, the resulting Z-scores for each test point are shown with an indication as to the best test point for each of the test point groups.

In at least one embodiment where there are multiple peak alertness epochs, the score is based on a sum of the (Z) scores across the peak alertness epochs or an at least one peak alertness average of the (Z) scores over the alertness peak epochs. In a further embodiment, the different alertness peak epochs can be weighted. In an embodiment further to the last two embodiments, when a desired maximum alertness impairment is provided/used, the desired maximum alertness impairment serves as the baseline. The weights used between the cognitive performance terms used for the maximum alertness impairment baseline may be different from the weights used for the score evaluation. This weight adjustment is useful if it is desired to minimize the time above the maximum alertness impairment in the resulting solution. In a further embodiment, there is a weighted combination of the alertness impairment baseline (Z) scores and the straight (Z) scores.

FIGS. 2A-2C illustrate selecting the smallest (Z) score for the selected epoch for the solution, 240. Or alternatively, the test point that provides the smallest (Z) score at the end of the sleep-wake schedule solution is selected. Repeating the selection, evaluation, and selection steps again unless a prespecified number of iterations has been reached and/or no more mathematical feasible solutions are left, 245, 250. In at least one embodiment, the number of iterations is set to 2,000, which provides a compromise between the optimality of the solution and the computational time. In other embodiments, the number of iterations is any number from 500 to 100,000, any number from 1,000 to 10,000, any number from 1,000 to 5,000, any number from 1,250 to 3,000, or any number from 1,500 to 2,500. In at least one embodiment with the desired maximum alertness impairment, the method will find a satisfactory solution when the predicted (Z) scores in each peak alertness epoch meets this constraint. In a further embodiment when the earliest peak alertness epoch meets the desired maximum alertness impairment, then that epoch and all earlier epochs are locked for the solution and removed from being selected or modified as part of any future test points. In at least one embodiment, "no more mathematical feasible solutions" is satisfied when there are no test points left that do not violate the constraints, the score Z does not decrease any more, and/or all the test points produced previously tried solutions. In a further embodiment, the last three embodiments together, individually or in different combinations provide the parameters on which "no more mathematical feasible solutions" is determined.

In a further embodiment, the method includes removing the evaluated test points or the test point with the smallest (Z) score from future evaluation iterations.

In at least one further embodiment to the above caffeine embodiments, the system receives (or obtains) 1) the recent past (e.g., previous seven days) sleep and caffeine history and 2) a time(s) there is a desired peak alertness in the future. The system may also receive (or obtain) any combination of the future sleep schedule for the individual, the maximum alertness impairment during any peak alertness time periods, the total maximum caffeine allowed in a 24-hour period (e.g., 1,000 mg), and the types of desired caffeine consumption. This information serves as inputs into the solution model.

In at least one embodiment, the creation of the future sleep-wake schedule and caffeine doses is based on information received about the individual or the projected schedule assumes the individual is awake between now and the future time. In at least one embodiment, the processor is configured to predict the alertness impairment at the future time where the individual is projected as maintaining recent sleep patterns between now and the future time where recent sleep patterns are based on stored activity data. In at least one embodiment, a projected sleep history is based on the average bedtime and the average wake-up time for the last x number of days (where x is any number between 1 and 15) is used for determining when future sleep will occur. In at least one embodiment, where the individual's schedule is accessible by the system, reviewing the individual's calendar to see if there are any time commitments that might interfere with sleep patterns and/or caffeine doses between the current time and the future time. In a further embodiment, the system may insert a caffeine dose at the start of the individual's work day or during a breakfast meeting. In a further or alternative embodiment, the average time of caffeine consumption during a particular 24-hour period over the last x number of days may be used to add future caffeine doses to the projected sleep-wake schedule. In at least one embodiment, the projected schedule is modified or corrected by or for the individual prior to optimization as part of a review by the individual. Or alternatively, the sleep-wake and caffeine schedule for the individual is received, for example from the individual's input via a system interface as discussed later or set based on received group schedule information, for example, for a workforce or a team. Further to the above embodiments, the source of the projected sleep-wake schedule is from another model such as the sleep schedule model discussed later in this disclosure.

In at least one embodiment, when the previously used sleep-wake schedule is not met, then the system and/or method can intake corrections to and/or a new sleep-wake schedule to run a new optimization for a sleep-wake schedule and/or caffeine consumption schedule. The sleep-wake schedule used can use the previous solution's caffeine consumption schedule (assuming no overlaps with a sleep period) as a starting point. Alternatively, the projected caffeine consumption can be adjusted for the individual, for example, based on received input, calendar information, elimination and/or relocation of any caffeine consumption that interferes with a sleep period, and/or a replacement sleep-wake schedule from a sleep schedule model.

In at least one embodiment, when the individual misses a scheduled caffeine consumption either completely, by a time greater than a consumption time threshold, or of a different consumption type/amount, the method allows the proposed caffeine consumption for the individual to be updated and a new optimization run to provide a new solution for the individual.

In at least one embodiment, the plurality of test points to reduce alertness impairment includes adding a new dose to a center of the epoch, adding a new dose to a beginning of the epoch, adding a new dose to one hour before the epoch, adding a new dose to one hour after the epoch, moving the dose to a beginning of the worst epoch from before the best epoch, adding a new dose to a center of the worst epoch from before the best epoch, and/or removing the dose before the best epoch. In an alternative embodiment, one or more of these test points are omitted and/or replaced by other additions or dose movements. In at least one embodiment, when a test point is not possible, then omitting it from evaluation on the current iteration. As discussed previously, the timing of the doses may also be altered if there are different constraints used or there is a conflict with a scheduled sleep period.

In at least one embodiment, the plurality of test points to reduce caffeine level include removing a portion of the dose at the beginning of the epoch, reducing the dose before the worst epoch and adding the amount of the dose reduction to the dose before the epoch with a lowest caffeine consumption, moving the dose from epoch before worst epoch one hour earlier, and moving the dose before selected epoch one hour later. In an alternative embodiment, one or more of these test points are omitted and/or replaced by other additions or dose movements. In at least one embodiment, when a test point is not possible, then omitting it from evaluation on the current iteration. As discussed previously, the timing of the doses may also be altered if there are different constraints used or there is a conflict with a scheduled sleep period.

In another embodiment, there are a plurality of objective scoring functions Z, for example based on Eq. 9, used over the projected sleep-wake schedule solution to allow for different weights and/or different constraints to be used depending on the goals for the cognitive performance over the projected schedule.

In at least one embodiment, the system will use the generated schedule solution to provide reminders to the individual to consume caffeine and/or sleep. The caffeine consumption reminders may include type and/or amount (e.g., servings or raw milligrams). The system includes an interface for the individual to provide confirmation of caffeine consumption and/or sleep. In a further embodiment, the system will detect sleep through one or more sensors, for example, including a wrist-worn actigraph and/or accelerometer(s) with suitable processing capability. In at least one embodiment, when the caffeine consumption and/or sleep differs from the schedule solution in excess of a predetermined threshold, the system will run another optimization using the new data.

d. Sleep Latency

A possible association between sleep latency and alertness impairment was suggested by Akerstedt and Folkard in 1996. Sleep-latency data from 8 previously published sleep studies providing 89 distinct time points from 128 subjects as discussed in the Validation Section of this disclosure was used to test this possible association. In at least one embodiment, Eq. 10 is used to describe the association between sleep latency (SL) and alertness impairment P:

$$SL(t)=A_{SL}e^{-k_{SL}P(t)}, \quad (10)$$

where t denotes the time of day (in hours), $A_{SL}$ represents a scaling factor (in minutes) and $k_{SL}$ denotes the rate at which SL decreases with P (in ms$^{-1}$). Thus, to predict SL at a given time t, an alertness impairment model is used to predict P(t) for the corresponding sleep/wake schedule. In at least one embodiment, the alertness impairment model is the one discussed above in this disclosure. The values of $A_{SL}$ and $k_{SL}$ were estimated by fitting the predictions of the sleep-latency model (Eq. 10) to one study (Study D1, FIG. 3A) data and then the model was validated by comparing its predictions to experimental values obtained from seven other studies (Studies V1-V7) providing 75 data points as discussed later in this disclosure. The estimates (and standard errors) for the scaling factor $A_{SL}$ and rate constant $k_{SL}$ were 272.4 (58.5) min and 0.012 (8.1×10$^{-4}$) ms$^{-1}$, respectively.

e. Sleep Duration

Figure 4D:
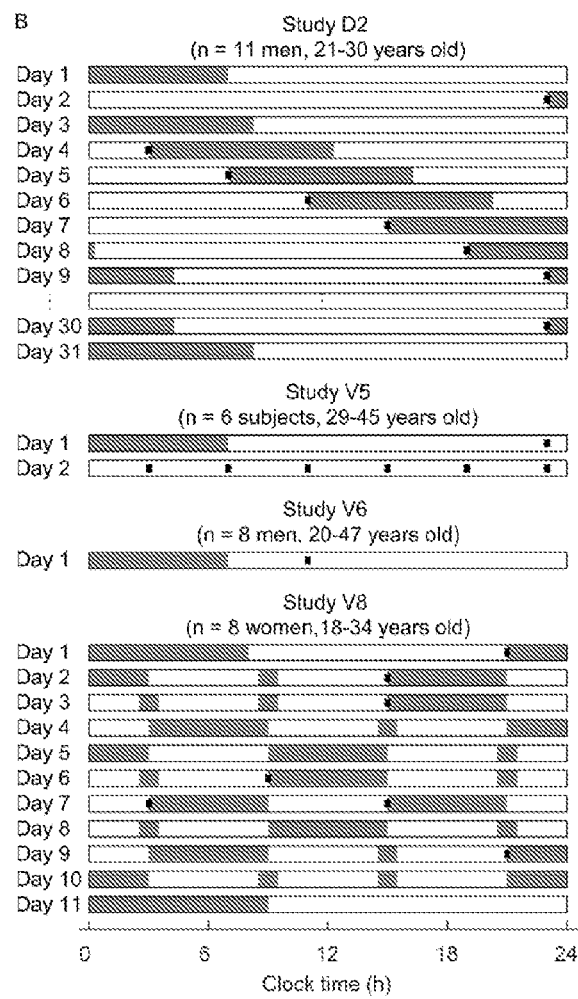
FIG. 4D shows sleep studies used to develop and validate a model to predict sleep duration.
Figure 4A:
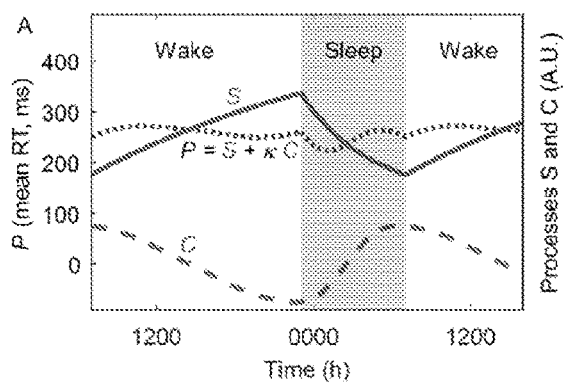
FIG. 4A illustrates an example of predicted alertness impairment P.
Figure 4B:
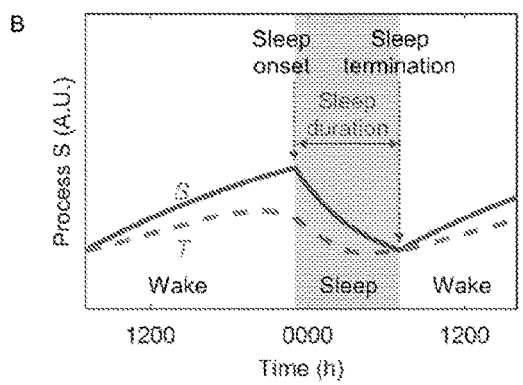
FIGS. 4B and 4C illustrate the interaction between components S and T for predicting sleep duration.

Referring now to FIG. 4B, sleep duration was determined as the period between the time of sleep onset (left dotted arrow) and the time at which the homeostatic process S (solid line) intersected with the sleep termination threshold T (dashed line) (dotted right arrow) following the procedure proposed by Borbely in 1982. In at least one embodiment, the threshold T was defined as a function of the circadian process C:

$$T(t)=A_{SD}-\kappa_{SD}C(t+\varphi_{SD}), \quad (11)$$

where t denotes the time of day (in hours), $\kappa_{SD}$ represents the amplitude of the threshold T (in ms), $\varphi_{SD}$ indicates a phase shift of the individual's circadian rhythm (in hours) of the threshold T with respect to process C, and $A_{SD}$ denotes a constant (in ms) whose value is set so that process S reaches T at 0700 after sleep onset at 2300 under rested conditions. The parameters $\kappa_{SD}$ and $\varphi_{SD}$ were estimated by fitting the predictions of the sleep-duration model (Eq. 11) to experimental data from one study that had the subjects complete 21 to 25 cycles of forced desynchrony, each consisting of a wake period of 18 hours, 40 minutes and a sleep period of 9 hours, 20 minutes, during which they remained in bed in darkness and slept in one or more bouts. To simulate these conditions, the sleep-latency model (Eq. 10) was used to predict how long the subjects would remain awake between bouts of sleep. To illustrate the procedure, suppose that an individual falls asleep at the start of the sleep period, and wakes up when process S intersects with threshold T in the middle of the period. At this point, we use the sleep-latency model to predict when the subject will fall asleep again; if the subject falls asleep before the end of the sleep period, this initiates another bout of sleep whose duration is determined by either the next intersection of processes S and T or the end of the period. The sleep duration for the period will then be the sum of the durations of all bouts within the period. The sleep-duration model was validated by comparing its predictions to experimental values obtained from three of the seven studies used for sleep latency, which together provided 18 data points, as discussed later in this disclosure.

To predict sleep duration, the parameters of the sleep-termination threshold T (Eq. 11) were estimated by fitting the predictions of the sleep-duration model to the experimental values obtained from Study D2 (FIG. 4D). The estimates (and standard errors) for the circadian amplitude $\kappa_{SD}$ and the phase shift $\varphi_{SD}$ were 41.2 (3.8) ms and 2.0 (0.2) hours, respectively. The value of the constant $A_{SD}$ (211.6 ms) was determined so that the homeostatic process S reached the threshold T (with $\kappa_{SD}$=41.2 ms and $\varphi_{SD}$=2.0 h) at 0700, after sleep onset at 2300 under rested conditions (i.e., no sleep debt).

f. Sleep-Wake Schedule Optimization Model

In at least one embodiment, the system and method include an optimization for providing a sleep-wake (sleep-work) schedule that strives to minimize neurobehavioral performance impairment based on the PVT for a given sleep-wake schedule and at least one period of peak alertness. The optimization may use an alertness impairment model set for the average population (or subset of the population) or individual based on prior training of the alertness model, for example, where the alertness impairment model may be based on Eq. 1A or 1B or any other alertness impairment model. In at least one further embodiment, the optimization will use the above discussed sleep latency and sleep duration models to optimize the schedule recognizing that scheduling a sleep period when an individual may not be prone to fall asleep or sleep for a sufficient amount of time may be counterproductive.

Figure 5A:
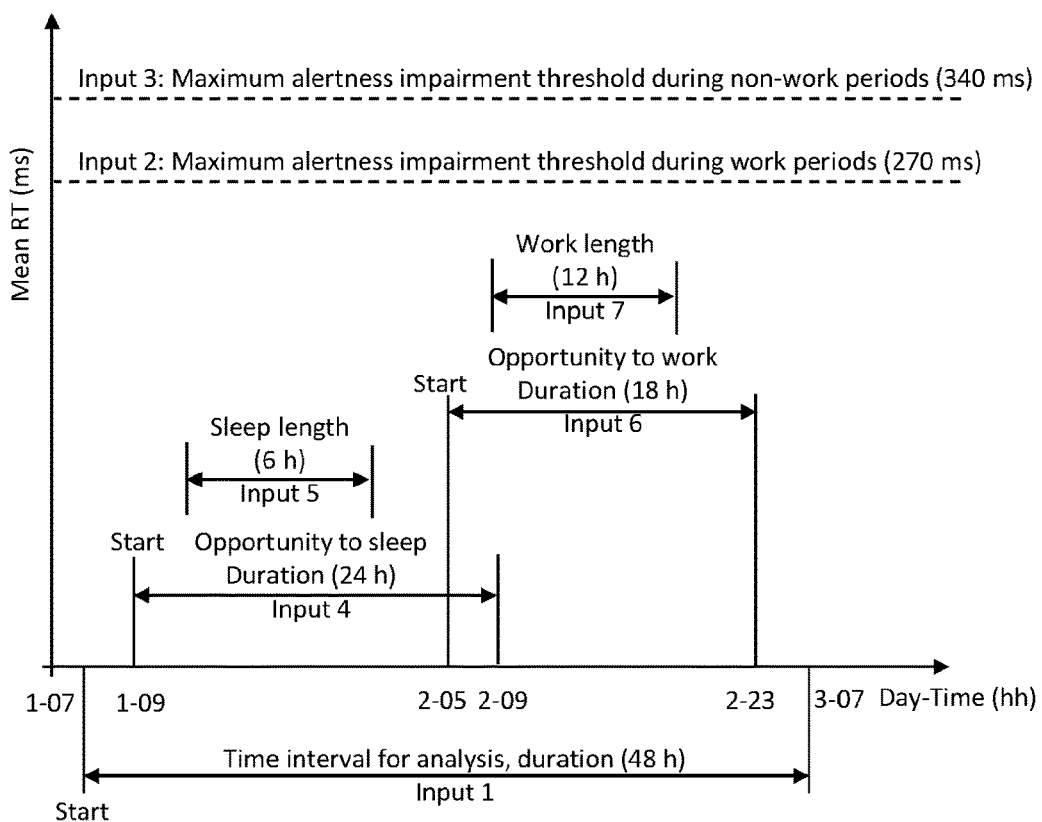
FIG. 5A illustrates a framework for discussing at least one embodiment according to the invention.

FIG. 5A illustrates an example of constraints that might be used in this optimization model. Potential inputs include: 1) time interval for analysis (start and end (or duration)), 2) maximum alertness impairment threshold during work periods, 3) maximum alertness impairment threshold during non-work periods, 4) opportunity to sleep periods (start and end (or duration) for each period), 5) maximum sleep length for each opportunity to sleep period, 6) opportunity to work periods (start and duration for each period), and 7) work length for each opportunity to work period. In at least one embodiment, input 5 is the total time allowed for sleep within an opportunity to sleep period because an individual may not always be able to remain asleep for the entire allowed time because of physiological constraints imposed by their respective sleep history and circadian rhythms, for example, as predicted by the sleep latency model and/or the sleep duration model. The actual work and sleep periods depending on constraints of the particular situation may occur at any point during the work and sleep opportunities. Although FIG. 5A illustrates a time interval less than two days, the interval could be longer with multiple opportunities and periods for work and sleep. In alternative implementations, some of the inputs may be fixed such as when the work period is or not applicable such as a maximum alertness impairment threshold during non-work periods. If the model is provided constraints regarding work or sleep, then the model is able to optimize the other. Also, as illustrated in FIG. 5A, it is possible that the work and sleep opportunities may overlap. In other situations, the individual may not be constrained as to exact work times given the nature of their work such as freelance or professional workers.

Figure 5B:
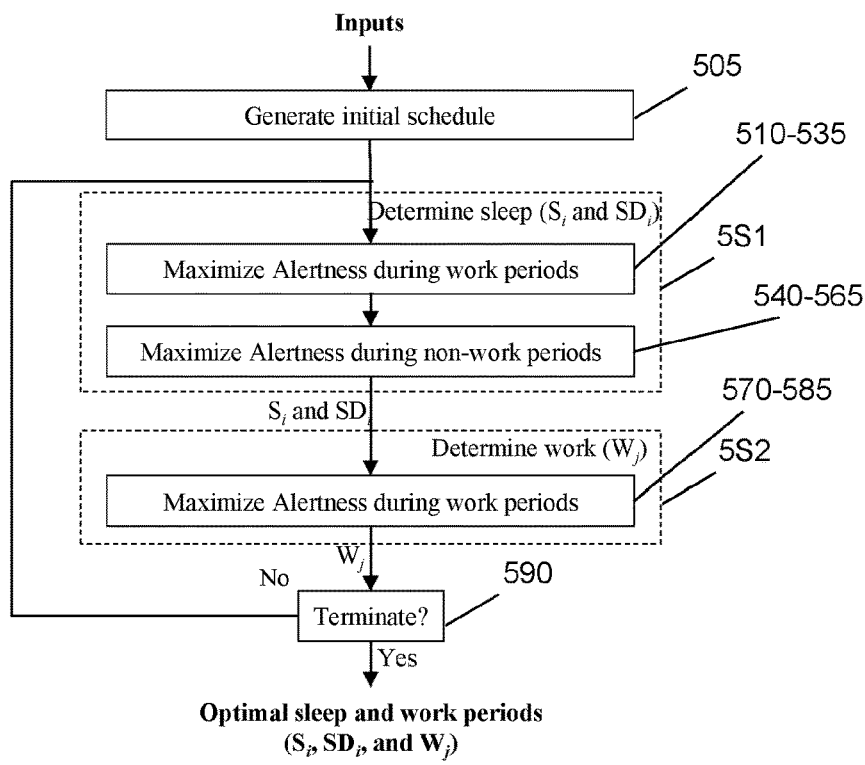
FIG. 5B illustrates an overview of at least one embodiment according to the invention.

As illustrated in FIGS. 5B-5E, the method iteratively searches for the optimal values of the start ($S_i$) and duration ($SD_i$) of each sleep period i, as well as the value of the start ($W_j$) of each work period j such that alertness is maximized during all work periods. The start ($S_i$), the duration ($SD_i$), and the work start ($W_j$) are examples of schedule parameters. In at least one embodiment as illustrated in FIG. 5B, an initial schedule is received or created, 505, before two stages: 1) determine the values of $S_i$ and $SD_i$ for each sleep period i that maximize alertness during each work period j, which starts at $W_j$, 5S1 (510-565), and 2) for the updated values of $S_i$ and $SD_i$ of each sleep period i, determine the value $W_j$ for each work period j that maximize alertness during each work period j, 5S2 (570-585). The improvement for alertness in at least one embodiment is measured by the area under the alertness impairment model-predicted PVT mean RT curve (AUC) (or average performance level term) with a further embodiment using the AUC that is above a baseline or desired lowest alertness impairment for a particular period. In an alternative or further embodiment, a Z-score(s) is calculated as discussed above to select periods to be analyzed and/or the test point to select. The methods illustrated in FIGS. 5C-5E may make use of AUC and/or the Z-score(s).

In at least one embodiment, the method stops when no further improvement is achieved (or, alternatively, no mathematical feasible solutions are left) or a maximum number of iterations has been reached. In at least one embodiment, the number of iterations is set to 2,000, which provides a compromise between the optimality of the solution and the computational time. In other embodiments, the number of iterations is any number from 500 to 100,000, any number from 1,000 to 10,000, any number from 1,000 to 5,000, any number from 1,250 to 3,000, or any number from 1,500 to 2,500. The methods illustrated in FIGS. 5C-5E may make use of these determination criteria.

Figure 5C:
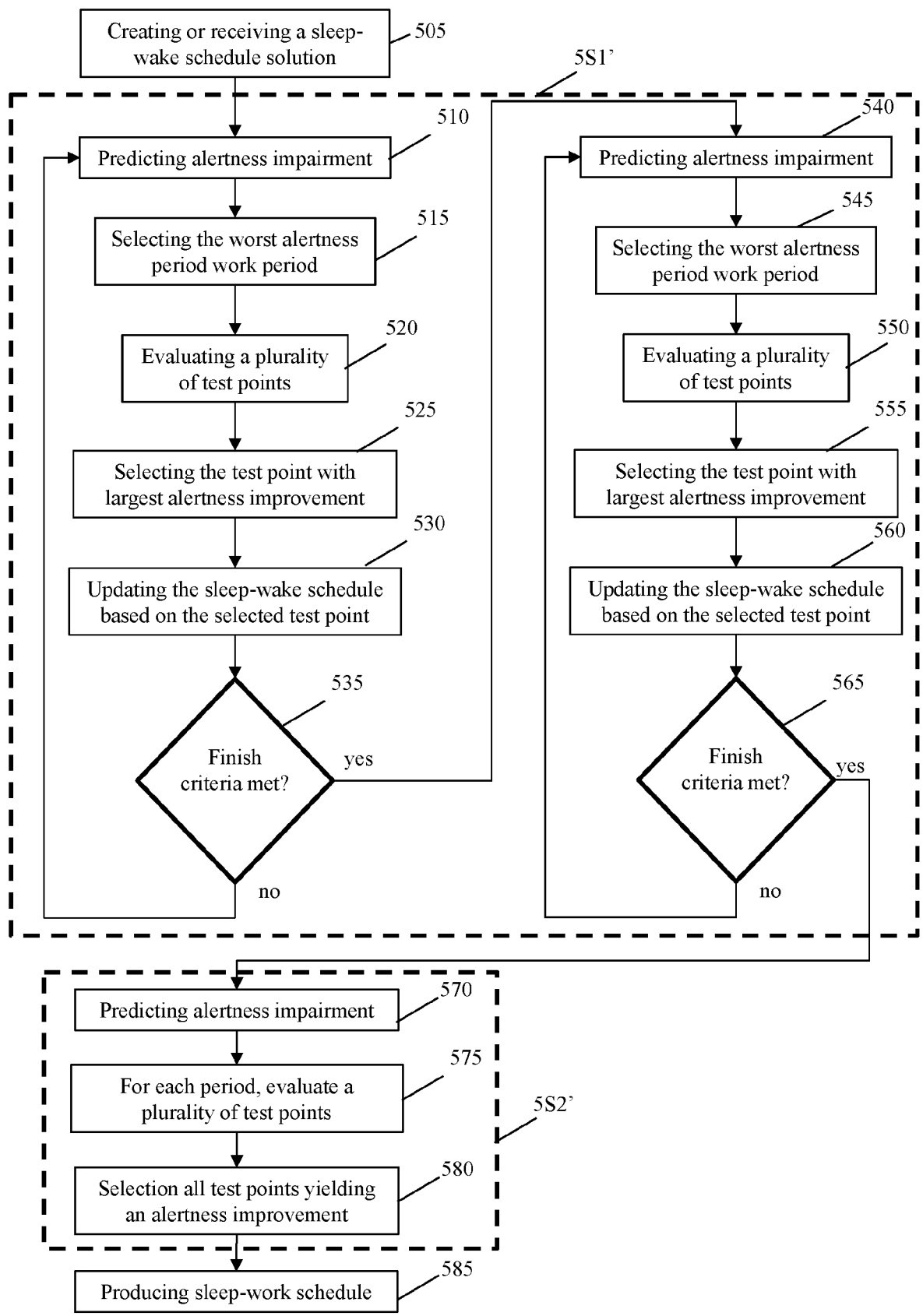
FIG. 5C illustrates one sleep-work schedule optimization method embodiment according to the invention.

FIG. 5B provides an overview of the stages, while FIGS. 5C-5E provide more detailed examples of these stages. In at least one embodiment, the tabu search approach discussed above for caffeine optimization may be applied to this iterative process.

FIG. 5C illustrates the two stages 5S1', 5S2'. An initial schedule with work and sleep periods is set for each respective opportunity, 505. Stage one begins with predicting the alertness impairment for the for the given values of $S_j$, $SD_j$, and $W_j$, 510. In at least one embodiment the predicted alertness impairment is made using the alertness impairment model discussed above. The wake period with the worst alertness impairment during work periods is selected, 515. In at least one embodiment, a Z-score is used. Using the selected wake period as the reference period, evaluating a plurality of test points, 520. In at least one embodiment, the test points include making adjustments to at least the sleep period immediately before the selected wake period, but in other embodiments may include making adjustments to the selected wake period or previous wake and/or sleep periods. In at least one embodiment, the number of test points is in the range of 4-16, in the range of 6-12, in the range of 6-10, or 8. The method selects the test point that yielded the largest alertness improvement (or largest alertness impairment reduction) for the selected wake period, 525. In at least one embodiment, the alertness improvement is measured by the reduction in the AUC for either the respective work period or the respective wake period in terms of alertness impairment, for example the alertness impairment predicted in step 510.

In at least one embodiment, the selected test point is used for the values of Si, $SD_i$, and $W_j$, 530. Alternatively, the schedule parameter(s) adjusted by the selected test point are updated, 530. Determining whether to repeat these steps or to continue to either an optional method for maximizing alertness during non-work periods of the wake periods, which in at least one embodiment use the steps discussed above but to maximize the alertness for non-work periods, or to stage 2 of the method, 535. In an alternative embodiment, if the test points included adjustments to the work periods, then the method may terminate after this level of optimization.

FIG. 5C illustrates the optional maximization of alertness during non-work periods of the wake periods. This portion of the method begins with predicting the alertness impairment for the for the given values of $S_i$, $SD_i$, and $W_j$, 540. In at least one embodiment the predicted alertness impairment is made using the alertness impairment model discussed above. The wake period with the worst alertness during non-work periods is selected, 545. In at least one embodiment, a Z-score is used. Using the selected wake period as the reference period, evaluating a plurality of test points, 550. In at least one embodiment, the test points include making adjustments to at least the sleep period immediately before the selected wake period, but in other embodiments may include making adjustments to the selected wake period or previous wake and/or sleep periods. In at least one embodiment, the number of test points is in the range of 4-16, in the range of 6-12, in the range of 6-10, or 8. In at least one embodiment, the number of test points may be different from the number used in step 520. The method selects the test point that yielded the largest alertness improvement (or largest alertness impairment reduction) for the selected wake period, 555. In at least one embodiment, the selected test point allows the near-optimal alertness during work periods, which in at least one embodiment means a change of less than 10% to the aggregate alertness level of the work period in that wake period being adjusted. The parameters adjusted by the selected test point are updated, 560. Determining whether to repeat these steps or to continue to stage 2 of the method, 565. In an alternative embodiment, if the test points included adjustments to the work periods, then the method may terminate after this level of optimization.

FIG. 5C illustrates stage 2 (5S1') of the method that in the illustrated embodiment is aimed at maximizing alertness during work periods. Stage 2 begins with predicting the alertness impairment for the for the given values of $S_i$, $SD_i$, and $W_j$, 570. In at least one embodiment the predicted alertness impartment is made using the alertness impairment model discussed above. In at least one embodiment, a Z-score is used. For each work or wake period K, computing alertness for multiple test points, 575. In at least one embodiment, the number of test points is in the range of 1-10, in the range of 1-8, in the range of 1-5, or 2. Selecting all test points that yield an alertness improvement for its respective set of test points and updating the respective work period, 580. In at least one embodiment, the alertness improvement is measured by the reduction in the area under the curve (AUC) for either the respective work period or the respective wake period in terms of alertness impairment, for example the alertness impairment predicted in step 570. In at least one embodiment, these steps are performed in an iterative loop as each work period is tested. In an alternative embodiment, the maximize alertness work period steps used in stage 1 are used instead in stage 2 with any sleep adjustments being replaced by work adjustments. The method then produces (or displays) the resulting sleep-work schedule, 585. In at least one embodiment, the results are stored in memory and/or is an input to the caffeine optimization method.

In an alternative embodiment, stage 2 may use a solution of the worse period and the steps using the test points as discussed in connection with stage 1 to produce the sleep-work schedule from stage 2.

FIGS. 5D and 5E illustrate an alternative embodiment for stages 1 and 2 (5S1″, 5S2″) of the optimization method that may be inserted into FIG. 5B. Based on this disclosure, one of ordinary skill in the art should appreciate that stages 1 and 2 may be exchanged between FIGS. 5C-5E along with any or all test points.

FIG. 5D illustrates stage 1 to determine sleep parameters for the initial sleep-work schedule from FIG. 5B. In this illustrated stage 1, the starting time of each work period j is fixed at $W_j$, and the goal is to find the values of $S_i$ and $SD_i$ for each sleep period i that maximize alertness during each work period j while reducing alertness impairment during non-work periods. Stage 1 includes two sub-sets of steps: subset A) determine the values of $S_i$ and $SD_i$ for each sleep period i that maximize alertness during each work period j, and subset B) determine the values of $S_i$ and $SD_i$ for each sleep period i that maximize alertness during all non-work periods, while maintaining the alertness during each work periods j close to the level achieved in subset A. Both subsets begin with predicting alertness impairment for given values of $S_i$, $SD_i$, and $W_j$, 510A, 540B. In at least one embodiment, a Z-score is used. In at least one embodiment, the alertness impairment model discussed above is used. Then, the predicted alertness impairments are used to identify the wake period with the worst alertness (i.e., the largest value of a weighted sum of the average alertness impairment and the peak alertness impairment) during the work period(s) within the wake period or during the non-work period(s), respectively, 515A, 545B. Alternatively, the worst alertness period is selected based on the AUC for that respective period.

The method predicts the alertness for a set of test points, 520A, 550B. In at least one embodiment, the test points are intended to increase the alertness during the work or non-work periods within the wake period with the worst alertness, respectively. In at least one embodiment, there are eight test points that make adjustments to sleep parameters. Examples of the plurality of test points include, but are not limited to, create a new predetermined time sleep period after a start of the existing sleep period, increase sleep duration by a predetermined time, increase the sleep period by a predetermined time, delay the sleep period after the reference work period by a predetermined time, decrease the sleep duration by a predetermined time and create a new predetermined time sleep period after the start of the sleep period, decrease the sleep duration in the sleep period after the reference work period by a predetermined time and add a predetermined time new sleep period after the reference work period, increase the sleep duration of the sleep period and decrease the sleep duration of a sleep period two sleep periods before the reference work period by a predetermined time, and/or increase the sleep duration of the sleep period by the duration of the sleep period two sleep periods before the reference work period while remove the earlier sleep period. In at least two embodiments, the predetermined time is 15 or 30 minutes although other time shifts may be selected including using different times for different test points. Another description of the test point examples is the following changes in the sleep periods (k indicates the sleep period immediately before the wake period with worst alertness): create a new half hour (or the predetermined time) sleep period after $S_k$, increase $SD_k$ by half hour (or the predetermined time), increase $S_k$ by half hour (or the predetermined time), decrease $S_{k+1}$ by half hour (or the predetermined time), decrease $SD_k$ by half hour (or the predetermined time) and create a new half hour (or the predetermined time) sleep period after $S_k$, decrease $SD_{k+1}$ by half hour (or the predetermined time) and create a new half hour (or the predetermined time) sleep period before $S_{k+1}$, increase $SD_k$ and decrease $SD_{k-1}$ by half hour (or the predetermined time), and increase $SD_k$ by $SD_{k-1}$ and remove sleep period k−1.

In at least one embodiment, if a test point places the sleep parameter into conflict with a constraint, then that test point is skipped for this step. Examples of those constraints include, but are not limited to, the minimum time between sleep periods is 6 hours; sleep is not allowed 2 hours before or after a work period; the duration ($SD_i$) of sleep period i should not exceed the predicted maximum sleep duration; if the predicted time that it takes an individual to fall asleep is longer than 15 minute using for example the sleep latency model, then the duration ($SD_i$) of sleep period i should be at least 1 hour using the sleep duration model; the sleep periods resulting from the change should be completely contained within the opportunity to sleep periods; and the sleep periods resulting from the change should not have been selected in previous iterations. In an alternative embodiment, the buffer between a sleep period and a work period is 0-5 hours. In at least one embodiment, the buffer provides time for a meal, commute time, and/or an individual's daily routines, which leads to the scenario in which buffers could vary between individuals and further the other constraints could also vary between individuals.

The test point for the sleep period that yields the largest improvement in alertness impairment as across the entire interval of analysis is selected, 525A, 555B. Alternatively, the largest decrease in value of a weighted sum of the average alertness impairment and the peak alertness impairment across the entire interval of analysis is selected. Both of these are measured from the alertness impairment predicted in step 510A, 540B, respectively. One approach to determine this is measured by the reduction in the AUC for either the respective work period or the respective wake period in terms of alertness impairment. Updating the sleep, wake, or work periods based on the selected test point, 530A, 560B. A determination is made whether there is at least one more possible change to the sleep periods (or whether there are more mathematical feasible solutions left) or at least one iteration left before reaching (or equaling) maximum number of iterations, 535A, 565B. Examples of the number of iterations discussed in connection with FIG. 5B are applicable here. In 530A, the method would proceed to 540B. In 665B, then method would proceed to stage 2.

FIG. 5E illustrates stage 2 (5S2″) to determine sleep parameters for the initial sleep-work schedule from FIG. 5D. In this illustrated stage 2, the sleep periods (with starting time $S_i$ and duration $SD_i$) obtained in stage 1 (5S1″), determine the best time to start each work period j such that alertness is maximize during all work periods. For given values of $S_i$, $SD_i$, and $W_j$, the alertness impairment is predicted, 570A. In at least one embodiment, the alertness impairment model discussed above is used. Multiple test points are applied to the value of $W_j$ for each work period j to determine a new alertness impairment for each modified work period, 575A. In at least one embodiment, this is performed using an iterative loop. In the illustrated method, the test points increase and decrease the value of $W_j$ for each work period j. Then, all changes that yield an increase in the alertness impairment to update the work periods are selected, 580A. If for a work period j both changes (i.e., increasing and decreasing $W_j$) yield and decrease in alertness impairment during that period, then the change that produces the largest decrease is selected.

The optimization methods each produce values of $S_i$, $SD_i$, and $W_j$, 585A, that increase, and in at least one embodiment maximize, alertness during all work periods j by decreasing alertness impairment. These values provide a sleep-work schedule that then may be further optimize with adding caffeine consumption.

In at least one embodiment, the optimization model is directed at scheduling sleep taking into account sleep propensity and how long a user may sleep. For example, a person is not likely to fall asleep in the middle of the day, so scheduling a sleep period during the day is not likely to obtain the desired impact on cognitive performance or alertness.

g. Combinations of the Above Optimization Models

The above discussed sleep-wake/work optimization and caffeine consumption optimization methods can work together to provide a higher level of alertness during desired periods such as work time or non-work time. In at least one embodiment, the optimization methods are adjusted in relative real-time to reflect what occurs for the individual in terms of sleep, work, and/or caffeine consumption to provide updated schedules when the individual has deviated from the optimized schedule. In at least one embodiment, the work periods are maintained in the updated optimized schedule, which may be produced by reperforming one or both optimized methods discussed above.

As illustrated in FIG. 6, one approach is to perform the sleep-wake/work optimization method, 605, and use the generated schedule as the input to the caffeine consumption optimization method, 610. The exact implementation of the particular optimization method may be selected from any of the embodiments discussed above including any variants that are discussed in the system embodiments.

In a further embodiment, the optimization model considers both caffeine intake and sleep schedule. In at least one embodiment, the test points for sleep optimization include shifting, expanding, and/or decreasing sleep periods in the schedule while taking into account any temporal constraints provided or preset in the system including sleep latency and duration considerations.

In at least one embodiment, the method factors in the shifting of the circadian component of the alertness impairment model resulting from long-distance travel across one or more time zone boundaries. In at least one embodiment, the circadian component is shifted between 30 minutes to 90 minutes per time zone with an approximate shift limited to one time zone per day. Or alternatively, the circadian component is shifted completely in one shift when the time change is 10-14 hours. In a further embodiment, past alertness impairment data generated during long-distance travel for a particular individual from PVTs is used to adjust the circadian component for a particular individual resulting from long-distance travel. In at least one embodiment or a further embodiment, the system will conduct a plurality of PVTs to realign the alertness impairment model to a new time zone after travel. In a further embodiment, the plurality of PVTs occurs over a series of days with incremental realignments occurring for the alertness impairment model.

h. System Embodiments

Figure 7A:
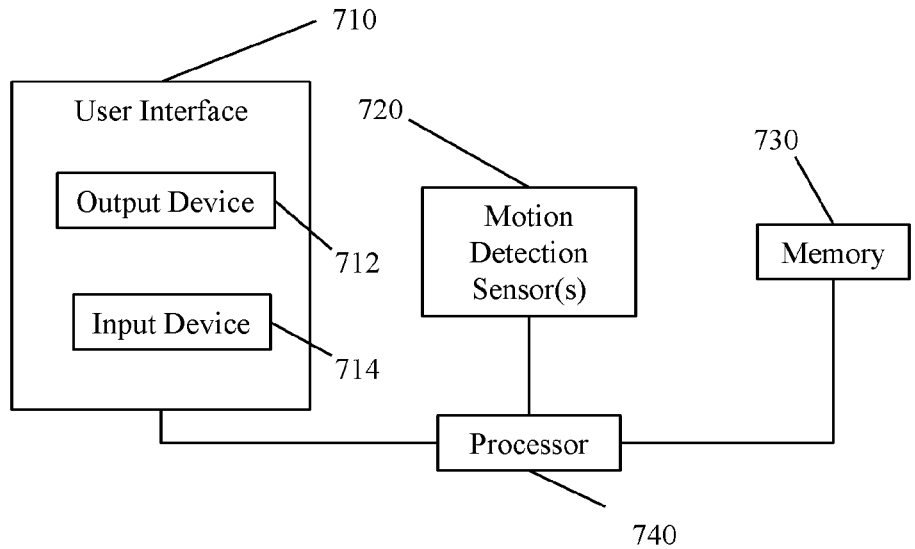
FIGS. 7A and 7B illustrate block diagrams of at least two system embodiments according to the invention.

The system in at least one embodiment includes a computing device (or system) that includes a user interface 710, a motion detection sensor(s) 720, a memory 730 and a processor 740 as illustrated in FIG. 7A. Examples of a computing device include a wrist-worn device, a smart phone, a tablet and/or any combination of these. In an alternative embodiment, the worn device is located on a different body part. Examples of wrist-worn devices include commercially available activity monitors, such as from Fitbit, Apple, Samsung, and Garmin. In at least one embodiment, it is the combination of multiple separate components, such as a wrist-worn device having the motion detection sensor(s) 720 and communicating with an optional computing device, such as a smart phone, a tablet or a computer (laptop or desktop), that would have the user interface 710, the memory 730 and the processor 740 where the wrist-worn device would be capable of communication with the computing device. Although in alternative embodiments, other combinations of components between the wrist-worn device and the computing device. In such an embodiment, the devices would communicate using a wireless protocol, such as Bluetooth or WiFi or via a wired connection. As such, the components in at least one embodiment are present at least partially within a housing.

In at least one embodiment, the user interface 710 includes at least one output device 712 with functionality to provide information to the user via visual, sound, mechanical, and/or any combination of these. Examples of the output device 712 include a display(s) (or touchscreen), at least one light, speaker, and transducer. In at least one embodiment, the user interface includes at least one input device 714 with functionality to receive input from the user such as sleep information, caffeine consumption and/or responses during a PVT test. Examples of the input device 714 include a touchscreen(s), a button(s), a switch(s), a touchpad(s), a keyboard, an external accessory, a communications module, and/or a microphone. In at least one embodiment, the examples of the input device 714 are examples for a receiving means for receiving input from the user.

In at least one embodiment that allows for individualization, the user interface 710 facilitates administrating a PVT test to the user and receiving the user's response, such as through a touchscreen or a light and button pair/combination. In a further embodiment, the user requests the start of a PVT test at a time convenient for the user as opposed to a time determined by the system such as would occur based on a test schedule (i.e., at 2, 4, 6, or 8 hour increments during non-sleep), an open period of time on the user's schedule as obtained from the user's calendar that resides on the computing device, or a level of user activity being indicative of sitting. In a further embodiment, informing the user of an upcoming PVT test through the user interface 710 such that the user may decline and/or postpone the PVT test until a more convenient time such as through a "snooze" option or setting of a future time.

In at least one embodiment, the computing device includes at least one motion detection sensor 720 to track user activity and/or movement. Examples of such sensors 720 include an actigraph and/or an accelerometer. The sensor 720 in at least one embodiment allows for the computing device to determine whether the user is asleep or awake to facilitate the development of a sleep history for the person. In an alternative embodiment, the motion detection sensor 720 is omitted and the sleep history is provided via the user interface or a data file for use in the model. Examples of sources of the data file are an external activity tracker and a manually created data file. In an alternative embodiment, the sensor 720 is present, but it is possible to edit the recorded sleep history and/or enter retrospective/predictive sleep history information.

In at least one embodiment, the memory 730 stores the data produced by the motion detection sensor 720 or alternatively provided by the user or another individual and any information that the user provides. In at least one embodiment, the data is stored in a database residing in the memory 730. The memory 730 also stores the model and the parameter weights for the model including any default weights for an average individual, which can serve as a default, and/or the individualized weights for the user. In at least one embodiment, the memory 730 stores the executable code for the processor 740 to perform the described methods in this disclosure.

In at least one embodiment, the processor 740 is in electrical communication with the memory 730 and is capable of communication (directly or indirectly depending upon the particular implementation) with the user interface 710 and the motion detection sensor 720. The processor 740 is configured to run the executable code to perform the described methods. In at least one embodiment, the processor 740 is configured to drive the user interface 710.

In at least one alternative embodiment, the processor 740 initiates a PVT test in response to the user notifying the system that he/she is about to consume caffeine or has just consumed caffeine and then is scheduled to run a second PVT test approximate the time the caffeine is scheduled to have been metabolized and/or at least one point in time from the current time to the metabolized time. With the PVT test results being used to adjust the caffeine related parameters in the alertness model. This PVT test set would be in addition or in place of other PVT tests although in at least one embodiment, a PVT test scheduled during this would be skipped.

In at least one embodiment, the system further includes a power source (not illustrated), such as a battery or other source, to provide electrical current to the system components.

Figure 7B:
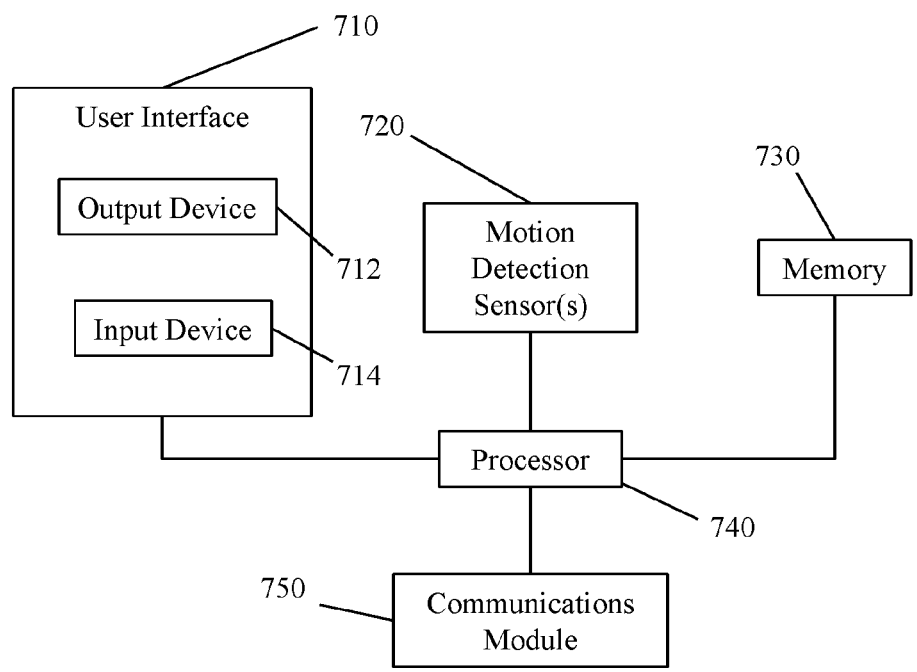

The system in a further embodiment to the above system embodiments may include an optional communications module 750 as illustrated in FIG. 7B. In at least one embodiment, the communications module 750 includes the ability to communicate with an external device. Examples of a communications module 750 include, but are not limited to, a transmitter, an antenna, a receiver, a transreceiver, a light source, a light sensor, and a plug (or other connector) configured to receive a wire connection. In at least one embodiment, the communications module 750 facilitates communication between a smart phone, tablet, or a computer with a wrist-worn device or a networked server as discussed later in this disclosure.

Figure 8A:
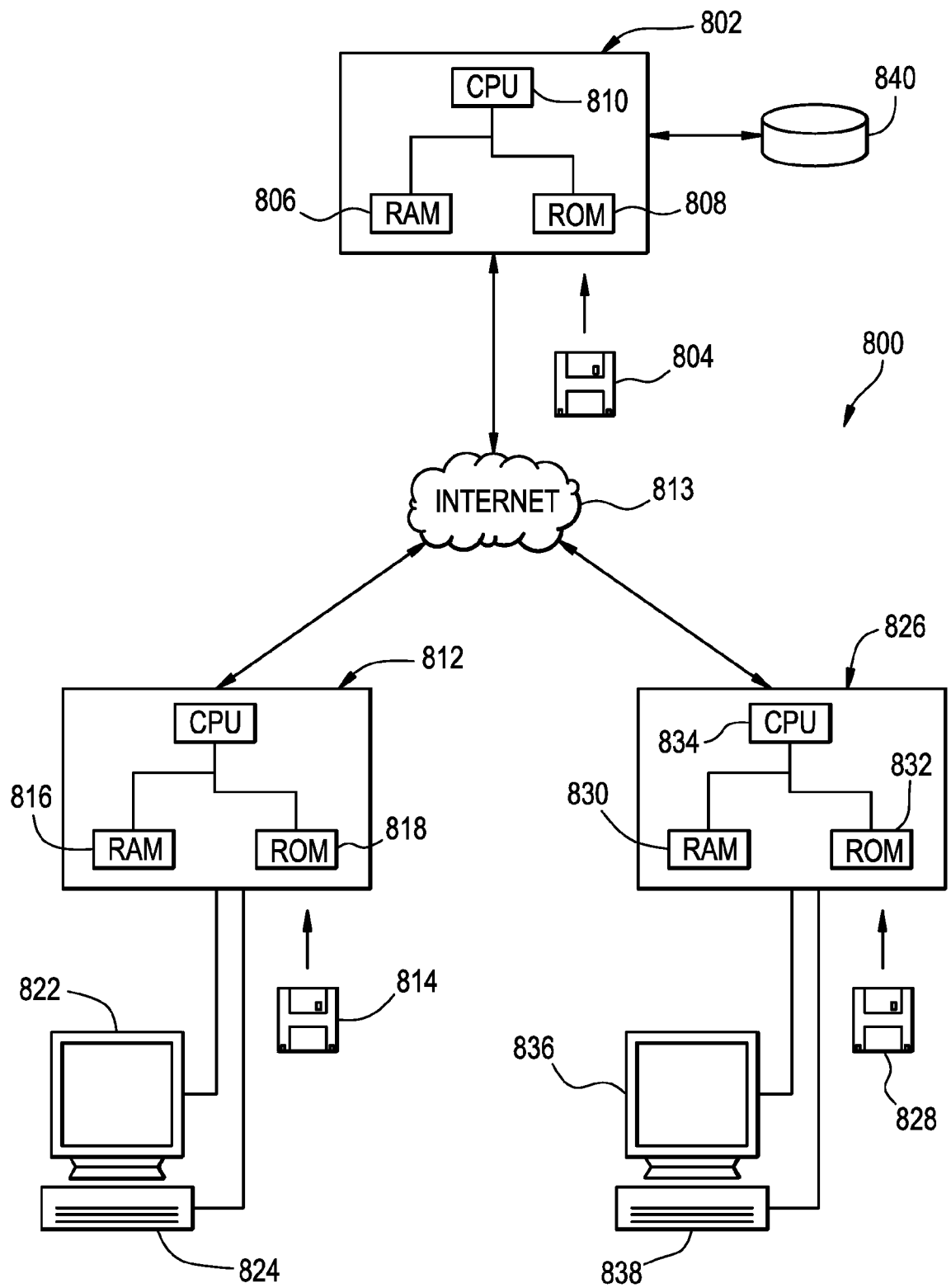
FIG. 8A illustrates a pictorial block diagram of a network embodiment of the invention.

In at least one embodiment illustrated in FIG. 8A, a computer network 800 is configured for providing prediction support to one or more individuals. Such an embodiment would be advantageous in scheduling a workforce or locating a replacement individual using current cognitive state or alertness level for individuals that make up the workforce. The computer network 800 is useful in many varied contexts in which statistical regression models can be used to predict outcomes. To provide decision support, some embodiments are configured to generate outputs, including graphical outputs and reports that incorporate such outputs.

In some configurations, computer network 800 includes a server computer 802 that executes a server module. The server module includes software instructions recorded on a machine-readable medium or media 804. Machine-readable medium or media may compromise, for example, optical or magnetic storage devices, memory devices such a USB memory sticks or other types of memory cards, internal readable and writable memory 806 of any of various kinds, such as internal or external RAM, read only memory (ROM) 808 of any of various kinds, hard disks optical drives, and combinations thereof, but it does not include transitory signals. As used herein, "media" includes not only "removable" media, but also "non-removable" media such as primary and secondary storage. For example, RAM, ROM, and hard disk drives are included as "media," as well as the aforementioned types of media. Server computer 802 can include devices for reading removable media. In many configurations, server computer 802 will include at least a readable and writable memory 806, read-only memory 808 or non-volatile memory of a suitable type, and a processor 810 (e.g., a central processing unit or CPU) which may itself include one or more microprocessor, co-processors, etc. Thus, the term, "processor," as used herein, is not literally restricted to a single CPU. Moreover, server computer 802 may itself include a network of one or more computers, as can any other device referred to as a "computer" herein.

Computer network 800 further includes one or more first client computers (or portable computing devices) 812, such as the systems illustrated in FIGS. 7A and 7B. In many configurations, it is in communication with the server computer 802 via a network 813, for example, the Internet or local area network (LAN). In at least one embodiment, the client computer 812 includes a first client module including software instructions recorded on the machine-readable medium or media 814. In many configurations, client computer 812 further includes at least a readable and writable memory 816, read-only memory 818, and a processor 820 that may itself include one or more microprocessors, coprocessors, etc. First client computer 812 may itself include one or more computers in a network. First client computer 812 further may include a first user display device 822, such as a CRT display, LCD display, plasma display, and/or a hardcopy device such as a printer. First client computer 812 may also include a first user input device 824, such as a keyboard, a mouse, a touchscreen (which may be part of the display 822), touch pad, control stick, and/or a trackball, etc. First client computer 812 is not limited to desktop or laptop computers that can include any computing device that can communicate over a network. For example, in some configurations, a first client computer 812 can be a tablet or a mobile telephone with a display screen, or other "smart phone" type devices or as illustrated in FIGS. 7A and 7B.

Computer network 800 further includes one or more second client computers 826. In at least one embodiment, second client computer 826 is in communication with server computer 802 via network 813. In at least one alternative embodiment, second client computer 826 includes a second client module having software instructions recorded on a machine-readable medium or media 828. In many configurations, second client computer 826 further includes at least a readable and writable memory 830, and a processor 834 that may itself include one or more microprocessors, coprocessors, etc. Second client computer 826 may itself include one or more computers in a network. Second client computer 826 further includes a second user display device 836 including displays and/or a hardcopy device such as a printer. Second client computer 826 also includes a second user input device 838.

As used herein, software instructions "instruct the computer to display" information even if such information is communicated via a network to another computer for display on a remote display terminal. In this sense, code running on a web server instructs a processor executing that code to "display" a webpage, even though the code actually instructs the processor to communicate data via a network that allows a browser program to instruct in another computer to construct the display of the webpage on the display of the other computer. For example, the server module described in the examples presented herein can include a web server and the client modules can include web browsers. Also, in some configurations, client computers 812 and 826 include laptop, desktop, or mobile computing devices or communication terminals. The broader scope of the phrase "instruct the computer to display" is used because server computer 802 and the one or more client computers 812, 826 need not necessarily be different computers. For example, communication protocols known in the art allows server software module and a client software module running on multitasking computer systems to communicate with one another on the same computer system, and the same server software module can also communicate with a client software module running on a different computer via a network connection.

In at least one embodiment, a method provides decision support via software that operates on the server module. At least one embodiment includes server modules that utilize software platforms to facilitate web services and data storage. A multitier system architecture in at least one embodiment enables scaling of server module components as needed to meet specific demands of a particular deployment. In addition, a modular design framework may be used in at least one further embodiment to facilitate extensibility and incorporation of new functionality via custom modules. The described embodiments are not limited to implementation using the components described above. The selection of an appropriate operating system and suite of applications can be left as a design choice to one of ordinary skill in the art after such person gains an understanding of the present disclosure.

The technical effect of at least one embodiment is achieved by user logging in with the appropriate credentials. Server module instructs processor 810 to display a visual selection of input parameters, for example, on a user display device 822. An example of such interface is illustrated in FIGS. 9A through 23C and may include a Graphical User Interface (GUI). In some embodiments, access to these features is available only to those with administrative rights. In some embodiments, the GUI includes standard GUI elements such as windows, dialog boxes, menus, drop-down lists, radio-buttons, check boxes, icons, etc.; and the module provides functionality to define and express parameter input and output display options, such as curser movements and mouse clicks/selections. User interaction with the interface is achieved by one or more methods that may include, for example, pointing and clicking with the mouse, touchpad, or other input device, or typing on a keyboard, or speaking into a microphone and using voice command recognition software. In some embodiments, models, normative data, parameter inputs, display options, etc. (comprehensively referenced herein as Data) are imported, either in part or in their entirety, from all-text representations, examples of which include, but are not limited to, XML-based and tab delimited documents/files with further examples discussed later in this disclosure. Some embodiments allow imported data (e.g., sleep-wake information and/or caffeine consumption) to be edited and modified, stored in a memory of the server computer or elsewhere, and/or re-exported in their original formats and/or other formats.

A general regression model framework is used in at least one embodiment for expressing predictions. The model types can include, for example, linear, generalized linear, cumulative multinomial, generalized multinomial and proportional hazard models. Model types may be defined in terms of a coefficient vector and an optimal covariance matrix for calculating confidence intervals. In at least one embodiment, the model is an alertness impairment model and/or an optimization model(s) as discussed in other parts of this disclosure.

In at least one Internet-based embodiment, the request for model parameters is sent via an XML web service for programmatic access. In configurations in which the request is sent via an XML web service, the request is not necessarily displayed as such.

In at least one embodiment, coefficient values (or variable weights) are obtained by instructions to processor 810 to run a regression analysis on data obtained from a database 840, which may be a local database stored in computer 804 or a database accessible via network such as network 813. A list including the outcome, associated coefficients and accepted names, types, and/or limits for variables are stored in a memory (e.g., memory 806, a secondary storage unit, or even a register of the processor) of server computer 806 for later use at step. The term "later use" is intended to be interpreted broadly and can include, for example, use as part of the running of a stored model at a later date, use as part of a self-contained application, or use by a non-registered user who approached the application through the web to do a "one-off" run of a model. At least one embodiment also updates weights and covariance matrices that are stored for the model.

Referring back to FIG. 8A, at least one server module also contains instructions configured to instruct processor 810 to allow a user (usually, but not necessarily different from the user at first client computer 812) at second client computer 826 to log into the server module. The user at second client computer 826 is able select one or more of the stored regression model specifications, input data for the stored models, run a regression analysis that can be presented with results of the regression analysis are analyses.

The server module accepts the collected data (which may also include an identification of a person or object to which the variables apply) and runs the selected regression model specifications. The results of the selected regression model specifications are displayed. An example of such a display is illustrated in FIGS. 15-18B. The displayed results can also include a representation of a statistical range, such as a visual representation in some illustrated embodiments. Also, in some illustrated embodiments, processor 810 is instructed to use customizable content previously stored in a memory or database accessible to processor 810 and optionally including return addresses, logos etc. to print the results or to cause the results to be printed.

Main effects and interaction terms derived from input parameters and their transformations can be derived in some embodiments, and regression coefficients for calculating point estimates for outcome of interest and optional covariance estimates can be provided for computing confidence intervals.

In at least one embodiment, individuals can readily access regression model specifications through an integrated and customizable portal interface using a variety of web-enabled devices, such as that illustrated in FIGS. 24 and 25. Dynamically generated data and free screens are provided based on the variables required by the selected models.

In at least one embodiment, model outputs are rendered in a variety of graphical and non-graphical formats, including solid bar plots, gradient bar plots, whisker line plots, high charts, and/or digital LED-style displays, which can be user-selectable. Output from multiple models can be grouped onto a single plot to facilitate inter-model comparison, see, e.g., FIGS. 24-26C. At least one embodiment allows a user to customize the output plot style, the selection of models to include a final output and the display of confidence intervals (when model covariance data has been provided), see, e.g., FIGS. 15-18B.

It will thus be appreciated that at least one embodiment can be used to handle various aspects of data collection, validation, storage/retrieval, and processing, thereby freeing 1) outcomes researchers from intricacies of programming and networking and 2) supervisors/managers from reviewing data logs, asking individuals, or observing individuals to obtain information regarding cognitive state and/or alertness.

While the invention has been described in terms of various specific embodiments, those skilled in the art will recognize that the invention can be practiced with modifications within the spirit and scope of the claims.

Those skilled in the art should appreciate that storage units may illustratively represent the same storage memory and/or one or a combination of storage unit and computer memory within a computer system. Instructions that perform the operations discussed above may be stored in storage media or computer memory structures may be retrieved and executed by a processor. Some examples and instructions include software, program code, and firmware. Some examples of storage media include memory devices, tapes, disks, integrated circuits, and servers. Instructions are operational and executed by a processor to direct the processor to operate in accord with the invention.

FIG. 8B illustrates a Wide Area Network (WAN) or LAN such as an intranet or the Internet, represented as system 850 that may be configured with program instructions and data to implement the foregoing instrumentalities. Internet system 850 may, for example, be a proprietary LAN or a WAN. Server 852 is connected with a plurality of users 854 or able to access the server 852 for statistical processing of information. Connections 856, 858, and 860 may be any type of data connection including wireless connection, coaxial connection, optical connection, Internet connection, or other type of connection across any geographic area. The Internet system 850 may be implemented, for example 1) headquarters or human resources/scheduling departments and 2) one or more work locations. In the illustrated embodiment, the users 854 are each provided with suitable electronic equipment for establishing these connections, such as personal computers or computing devices, tablets, or smartphones.

The server 852 may, for example, store group data 860 and/or may provide back-up storage for individual medical evaluation systems, as discussed above. Additionally, server 852 may provide a local agent or translator for plurality of individual systems to exchange information.

In at least one embodiment, the server 852 provides centralized control under the supervision of an administrator 862. The program instructions configuring server 852 for use towards these ends are capable of accepting new models for different purposes, where these models are provided by a research agency (or other entity) 864. In this matter, the research agency is able to provide updates to existing models that have been revalidated and/or expanded by comparing outcomes and demographics to survey responses. Additionally, the research agency may provide new models that may be selected by users 854 to meet a particular need in the intended environment of use.

The system in an alternative embodiment further includes an interface for the research agency 864 communicating with server 852 and providing the statistical models using of visual interface communicated by server 852. Server 852 is configured to analyze requests received from users 854 over the Internet, and intranet, or another network that relates to a plurality of statistical models and to reduce redundancy requests for data. Also, in some configurations, the statistical processing system further includes server 852 operatively configured to present medical information questions to a user 854 for human response and for receiving human responses to the medical information questions.

Based on the following description and FIGS. 9A-23C, one of ordinary skill in the art should appreciate that the illustrated GUIs could be modified for different display sizes and layouts. In particular, any color choices discussed could be changed in alternative embodiments.

Turning now to FIGS. 9A and 9B, at least one embodiment includes a GUI home page 900, 900A that allows a user to access various system functionality from one input interface. In the case of FIG. 9A, the user may enter their sleep and caffeine dosing schedule 910, conduct a PVT session 915 to train the individual model or assess current levels of alertness impairment and cognitive performance, retrieve current information 920 on the alertness impairment of the user and predict alertness impairment 925. The home-page also includes access to the system administrative and operations settings 930. FIG. 9B illustrates a slightly different home page that adds an optimize and predict option 935. It is understood that the options displayed in FIGS. 9A and 9B are illustrative and that other embodiments could well include additional functionality.

Figure 10A:
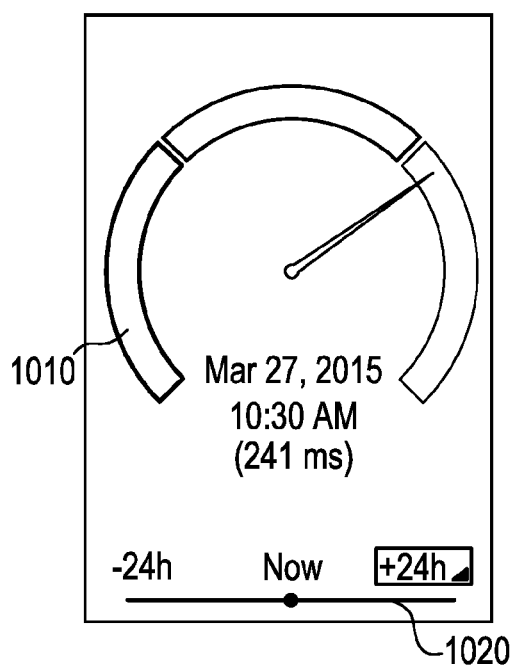
FIGS. 10A and 10B illustrate graphical user interface displays relaying information on alertness impairment.
Figure 10B:
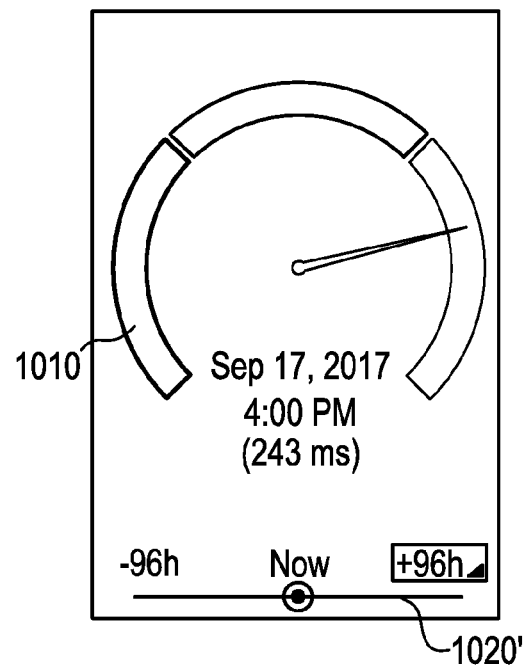

FIG. 10A illustrates the graphical status guide 1010 that informs a user of their current level of alertness impairment/cognitive performance levels. A slider 1020 is provided to allow the user to easily access the level of alertness impairment over time both going backwards as well as forwards in time. FIG. 10B illustrates an alternative embodiment that includes a −96 hour to 96-hour slide bar 1020'. In at least one embodiment, when reviewing future levels, the processor may develop a projected sleep history based on past sleep history and/or the individual's schedule as maintained on a calendar, a combination of the last two, an optimized sleep-wake schedule, or alternatively assumes no sleep. In at least one embodiment, a projected sleep history is based on the average bedtime and the average wake-up time for the last x number of days (where x is any number between 1 and 15) is used for determining when future sleep will occur. In at least one embodiment, where the individual's schedule is accessible by the computing device, reviewing the individual's calendar to see if there are any time commitments that might interfere with sleep patterns between the current time and the future time. The displayed schedule also may be the result of the previously discussed optimization methods. FIGS. 10A and 10B illustrate examples of an alertness impairment gauge divided into three parts, which in these embodiments are analogous to blood-alcohol content levels in the U.S. The illustrated three parts might be green, yellow, and red. Although illustrated with green on the right side, the alertness impairment gauge may be flipped to put green on the left side.

Figure 11A:
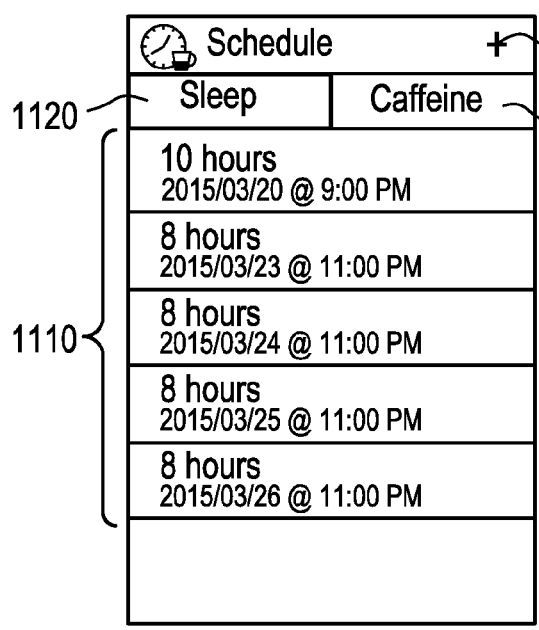
Figure 11B:
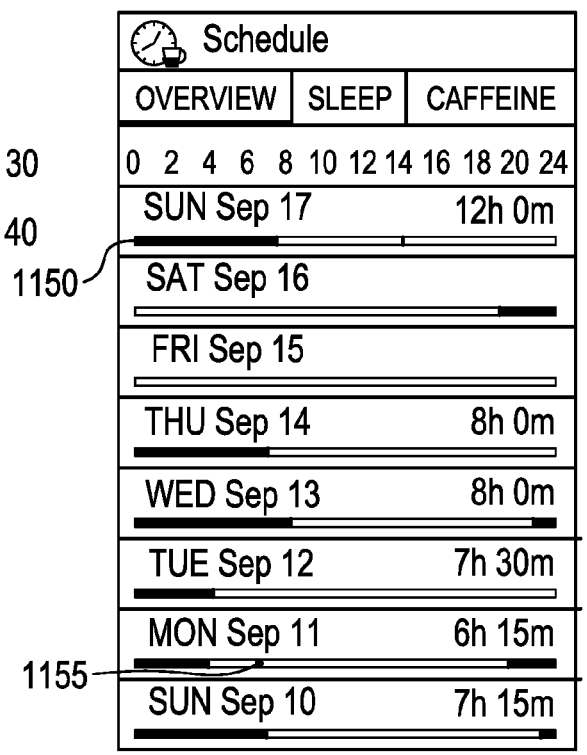
Figures 11C, 11D, 11E, 12A:
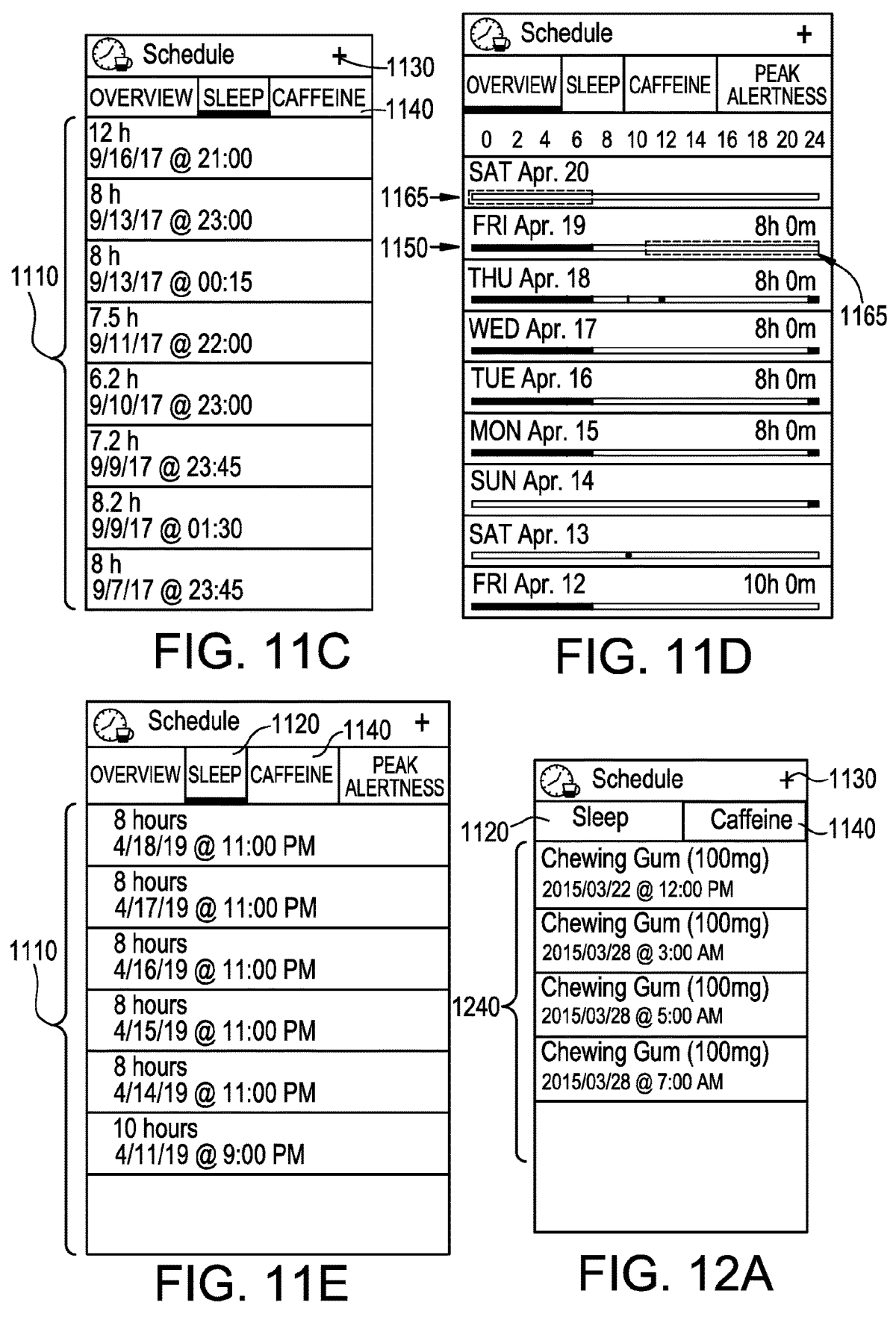

Turning now to FIG. 11A, a sleep log is available for display and review by the user, showing a chronological listing 1110 of the dates, times and duration of sleep intervals logged/entered by the user over time when the sleep schedule 1120 is selected. The illustrated interface allows for entry of additional sleep periods via the "+" icon 1130; and, in at least one embodiment, the "+" icon 1130 also is used to add caffeine consumption (see FIG. 12A-C) when the caffeine schedule 1240 is being displayed in the illustrated interface. FIGS. 11B and 11C illustrate an alternative interface. FIG. 11B illustrates an interface for providing an overview of the sleep-wake information with sleep (shown in light shaded areas) 1150 and caffeine consumption represented by a dot 1155. FIG. 11C illustrates an interface providing for sleep input and shows the duration and start of each sleep period. The caffeine interface 1140 (see, e.g., FIG. 12A) provides information regarding caffeine consumption. FIGS. 11D and 11E illustrate another alternative interface that adds access to an interface for Peak Alertness 1160. FIG. 11D illustrates an overview example that includes past sleep information (shaded area) 1150 and a period of desired peak alertness (dashed boxes) 1165. Like in FIG. 11B, FIG. 11D illustrates caffeine consumption with a dot 1155 that correlates with the caffeine schedule illustrated in FIG. 18A.

FIG. 12A is an embodiment illustrating a GUI wherein the user's caffeine event log 1240 is accessible and easily reviewable by the user 1140. In the illustrated GUI, each caffeine event is listed by its date and time and approximate dose of caffeine 1240. FIG. 12B illustrates an alternative embodiment identifying caffeine consumption 1240A. Both of these figures, in at least one embodiment, may illustrate future caffeine consumption according to an optimized caffeine consumption schedule solution. FIG. 12C illustrates an embodiment in which a GUI allows the user of the system or digital application to enter in a caffeine dosing event by characterizing its source from a list of consumables 1210. An alternative way to capture the information would be through scanning the container for the consumable being consumed such as through a barcode or a RFID tag. Each consumable has an estimated caffeine dose associated with it in resident memory for input into the model.

FIGS. 11D, 13A and 13B illustrate a system embodiment that displays a time period in which peak alertness is desired for the individual. FIG. 13A illustrates a list schedule 1310, which in this example has one time period that lasts for 16 hours and begins on Apr. 19, 2019, at 5:00 pm. It should be appreciated based on this disclosure that other time periods including duration and timing may occur. This correlates with the dashed white lines 1165 in FIG. 11D. FIG. 13B illustrates on a GUI showing periods of sleep 1350 and when the desired peak alertness is with a dashed box 1365. FIG. 13B also illustrates a graphical representation of the maximum alertness impairment by a horizontal dashed line 1370 at Mean RT of approximately 300 milliseconds. FIG. 13B further illustrates the use of a vertical solid line 1375 to show the current time on the schedule.

Turning to FIG. 14, an example of a PVT test is shown as resident within the system. A user is asked to press the screen outputting a timer 1410. The user's reaction times are stored by the system for training the individual prediction mode and for assessing the current state of the user's cognitive performance/alertness.

FIGS. 15-18B illustrate interface examples for optimization/prediction based on a group alertness impairment model 1505 and an individualized alertness impairment model 1607.

In FIG. 15, a line graph 1510 of the alertness impairment model's predictions as trained on average group performance inputs 1505 is illustrated. The time of day is displayed on the x-axis and the reaction time (in milliseconds) is displayed on the y-axis. The individual user's mean reaction times are shown in the green line with dots 1520. The alertness impairment model's predicted alertness impairment based on the user's inputs and the group training, indicated as a function of reaction time, is shown in the solid yellow line 1530. The prediction is bounded both at upper and lower limits by the confidence interval as dashed-yellow lines 1540, 1550. The level of alertness/cognitive performance for the user is gauged as good, adequate or poor based on the reaction times using a "traffic light" color scale although other colors could be used. Actual and predicted reaction times in the lower, green range 1590 correlate to normal cognitive performance. Reaction times in the middle, yellow range 1592 correlate to degraded alertness (i.e., alertness impairment). Reaction times in the upper, red range 1594 correlate to cognitive performance that is severely impacted by sleep deprivation. Blue sections of the graphic correspond to sleep events 1560. An input (drop-down menu) may be accessed to select the duration of the time window 1570 for the desired analysis, in the illustrated example, 3 days. A corresponding date range corresponds to the time window selected.

The alertness impairment model may also be trained using individual user inputs rather than group mean predictions. A user may easily select either model by selecting the appropriate model option in the GUI (see FIGS. 15 and 16A-16C) 1505/1607. Should the user select an individualized prediction based on previous, individual inputs and prior alertness impairment model training, a graphic similar to the above will be displayed as illustrated in FIGS. 16A and 16C that includes mean RT 1520, prediction 1530, and uncertainty lines 1540, 1550 representative of confidence. In both cases, whether using group or individual predictions, a graphic may be generated for a date range 1680 that projects into the future as shown in FIG. 16B. An indication of the current time may also be displayed, such as a line 1685.

FIGS. 17A-18B share a common interface that depending on what is being displayed may show periods of sleep 1560, predicted Mean RT 1530, measured Mean RT 1520 (see, e.g., FIGS. 17A and 18A), desired maximum alertness impairment 1770, caffeine consumption 1755, optimal caffeine consumption 1757, and peak alertness time periods (see, e.g., FIGS. 17B and 18B). This information is an overlay on a green 1590, yellow 1592, and red 1594 scale with the Mean RT (ms) along the vertical axis and the time of day along the horizontal axis. FIGS. 17A and 17B illustrate a prediction based on group data for the alertness model. FIGS. 18A and 18B illustrate a prediction using an individualized alertness impairment model.

Turning now to FIG. 19A, a GUI screen 1900 is illustrated as presenting a user interface for inputting sleep events into the sleep log. In at least one embodiment, the user enters in a date using a calendar input 1910 as show in FIG. 19B and time 1902 as shown in FIG. 19C for the start and finish times of the sleep event. This information is stored in resident memory and used to model the predicted performance of the user based on group or individualized training inputs. This type of interface allows the user to confirm whether sleep occurred as schedule. In a further embodiment, the system will prompt the user for this confirmation.

Similarly, the user may update the caffeine event log by using an interface such as shown in FIG. 20 as an illustration of one embodiment of the invention. Here the user is allowed to select the size 2010 of the caffeinated beverage being consumed by the user. The size of the beverage corresponds to approximate caffeine doses that are stored and referenced in resident system memory. FIG. 21 illustrates an example interface 2110 to select the caffeine type and strength might be selected by the individual either for prediction or data collection purposes. As discussed in other portions of this disclosure, the caffeine being consumed could be selected based on serving size or based on available supplies/options for the individual, which may lead to omission of use of the illustrated interface in FIG. 21.

When training the system for individualized predictions, as user can access training sessions through a training session GUI portal similar to that shown in FIG. 22A for illustrative purposes. For example, the user may initiate 2210 a practice session that is not saved to gain an understanding of how the system is trained for individualized predictions, thus helping to avoid modeling inaccuracies due to operator error. In at least one embodiment, the user is afforded the opportunity to reset the model to its default, untrained state by selecting the corresponding reset option 2220. The interface also allows the user to update the session schedule 2230 and begin a training session 2240.

FIGS. 22B-22E illustrate a set of interfaces that are used in at least one embodiment to provide settings information for the system. FIG. 22B illustrates a settings screen that allows the system to receive input regarding setting an alarm for caffeine consumption 2552; peak alertness criteria between maximum caffeine consumption in 24 hours 2554 and maximum desirable alertness impairment level 2556; PVT session information including session duration 2262, delay minimum 2264, delay maximum 2266 and save state to files 2268; and device information 2270. Depending on a particular implementation, one or more of these settings may not be accessible to the individual but are instead preset or set by another individual. FIGS. 22C-22E illustrate different intake interfaces for maximum caffeine in 24 hours 2282, maximum desirable alertness impairment level 2284, and session duration 2286, respectively. Although FIGS. 22C and 22D illustrate a rolling menu for selection, other menus may be used instead. In the case of FIG. 22D, the interface in an alternative embodiment is a color display, which in a further embodiment is similar to that shown in FIG. 17A that allows the individual to set the maximum alertness impairment on the graphical display. In a further embodiment, the user interface allows receipt of entered numbers through it instead of the use of menus.

By training an alertness impairment model, an individual can use a "learned model" (or "Individualized Prediction") to predict individualized alertness impairment into the future, as for example, a day in advance after providing a week's worth of session training as shown in FIG. 23A. The settings for the training sessions may also be accessed through a separate GUI system interface as shown in FIG. 23B that is similar to a portion of the GUI illustrated in FIG. 22B. The duration of the session time may also be selected 2286' by the user through a GUI interface such as that shown in FIG. 23C.

In at least one implementation built according to at least one embodiment, the system includes three primary components: the user interface, the PVT module, and the prediction and/or optimization models. The illustrated user interface is written in Java 7 for Android 4.1+ and in Swift 3.0 for iOS 9.3+. The iOS implementation is responsive to the different screen sizes of the iPhone and the iPad. To achieve the most consistent performance for the reaction time test in the Android OS, the PVT module was implemented as a native library written in C. For the iOS, it was implemented in Swift 3.0, which is compiled into native machine code to provide consistent test performance. To render and control the presentation of the stimulus, OpenGL ES was used for Android and UIKit was used for iOS. All timing was based on a monotonic system clock with nanosecond precision. The algorithms for group-average and individualized predictions were written in MATLAB, translated to C with MATLAB Coder, and then compiled into a native library. Some modifications were made to the original personal computer (PC) MATLAB code, because the conversion to C was only supported for a subset of MATLAB language features and functions. The modifications were verified to not alter the results obtained in the original PC implementation.

FIG. 24 illustrates a software interface with input menus and output plots that appear upon login into a system built according to at least one embodiment. The illustrated interface allows for user inputs into the system that includes (1) sleep schedule (day and time of sleep start and sleep end) 2410 and (2) caffeine schedule (day, time, and dose of caffeine, which are selected using a drop-down menu) 2420, for the same time zone. In at least one embodiment, for each schedule, users may input up to 100 separate sleep periods and up to 400 separate caffeine consumption events (one event=timing+dosage entry). Each sleep/caffeine schedule can be saved using a unique schedule name (e.g., "Sleep Restriction+Caffeine" 2430). Sleep and caffeine inputs in at least one embodiment are entered manually via the browser interface or imported 2432, for example from a Microsoft Excel file using a predefined format. Alternatively, the computing device illustrated in FIGS. 7A and 7B or a body-worn data collection unit may provide sleep history information to the system.

For each sleep/caffeine schedule, the system generates alertness impairment predictions for three PVT statistics: number of lapses (lapse=response time≥500 ms), mean response time, and mean speed (i.e., mean reciprocal response time). Users choose which statistic to plot via the "Alertness Statistic" drop-down menu 2440. The sleep/caffeine input schedules and corresponding predicted outputs can be saved as an Excel file via the "Export Data" function button 2434; the displayed plots can be saved as an image file via the "Export Graph" function button 2436.

In at least one embodiment, there is a set of initial conditions and model assumptions. The model neurobehavioral performance predictions are initialized to 8 hours of sleep per night (23:00-07:00), and the system assumes that there is no sleep debt before day "0." From that point, user entries of 8 hours of sleep per day add no sleep debt (i.e., maintains daily performance at its initial level, plus/minus circadian variation). User entries of sleep durations less than 8 hours per day degrade performance, and sleep durations greater than 8 hours per day improve performance. Consistent with the previously discussed "fading memory" concept, the more recent the sleep/wake period, the greater its influence on predicted performance and/or alertness impairment.

The illustrated line graph 2450 shows how multiple schedules may be displayed at once ("sleep restriction+caffeine" 2452 and "new schedule" 2454). The line graph 2450 also shows when sleep 2456 is present in the sleep history Similar to FIGS. 10A-10B and 15-18B, the line graph 2450 is divided into three vertical sections.

As discussed earlier, caffeine effects on performance are multiplicative, where the magnitude of change in performance due to caffeine is a function of the (1) size of the caffeine dose (in mg), (2) duration of time since the last caffeine event, and (3) time of day of the caffeine event.

FIG. 25 illustrates a further example of a system architecture according to at least one embodiment. In at least one implementation the system is hosted on an Apache Tomcat Web server that is accessible via a secure service over Hypertext Transfer Protocol Secure (https). The system uses a three-tier architecture composed of a backend database, a controller, and presentation tiers. The first tier includes an Oracle database server that stores user account information to provide secure access to the system. The second (controller) tier provides access to the prediction engine and implements the functionality required to create and manage multiple predictions. The third (presentation) tier provides interactive plotting capabilities for multiple predictions with the ability to dynamically zoom on the x-axis of the plots as illustrated in FIG. 25. The illustrated and discussed controller and presentation tiers of this implementation were developed using Java Platform, Enterprise Edition 7, JavaServer Faces 2.2, and PrimeFaces 5.2 technologies. The GUI in the presentation tier uses Web standards supported by modern Web browsers without any need for plugins. FIG. 25 displays similar information to FIG. 24 plus a sleep restriction 2558 with no caffeine consumption.

FIGS. 26A-26D illustrate a further example embodiment that was used in a study with the objectives including the following: the ability to predict the effects of different sleep and caffeine schedules on alertness impairment is a key component of fatigue-management systems and to provide this capability to broad communities, a system discussed above for predicting the alertness impairment of a group of individuals as a function of time of day, sleep history, and caffeine consumption. Here, the capability is provided to more effectively identify caffeine interventions (time and dose) that result in desired peak-alertness levels at the desired times.

The caffeine-optimization method discussed above was used in the predictive models allowing for automatic identification of caffeine interventions that result in user-specified alertness outcomes. The user interface was also modified to facilitate the creation of schedules.

For specified sleep and caffeine schedules, this system embodiment predicts alertness impairment as measured by the psychomotor vigilance test. Optionally, for a specified peak-alertness period, impairment threshold, and total caffeine intake, it identifies caffeine schedules that safely maximize alertness. Schedules and predictions can be exported, and are erased upon logout. This added capability increases the efficiency by which diverse communities of users can identify safe and efficacious caffeine interventions for any given sleep/wake schedule. As such, it serves as a practical and effective aid in the design of research studies and work/rest schedules, and to raise public awareness of the effects of sleep schedules and caffeine on alertness impairment.

This discussed system is the only evidenced-based tool known by the inventors to be publicly available to the operational and research communities to aid in the design of effective rest/work schedules for a group of individuals. Here, the previous version has been updated with enhanced functionality by adding the ability to automatically identify the best times to consume caffeine and corresponding optimal doses that safely lead to the desired alertness levels at desired times of day. This new and unique capability maximizes the benefit of caffeine as a stimulant, leading to its more efficacious use in rest/work schedules strengthened by this fatigue countermeasure.

The discussed system has the added capability to automatically suggest caffeine interventions (time and dose) that lead to peak-alertness levels for the desired times of the day by using the previously described caffeine optimization method. For any particular combination of user-defined sleep/wake schedule, desired peak-alertness periods, maximum alertness-impairment level, and maximum total caffeine in a 24-hour period, the updated tool generates a caffeine schedule that best meets these constraints. To achieve this functionality, a caffeine-optimization method has been added with the above discussed predictive models.

Previously, the tool predicted alertness impairments for user-defined sleep/wake and caffeine schedules, but required multiple trial-and-error simulations when the user wished to obtain a caffeine schedule that resulted in a desired alertness impairment during certain wake periods. In the updated version, this process is automatically performed by the system, leading to a more effective means to identify caffeine interventions to guide the design of work schedules and caffeine studies. The ease of use of the discussed system has been enhanced by adopting a drag-and-drop graphical interface for the creation of sleep and caffeine schedules.

This system embodiment predicts PVT performance for a representative individual of a group, as a function of time of day, sleep/wake schedule, and caffeine consumption (dose and time). It offers the capability to: compare and contrast the effects of different sleep/wake and caffeine schedules on alertness impairment, and automatically identify caffeine interventions that lead to the desired alertness impairments at the desired times of day.

Given a sleep/wake and caffeine schedule, this system embodiment provides the corresponding alertness-impairment (i.e., PVT) predictions as illustrated, for example, in FIG. 26A. The discussed system embodiment offers the optional capability to automatically identify the optimal time and dose of caffeine consumption that lead to the desired alertness outcomes. Given a sleep/wake schedule, desired periods of peak alertness, maximum acceptable alertness impairment during peak alertness, and maximum total caffeine consumption in a 24-hour running period, the system provides caffeine interventions during wake periods that lead to peak alertness at the desired times, while, to the extent possible, satisfying the constraints on alertness impairment and caffeine amounts as illustrated, for example, in FIG. 26B.

To compare and contrast the effects of different sleep/wake and caffeine schedules on alertness, the user inputs to the discussed system include 1) sleep episode (start and end days, and time) and 2) caffeine episode (day, time, and dose of caffeine), with the dose entered manually or selected from a drop-down list of more than 30 popular caffeine-containing products. Together, a series of sleep and caffeine episodes spanning a period of up to 30 days define a schedule, where all day and time entries are for the same time zone. With the updated interface, sleep and caffeine episodes are added to a schedule by dragging and dropping the corresponding icon onto the timeline of the selected schedule. FIG. 26A illustrates where the schedule highlighted with a yellow background, "5 h per night sleep," is the selected schedule. Alternatively, a schedule can be imported, for example, from a Microsoft Excel file (e.g., FIG. 26A, "Import Data") or similar data structure using a predefined format. Each generated, or edited schedule, can be saved with a user-defined name and exported, for example, as a Portable Document Format (PDF) file.

For each sleep/wake and caffeine schedule, this system embodiment may display plots of alertness-impairment predictions for one of three PVT statistics: mean response time (RT; in ms), mean speed (average of the reciprocals of RT; in 1/s), and number of lapses (number of RTs>500 ms). The statistics are for a 10-minute test and are selected from the "Alertness Statistic" drop-down menu located above the schedules as illustrated, for example, in FIG. 26A. The displayed plots can be saved in an image file using the "Export Graph" button, and the numerical values for each of the three predicted statistics can be exported in a Microsoft Excel file, along with the corresponding sleep/wake and caffeine schedules (e.g., FIG. 26A, "Export Data"). The functionality to export schedules allows users to import and reuse schedules in a future session, as the discussed system does not save schedules or their predictions online. This system implementation erases all data when the user logs out. In a different implementation, the data could be saved for later use or allow for continuing updating in real-time or at predetermined intervals as discussed above in connection with other embodiments.

To automatically identify caffeine interventions that lead to desired alertness impairments for a selected sleep/wake schedule, the user inputs, for example, may include 1) desired periods of peak alertness (start and end days, and time), 2) maximum alertness impairment during peak alertness (RT of 150 to 500 ms), and 3) maximum total caffeine consumption in a 24-hour running period (100 to 1500 mg) as illustrated, for example, in FIG. 26B. Users can select periods of peak alertness by dragging and dropping the corresponding icon onto the schedule timeline, and select thresholds for maximum alertness impairment and maximum total caffeine by dragging the sliders to the desired values. Selecting these two thresholds is optional; their corresponding default values are 300 ms and 400 mg.

For the selected sleep/wake schedule, this discussed system displays the identified caffeine interventions onto a new, updated schedule and the resulting plot of alertness-impairment predictions as illustrated, for example, in FIG. 26C. As described above, users can rename, save, delete, and export the updated schedule, as well as save the displayed plot as an image file.

The predictive model was formulated in this discussed system so that alertness impairment is a function of the present sleep debt that accumulates over days of less than 8 hours of sleep per day. In contrast, sleep durations of greater than 8 hours per day improve alertness. The discussed system is initialized so that on day "0" there is no sleep debt after 8 hours of sleep (23:00-07:00). Otherwise, users should enter 7 days of sleep history at the beginning of the schedule, as sleep episodes in the recent past have greater influence on near-future alertness than do sleep episodes from the remote past, with episodes more than 7 days old having negligible influence.

An assumption was that the effects of caffeine on alertness is multiplicative, implying that caffeine consumption results in greater benefits during periods of large alertness-impairment values, where the magnitude of the benefit depends on the time and dose of caffeine and the concentration of caffeine from previous doses.

For the automatic identification of caffeine interventions that optimize alertness impairments, constraints were added to the optimization problem that result in the discovery of safe solutions in a practical amount of computational time. To this end, the peak-alertness solutions equally weight the cumulative deficit above the maximum alertness-impairment threshold and the worst alertness level during peak-alertness periods. In addition, to identify safe caffeine interventions, the optimization model penalizes solutions when the cumulative caffeine concentration in the blood is higher than the maximum level achieved by a single 400-mg dose. To obtain solutions in a matter of seconds, a set of restrictions were used in this system: 1) caffeine doses to 100, 200, or 300 mg, 2) dosing to occur on the hour, and 3) the time between doses to be at least 2 hours. This system attempts to find solutions that use the least amount of caffeine, while meeting the imposed constraints. However, in certain cases, even when using the maximum amount of caffeine, it may not be possible to obtain solutions that satisfy all constraints, and the resulting solution may lead to alertness impairments above the maximum impairment threshold. To obtain feasible solutions, users may raise the maximum alertness-impairment threshold during peak alertness, the maximum total caffeine consumption in a 24-hour period, or both as illustrated, for example, in FIG. 26B, "Advanced Options". Alternatively, the near-optimal solution will provide a good starting point for manual exploration of more desirable caffeine interventions.

The discussed system is hosted on an Apache Tomcat Web server and provided access through a secure service over Hypertext Transfer Protocol Secure (https). A three-tier architecture is used consisting of 1) a PostgreSQL database server, which stores user account information, 2) a controller, which provides access to the alertness prediction model and caffeine optimization algorithm, and implements the functionalities required to create and manage multiple predictions and optimizations, and 3) an interactive user interface, which provides the ability to create schedules by dragging and dropping sleep, caffeine, and peak-alertness episodes onto the schedule timeline, show and hide plots, and dynamically zoom into and out of plots. The system runs without any plugins and is accessible through multiple Web browsers.

FIG. 26A shows a screen capture of the interface that appears upon user login. At the top, it shows three schedules, "8 h per night sleep," "5 h per night sleep," and "5 h per night sleep+100 mg caffeine," with the middle schedule (yellow background) selected. For a selected schedule, users may view and edit the day and time of sleep episodes (grey icons) as well as caffeine dose episodes (cup icons) by clicking on the corresponding icon. For example, by clicking on the sleep icon of the selected schedule in FIG. 26A ("5 h per night sleep"), a pop-up window displays the start and end days of the sleep episode, along with the start (01:00) and end (06:00) times. Users may also add sleep and caffeine episodes by dragging and dropping the corresponding icon located above the schedules onto the timeline of the selected schedule. Users may select a schedule by clicking on its timeline or by choosing it from the drop-down list under "Schedules" on the right-hand side of the figure. The four buttons on the upper right-hand side of each schedule timeline allow users to export the schedule, for example, as a PDF file like that depicted in FIG. 26D, change a schedule name, save a schedule with the same or a different name, and delete the schedule, respectively.

Below the schedules, FIG. 26A shows the three corresponding alertness impairment predictions using the mean RT PVT statistic, from day 0 through day 4 of the four-day schedule, which starts on day 1 and lasts until the sleep episode on day 5. The plots allow for the comparison of the effects of different sleep durations on alertness (e.g., 5 hours vs. 8 hours of sleep per night) as well as for the assessment of the beneficial effects of caffeine countermeasures (e.g., 5 hours per night of sleep with and without 100 mg of daily caffeine at 08:00). The system supports up to five schedules and plots per session, where users can hide (or unhide) plots from view by clicking on the corresponding schedule name below the x-axis scroll bar. To map PVT statistics into a more broadly understood metric of vigilance deficits, the findings from Dawson and Reid and Williamson et al. were used to obtain an equivalence between PVT alertness-impairment values and blood alcohol concentrations (BACs). It is estimated that a mean RT of 339 ms attained after 19 hours of continued wakefulness corresponded to a 0.06% BAC as illustrated by the horizontal dashed black line in FIGS. 26A-26C and that a mean RT of 458 milliseconds attained after 24 hours of continued wakefulness corresponded to a 0.08% BAC.

The panel on the right-hand side in FIG. 26A provides brief stepwise instructions on how to select, edit, and add sleep and caffeine episodes to a schedule, make predictions, and obtain optimal caffeine solutions. In addition, users can obtain brief descriptions of the functionalities of the various buttons of the graphical interface by using the computer mouse to hover over them. By clicking on the "Help" button in the upper right-hand corner of the display window, the system displays a user guide, which provides a comprehensive description of the functionalities of the system.

The "Obtain Optimal Caffeine Schedule" checkbox at the bottom of the right-hand panel in FIG. 26A takes users to another graphical interface illustrated in FIG. 26B, from which they can obtain optimal caffeine interventions for the selected schedule. A similar interface could be used for generating a sleep-wake schedule separate or to provide an input to the caffeine optimization model. This may be achieved by first adding peak-alertness periods to the schedule timeline by dragging and dropping the "Peak Alertness" icon (green icon) located above the schedule onto the timeline (FIG. 26A), and then clicking the "Optimize" button in the lower-right panel. For the schedules shown in FIG. 26A, these steps resulted in the identification of the optimal caffeine intervention named "5 h per night Sleep+ Optimal caffeine solution" in FIG. 26A and the corresponding alertness-prediction plot. In this case, peak-alertness periods with a maximum alertness-impairment threshold of 300 ms from 08:00 to 16:00 for days 1 to 4 required daily caffeine doses at 07:00 of 100, 200, 300, and 300 mg, respectively, for each of the four days. In at least one embodiment, larger cup icons indicate larger caffeine doses. The "Advanced Options" checkbox at the bottom of the lower-right panel allows users to set thresholds for maximum total caffeine in a 24-hour period and the maximum alertness-impairment level. Unchecking the "Obtain Optimal Caffeine Schedule" in the upper-right panel takes users back to the prediction graphical interface illustrated in FIG. 26B.

To demonstrate the potential benefit of this system embodiment, the effects of caffeine countermeasures as recommended by the U.S. Army guidelines were compared with those of the system, for a 36-hour TSD challenge (from 07:00 on day 1 to 19:00 on day 2). For sustained operations, the guidelines recommend a 200-mg caffeine dose at midnight and 200 mg every 4 hours thereafter, as needed. FIG. 26C illustrates an arbitrarily selected period of peak performance, ranging from midnight to 14:00 on day 2; the corresponding Army guideline of four 200-mg doses of caffeine, starting at midnight on day 2 and ending at 12:00 noon on day 2; and the associated alertness-impairment prediction plot. FIG. 26C also shows the optimal caffeine-intervention schedule recommended by the system and the associated alertness-impairment prediction plot, for the same total amount of 800 mg of caffeine used in the guideline schedule. FIG. 26D, obtained by exporting the "Optimal caffeine solution for 36 h of TSD" schedule as a PDF, illustrates the numerical values of the optimal caffeine times and doses recommended by the tool. By suggesting caffeine interventions every 2 hours, for a total of five doses of either 100 and 200 mg each, concentrated over an 8-hour span during which time the circadian effects on alertness were greatest, the solution consistently kept impairment below the 0.06% BAC equivalent and only slightly above the 300-ms threshold, during the peak-alertness period. In contrast, the Army guideline solution resulted in worse impairment levels, including three time periods when alertness impairments exceeded the 0.06% BAC level, with impairment as high as 378 ms at 08:00 on day 2.

VI. Verification Studies a. Smartphone Implementation

An implementation of the alertness impairment model built into a system according to at least one embodiment has been retrospectively validated by its predictions being assessed on 442 subjects from 14 different studies, including 24 different sleep/wake conditions (from 3 to 10 hours of sleep per night to 88 hours of TSD) and nine different caffeine conditions during sleep deprivation (from single/ repeated doses of 100-600 mg). The alertness impairment model has been shown, when individually customized, to capture the individual's trait-like response to sleep deprivation under different sleep-deprivation challenges as discussed in Ramakrishnan et al., *Can a mathematical alertness model predict an individual's trait-like response to both total and partial sleep loss?*, Journal of Sleep Research, vol. 24, pp. 262-269 (2015), which is hereby incorporated by reference. Through retrospective computer simulations mimicking real-time operation, the validated alertness model has demonstrated that it could automatically and continually learn an individual's trait-like response to TSD and CSR challenges on the fly as discussed in Liu, et al., *Real-time individualization of the unified alertness model of performance*, Journal of Sleep Research, vol. 26, pp. 820-831 (2017), which is hereby incorporated by reference. It was shown that a Bayesian learning algorithm could progressively adapt the model parameters after each PVT, so that model predictions increasingly matched an individual's sequence of PVT measurements during sleep restriction. However, these results were all based on retrospective analyses of simulated real-time performance, because a platform and method for prospective, real-time operation was not available when those studies were done.

Using a mobile application similar to that discussed in connection with select figures from FIGS. 9A-23C that uses the results of each PVT to automatically and progressively learn an individual's trait-like response to sleep deprivation and to make individualized alertness impairment predictions in real time. To validate the system, the system was used to collect PVT data before, during and after TSD in a laboratory-controlled study, and to make real-time prospective alertness impairment predictions during the TSD challenge. User inputs to the system include: (a) sleep schedule (FIGS. 11B-11D); (b) caffeine schedule (FIGS. 12A-C and 17B); and (c) PVT data, which are obtained via tests administered within the app itself (FIG. 14). In at least one embodiment, sleep and caffeine schedules can be entered retroactively or proactively to explore the effects of prior or future interventions on alertness impairment, respectively, and can be edited at any time. A wrist-worn device can also be used to automatically enter sleep data via actigraphy as discussed previously. PVT data—without which predictions are based on a group-average model—are used to individualize the model. In at least one embodiment, the system generates individualized (see, e.g., FIGS. 16A and 16C) and group-average (see, e.g., FIG. 15) predictions for mean response time (RT) as the PVT statistic. The system used mean RT because it is one of the most frequently used PVT statistics, and because it allows for the most accurate estimation of individual-specific alertness impairment predictions under both TSD and CSR. The system used in the experiment stored raw RT data. FIGS. 10B and 16C illustrate screens accessed by the "Status" and "Prediction" buttons, respectively, in the main menu (see, e.g., FIG. 9A), which provide individualized or group-average predictions for mean RT as a function of time of day.

The predictions by the model are based on: (a) sleep-wake history; (b) caffeine dosage, absorption rate and time of consumption; and (c) time of day as discussed above. When there was an absence of prior data, the predictions assumed that the user slept 8 hours (23:00-07:00 hours) during the previous night and had no accumulated sleep debt. In addition, the model used initial model parameters tuned to provide group-average predictions based on 10-minute PVTs. Thereafter, the model predictions increasingly reflected the inputs (sleep and caffeine) entered by the user, but continued to reflect group-average alertness impairment until the user performs a PVT Immediately after the first PVT session, the system automatically adapted the model parameters on the fly, using a Bayesian learning algorithm. At this point, the predictions started to reflect the user's trait-like response to sleep deprivation. Subsequently, after each intermittent PVT, the system progressively adapted the model parameters to match the PVT results. In the process, it "learned" the user's response to different sleep and caffeine schedules as a function of time of day.

PVT settings and latency characterization were done using the system. Users perform PVTs via the "PVT Session" interface (FIGS. 9A and 14), where "Settings" allows for the selection of a PVT session duration of 3, 5 or 10 minutes (FIG. 23C) and customization of the inter-stimulus interval (ISI), with a minimum delay of 1 or 2 seconds and a maximum delay ranging from 4 to 10 seconds (FIG. 23B). Using the customized minimum and maximum delays, the system randomized the ISI for each stimulus presentation. The reported mean RT accounted for (i.e., it subtracts) the system and software latency, which was characterized using a RTBox apparatus used to develop the PC version of the system. The hardware-software RT latency for the system was 58 milliseconds and 68 milliseconds when implemented on the iPhone 6s and iPad Air 2, respectively, running iOS 10.3.2, and 79 milliseconds for the Samsung Note 4 running Android 6.0.1. RT latencies were assessed for whether they depended on the orientation of the smartphone (portrait vs. landscape) and the finger used for responding (index vs. thumb), but no significant statistical differences was found among the configurations. Nonetheless, it was recommended that PVTs in the system be performed consistently, always using the same configuration.

As discussed above, to assess the PVT and real-time individualized predictions in the system, a prospective sleep-loss study was performed, where all test and prediction data were collected and stored within the system. The study participants included 21 healthy participants (14 men and seven women; 18 civilians and three active-duty military personnel), ranging in age from 18 to 34 years [mean=24.6 years and standard deviation (SD)=4.6 years], who were screened for sleep disorders and mental health problems. The study was approved by the Walter Reed Army Institute of Research Human Use Committee (Silver Spring, Md., USA). Written informed consent was obtained from each subject prior to their participation.

During each of the 13 days prior to the in-laboratory phase, participants completed a sleep/wake and caffeine diary at home using the app in a Samsung Note 4, and continually wore a Philips Respironics Actiwatch-2 wrist actigraphy watch. During this period, participants slept an average of 7.7 hours per night (SD=1.7 hours), as estimated by actigraphy. Participants were allowed to consume no more than 400 mg of caffeine per day. Each day, they used the system to perform five to six 5-minute PVTs (ISI: 1-4 seconds), once every 2-3 hours. On the 13th day, participants reported to the laboratory at 19:00 hours, went to bed at 23:00 hours, woke up at 07:00 hours the next morning, and then underwent 62 hours of TSD followed by 1 night of recovery sleep (12 hours in bed). Participants manually entered the corresponding hours of sleep into the system (see, e.g., FIGS. 19A-19C). During this laboratory phase, participants performed three different versions of the 5-minute PVT using a standalone PC and a mobile system (each once every 3 hours, order counterbalanced, with a 5-minute break between versions). In all, each participant performed 23 tests per version (20 during TSD, three after recovery). All data (raw PVT and predictions) were stored in the system, and retrieved after the study was completed.

To assess the reliability of the PVT statistics obtained with the system, these statistics were compared against those collected by a PC based-PVT for each of seven PVT statistics [mean RT, median RT, slowest 10% RT, speed, lapse 500 ms (number of RTs>500 ms), lapse 355 ms (number of RTs>355 ms), and number of false starts]. A set of statistics was computed: (a) paired differences for three levels of sleep deprivation; (b) Pearson's correlation using data from all 23 PVTs during the in-laboratory phase; (c) Spearman's rank-order correlation of data averaged over the 20 tests during TSD; and (d) effect size (Cohen's d) between group PVT performance at baseline (0-16 hours of TSD) and that after extended sleep loss (40-62 hours of TSD).

To assess the system's ability to learn and accurately predict an individual's response to sleep loss in real time, the RMSEs were calculated between the system-measured mean RTs and the real-time system-predicted mean RTs. To assess how well the system progressively learned each individual's trait-like response to sleep loss, the RMSEs were compared over the last 24 hours of TSD as a function of the number of PVTs used for alertness model individualization. The "best-fit" model estimate was computed for each individual, which we obtained retrospectively by fitting the model using all available system PVT data for an individual.

To validate the system PVT against the PC-PVT, its bias was quantified, their correlations computed in value and rank, and effect sizes of sleep loss compared between the two devices on 5-minute tests, for each of seven PVT statistics. FIG. 27 shows the temporal profile of mean RT for the two devices, while Table 2 below shows the means and SDs of paired differences across three different TSD periods, Pearson's and Spearman's correlation coefficients, and effect sizes of sleep loss. The system PVT generally resulted in lower impairment scores than the PC-PVT, yielding statistically significant differences for mean RT, median RT and speed for each of three TSD periods (p<0.05, Wilcoxon signed rank test). Each statistic was well correlated (p<0.001) in value and rank across versions, with Pearson's coefficient exceeding 0.5 and Spearman's coefficient exceeding 0.75 for all statistics. Lastly, except for false starts, the effect sizes of sleep loss on system PVT-derived statistics (1.53-1.93) were comparable to those on PC-PVT-derived statistics (1.49-2.20). Importantly, the average psychomotor vigilance after extended sleep loss (40-62 hours) was significantly worse than that at baseline (0-16 hours) for all statistics in both versions (p<0.01, Wilcoxon signed rank test; results not shown in Table 2).

TABLE 2

| PVT Statistics | Mean paired difference (SD) (PC-PVT-system PVT) | | | Correlation coefficient | | Effect size (Cohen's d) | |
|---|---|---|---|---|---|---|---|
| | 0-16 hr (n = 105) | 16-40 hr (n = 168) | 40-62 hr (n = 147) | Pearson (n = 483) | Spearman (n = 21) | PC-PVT | System PVT |
| Mean RT (ms) | 9 (21)$^a$ | 14 (56)$^a$ | 25 (104)$^a$ | 0.72 | 0.86 | 1.99 | 1.88 |
| Median RT (ms) | 8 (18)$^a$ | 12 (28)$^a$ | 18 (60)$^a$ | 0.61 | 0.83 | 1.49 | 1.53 |
| Slowest 10% RT (ms) | 8 (75)$^a$ | 18 (281)$^a$ | 55 (499) | 0.71 | 0.77 | 2.20 | 1.86 |
| Speed (s$^{-1}$) | -0.2 (0.4)$^a$ | -0.2 (0.3)$^a$ | -0.2 (0.5)$^a$ | 0.79 | 0.84 | 1.76 | 1.66 |
| Lapse 500 ms (#) | -0.2 (0.9)$^a$ | 0.2 (3.2) | 0.7 (5.3) | 0.76 | 0.78 | 1.87 | 1.91 |
| Lapse 355 ms (#) | 1.0 (3.6) | 3.0 (5.5)$^a$ | 2.8 (7.9)$^a$ | 0.77 | 0.84 | 1.66 | 1.93 |
| False Start (#) | -0.6 (4.3)$^a$ | -3.6 (7.8)$^a$ | -6.6 (9.9)$^a$ | 0.56 | 0.83 | 0.64 | 1.19 |

Table 2 shows the mean (standard deviation [SD]) of paired differences (across three different periods of total sleep deprivation) and correlation coefficients (Pearson and Spearman) between the statistics obtained from the two PVT versions. Also shown are the effect sizes of sleep loss in the two PVT versions. All results are based on 5-minute PVTs. Where $^a$ signifies a p<0.05, one-tailed Wilcoxon signed rank test.

To validate the ability of the system to learn and predict an individual's response to sleep loss in real time, the predictions of mean RT were analyzed over the last 24 hours of TSD as a function of the number of PVTs used for alertness model individualization. FIGS. 28A-28C show the system PVT data and best-fit model estimate for the last day of the at-home phase of the study, the 62 hours of TSD, and the recovery day for three subjects (#7, #9 and #11) representing three broadly different trait-like responses to sleep loss. The retrospectively obtained best-fit alertness model estimate indicates the upper-limit accuracy to be expect from the real-time app predictions. FIGS. 28A-28C also show individualized predictions after the at-home phase, as well as after 8 and 12 PVTs during TSD. For each subject, as the number of available measurements increased, the predictions progressively converged to those of the best-fit estimate.

FIG. 24 shows the average RMSE of the individualized predictions over the 21 subjects as a function of the number of PVT measurements available—and used by the system—during TSD for model customization in Table 3 below. The accuracy of the predictions gradually increased with the number of PVT measurements used for model customization, with the average RMSE falling within ~10 ms of the best-fit RMSE after 12 PVTs during TSD. RMSEs (ms) of individualized predictions of mean RT performance over hours 38 to 62 of the TSD period as a function of number of the system PVT measurements available during TSD for each of the 21 subjects. Also shown is the number of at-home PVT measurements available at the start of TSD.

TABLE 3

| | # at-home PVT | # of PVT measurements available (and used by the app) during TSD for alertness model adaption | | | | | | |
|---|---|---|---|---|---|---|---|---|
| Subject # | measurements | 0 | 2 | 4 | 6 | 8 | 10 | 12 | All |
| 1 | 74 | 116 | 118 | 117 | 116 | 50 | 33 | 24 | 22 |
| 2 | 71 | 98 | 96 | 95 | 94 | 94 | 84 | 78 | 55 |
| 3 | 27 | 134 | 130 | 130 | 113 | 59 | 41 | 36 | 30 |
| 4 | 66 | 260 | 259 | 255 | 239 | 192 | 140 | 120 | 80 |
| 5 | 62 | 82 | 82 | 80 | 75 | 75 | 68 | 60 | 53 |
| 6 | 73 | 157 | 157 | 158 | 164 | 156 | 123 | 120 | 118 |
| 7 | 76 | 98 | 92 | 86 | 79 | 84 | 66 | 58 | 61 |
| 8 | 68 | 40 | 41 | 40 | 42 | 35 | 29 | 24 | 24 |
| 9 | 73 | 137 | 128 | 124 | 120 | 79 | 54 | 45 | 30 |
| 10 | 76 | 57 | 56 | 56 | 54 | 42 | 35 | 33 | 24 |
| 11 | 70 | 71 | 70 | 68 | 69 | 49 | 32 | 24 | 20 |
| 12 | 73 | 82 | 76 | 73 | 62 | 59 | 58 | 58 | 59 |
| 13 | 69 | 211 | 196 | 193 | 179 | 106 | 77 | 69 | 44 |
| 14 | 74 | 78 | 73 | 69 | 66 | 51 | 37 | 30 | 33 |
| 15 | 58 | 169 | 161 | 157 | 132 | 73 | 53 | 43 | 41 |
| 16 | 73 | 117 | 113 | 109 | 100 | 78 | 78 | 75 | 72 |
| 17 | 73 | 103 | 93 | 85 | 75 | 56 | 56 | 54 | 53 |
| 18 | 71 | 155 | 145 | 138 | 129 | 73 | 46 | 40 | 24 |
| 19 | 67 | 53 | 50 | 47 | 46 | 35 | 33 | 33 | 35 |
| 20 | 71 | 95 | 80 | 74 | 69 | 47 | 50 | 53 | 51 |
| 21 | 34 | 199 | 189 | 189 | 164 | 79 | 56 | 49 | 34 |
| Average | 67 | 120 | 114 | 112 | 104 | 75 | 59 | 54 | 46 |

The system progressively learned and with increasing accuracy predicted in real time the effects of sleep/wake schedules, caffeine consumption and time of day on an individual's alertness. Here its implementation in two smartphone platforms is described, and validated its reliability in measuring and predicting PVT performance during a prospective 62-hour TSD study. The temporal profiles of the system PVT and the PC-PVT showed that TSD induced alertness impairment, increasing mean RTs and degrading performance on other PVT statistics. Both devices were found to have captured circadian effects and yielded well-correlated 5-minute PVT statistics (FIG. 27; Table 2), detecting both within- and between-subject variations in the temporal profiles of performance across 62 hours of TSD. Compared with the PC-PVT, the system PVT yielded faster RTs and more false starts, presumably due to device-dependent factors. Similar results have previously been observed, with 3-minute PVTs on a smartphone app yielding faster RTs, fewer lapses and more false starts than on a tablet. Except for false starts, effect sizes of system PVT-derived statistics were generally slightly lower or similar to those derived from PC-PVT. Interestingly, upon reducing the lapse threshold from 500 to 355 milliseconds, the effect size of the lapse statistic decreased from 1.87 to 1.66 for the PC-PVT, while increasing marginally from 1.91 to 1.93 for the system PVT, suggesting that the system is equally sensitive to sleep loss regardless of lapse threshold. Most importantly, sleep loss had a large effect (Cohen's d>1.00) on all system PVT-derived statistics. Together, the results support the use of the system as a viable tool for measuring alertness impairment due to sleep loss.

The system progressively and automatically learned in real time each individual's trait-like response to sleep loss during TSD, yielding increasingly more accurate predictions of alertness impairment as the number of PVT measurements available for model customization accrued. Reassuringly, the average prediction error at the end of the 62-hour TSD challenge using the system (46 milliseconds) was equivalent to the error obtained in a post hoc analysis of a previous 64-hour TSD study (45 milliseconds). Of note, here results computed in real time are presented, using all collected data and all subjects, just as such an application is intended to work in the real world. This is in stark contrast to all previously reported alertness impairment model predictions by the inventors and others, where computations are performed off-line upon completion of a study, often after eliminating outlier data and anomalous subjects.

Perhaps unsurprisingly, the system could not learn an individual's response to sleep loss during the at-home phase of the study, when the habitual sleep/wake schedule (which averaged almost 8 hours of sleep per night) was maintained as depicted in FIG. 29. It took at least 12 PVT measurements over the first 36 hours of TSD to generate predictions comparable to those of the best-fit model. This is because while the system continually individualizes the model parameters, model individualization is faster, requiring fewer measurements, if the original model parameters are similar to those of the final, individualized model. Nevertheless, in this regard, the system was expected to be equally capable of predicting alertness impairment using 3-minute PVT data. Overall, these results suggest that the system needs PVT measurements during sleep deprivation to learn and accurately predict an individual's trait-like response to limited sleep.

The system takes as input either actual sleep time or time in bed. The latter might result in the underestimation of alertness impairment, especially when sleep efficiency is low because of exogenous factors, such as ambient lighting and environmental noise, or endogenous factors, such as unfavorable circadian timing. However, because the system individualizes the model parameters using feedback from the user, i.e., through the response to PVTs, differences were expected between time in bed and actual sleep times will be progressively compensated for as PVTs are conducted.

In addition, sensitivity analysis of the model was performed to assess how sleep-time errors affected alertness-impairment predictions, and found that consecutive daily over- or under-estimation of sleep by as much as 30 minutes per day led to a maximum alertness impairment prediction error of no more than 10%. This suggests that the system is robust to small discrepancies in sleep-recording times. In contrast to existing personal sleep-tracking devices, the system can provide actionable information to help mitigate the detrimental effects of sleep deprivation on alertness. For example, 40% of U.S. military members sleep less than 5 hours each night, leading to substantial chronic sleep debt. In addition, certain military occupations only provide limited and varying opportunities to sleep, while requiring periods of heightened vigilance during wakefulness, which may vary in duration and time of day. Such daily variations in sleep/wake schedules and requirements for peak alertness at both favorable and unfavorable phases of the circadian make it challenging, if not impossible, for individuals to self-administer countermeasures to achieve peak alertness at the desired times of the day for the desired durations. In such a scenario, an already-individualized system would use the user's recent history of caffeine consumption and sleep/wake schedule to make individualized predictions of future alertness levels, as well as those regarding the efficacy of future caffeine and nap interventions, to determine the one that optimizes alertness for periods of required heightened vigilance.

b. Caffeine Optimization Method

FIG. 30 schematically illustrates the sleep-wake schedules and the caffeine-dosing strategies for four studies used to validate the alertness model. Ramakrishnan et al., *A unified model of performance for predicting the effects of sleep and caffeine*, Sleep, vol. 39, pp. 1827-1841 (2016). The grey and white areas represent time in bed and time awake, respectively, where the number in each area indicates the number of hours in that period. The particular caffeine doses are represented by the arrows along the top of each schedule with the length of the arrow representative of the dose size (100, 200, 300, and 400 mg). These studies were used to demonstrate the benefit of the optimization method according to at least one embodiment. The studies investigated the effect of caffeine on group-average performance during CSR (Study 1), TSD (Study 4) or a combination of both (Studies 2 and 3). For additional details on these studies, reference is made to the Ramakrishnan et al. 2016 article.

For each of the sleep-wake schedules used in Studies 1 to 4, the dosing strategies that minimized alertness impairment (Z) for a range of values of total amount of caffeine were obtained (i.e., the MINLP in Eq. 9 was solved for different values of DT). FIG. 31 shows the alertness impairment model-predicted performance impairment for both the optimal (circles along the line running from the upper left to the lower right) and the original dosing strategies (diamonds).

From these results, the study focused on two types of solutions. The first solution type involved strategies for enhancing neurobehavioral performance using the same total amount of caffeine ($D_T$) as in the original studies (FIG. 31, vertical arrows). The second solution type involved strategies that attempt to reduce caffeine consumption while achieving at least the same benefit as the original studies (i.e., a value of Z (or score) equal to or smaller than that of the original study) (FIG. 31, horizontal arrows).

FIG. 32 shows the experimental mean RT data (dots with standard error bars) for each study, as well as the model predicted mean RT profiles for the original studies (dashed lines) and the optimal dosing strategies (solid lines) that attempted to enhance neurobehavioral performance, using the same total amount of caffeine as in the original studies (FIG. 31, vertical arrows). The arrows above the study charts are the optimal doses, while the arrows inside the study charts are the original doses. Overall, the model satisfactorily predicted the mean RT for the original studies (i.e., the relative root mean squared error for the four studies ranged from 6% to 17%). Table 4 summarizes the changes in neurobehavioral performance for the optimal strategies. The optimal strategies using the same amount of caffeine showed substantially better performance (smaller Z values) compared with the original dosing strategies.

TABLE 4

| | Original | | Enhanced | Reduced Caffeine[b] | |
|---|---|---|---|---|---|
| Study | Total Caffeine, mg | Z | Performance[a] $Z^c$ | Z | Total Caffeine, mg[d] |
| 1 | 2,000 | 64 | 23 (64) | 61 | 700 (65) |
| 2 | 2,400 | 39 | 20 (48) | 35 | 1,900 (21) |

TABLE 4-continued

| | Original | | Enhanced | | Reduced Caffeine[b] |
|---|---|---|---|---|---|
| Study | Total Caffeine, mg | Z | Performance[a] Z[c] | Z | Total Caffeine, mg[d] |
| 3 | 600 | 67 | 56 (16) | 63 | 500 (17) |
| 4 | 600 | 66 | 39 (41) | 55 | 400 (33) |

In Table 4, [a] represents strategies that used the same total amount of caffeine as the original countermeasures, [b] represents strategies achieved benefits that were at least as good as (if not better than) those in the original studies, [c] is for numbers in parentheses that indicate the percentage of improvement in Z relative to the original studies, and [d] is for numbers in parentheses that indicate the percentage reduction in caffeine consumption relative to the original studies.

For Study 1, the major portion of the 64% improvement (Table 4, column 4) was a result of the reduction of the worst peak predicted daily for the original dosing strategy, which prescribed the same total amount of caffeine (400 mg) at the same time each day (FIG. 32, arrows inside the chart). In contrast, the optimal strategy prescribed more caffeine on later days (with the exception of the last day), owing to increasing sleep pressure, and allocated caffeine at the end of each of the first 4 days of CSR (FIG. 32, arrows above the chart). The optimal strategy did not prescribe caffeine early on the first day of CSR because performance impairment was mitigated by sleep banking (subjects spent 10 hours in bed on five previous nights).

In Study 2, the optimal strategy improved the effect of caffeine by 48% (Table 4). In contrast to the original study, which prescribed the same total amount of caffeine during each of the three periods of wakefulness (FIG. 32, arrows inside the chart), the optimal strategy allocated more caffeine during longer periods of wakefulness (FIG. 32, arrows outside the chart; 900, 800 and 700 mg for the first, second and third periods, respectively). Also, the prediction for the original study prescribed the first dose earlier than needed in the second and third periods, resulting in large alertness impairment at the end of each period. In the optimal strategy, the postponement of the first dose in the second and third periods reduced and balanced the alertness impairment across the periods.

In Studies 3 and 4, the original countermeasures reduced performance impairment more than did the optimal strategies near the middle of the TSD challenge (i.e., the predicted mean RT for the original studies was below the mean RT of the optimal strategies; FIG. 32). However, alertness impairment was substantially greater for the original studies than for the optimal strategies during the last 6 hours of the TSD challenges. Overall, the optimal strategies improved alertness by 16% and 41% compared with the original countermeasures for Studies 3 and 4, respectively (Table 4).

FIG. 33 illustrates the predicted mean RT profiles for the original studies (dashed line) and the optimal strategies (solid lines) that attempted to reduce caffeine consumption, while achieving at least the same benefit as the original studies (FIG. 31, horizontal arrows). Table 4 (columns 5 and 6) shows the changes in caffeine consumption for the optimal dosing strategies. In general, the optimal strategies required less caffeine consumption than the original studies.

For Study 1, the total amount of caffeine used in the optimal strategy was only 700 mg (FIG. 33, arrows above the chart), which was 65% less than that used in the original study (Table 4, column 6), but still yielded a slightly better alertness (Z: 61 versus 64) than the original. In Study 2, the optimal strategy used 500 mg (21%) less caffeine than did the original study (Table 4, column 6), with the major caffeine savings occurring in the third wake period because it was the shortest period (FIG. 33).

The optimal strategies for Studies 3 and 4 reduced the total amount of caffeine intake by 100 mg and 200 mg (17% and 33%), respectively. In these strategies, alertness at the end of the period improved at the expense of alertness at earlier times (FIG. 33).

The optimization method was used to obtain optimal caffeine-dosing strategies for different sleep-wake schedules that included TSD, CSR and their combinations in four separate studies. For these studies, we found strategies that yielded up to 64% greater alertness improvements than the original studies while using the same total amount of caffeine (Table 4, column 4). The results showed that the timing and amount of caffeine should be tailored to the particular situation to maximize its benefits (FIG. 32). For example, in Study 1, the sleep-wake schedule was the same for 5 days of CSR (except the last day, when the wake period was shorter), gradually accumulating sleep debt that led to increasing alertness impairment across the days of CSR. Accordingly, the optimal strategy allocated more caffeine to days with higher sleep pressure. This is in contrast to the original study, which repeated the same doses for each of the five CSR days (FIG. 32, compare external and internal arrows to the chart). Moreover, the timing of the doses in the original case (08:00 and 12:00) could not prevent the predicted alertness impairment for the last 2 hours prior to sleep of the first four CSR days. This impairment was mitigated in the optimal strategy by allocating two doses close to the end of each day.

Recently, it was found that consumption of high amounts of caffeine for several days of sleep restriction can impair the recovery of an individual. Hence, dosing strategies that reduce caffeine consumption can help to mitigate the negative effects of caffeine on recovery. Thus, dosing strategies that reduced caffeine consumption were obtained, while achieving at least the same level of neurobehavioral performance as the original studies. For the four studies, the optimal dosing strategies prescribed between 17% and 65% less caffeine than the original countermeasures.

One potential limitation of tested optimization method is that it does not guarantee the identification of global solutions. Nonetheless, as discussed in this disclosure, the optimization method found strategies that were nearly as effective as those found by a standard optimization algorithm (i.e., simulated annealing), albeit faster by at least two orders of magnitude. This reduction in computational time enables practical use of the optimization method. Another limitation is that optimization method does not account for the possibility that caffeine consumption before bedtime can reduce sleep quality in subjects with regular sleep-wake schedules. Whether this has the same effect in sleep-deprived individuals remains unclear. Nonetheless, by including additional constraints to the optimization problem, strategies that prescribe caffeine a number of hours before bedtime can be avoided. For example, in Study 1, by restricting caffeine consumption in the last 6 hours of wakefulness, the optimal strategies were still able to reduce performance impairment by 26% using the same total amount of caffeine as the original countermeasure, and reduce caffeine consumption by 35% while achieving at least the same benefit as the original countermeasure.

Initially, there was an attempt to solve the formulated MINLP of Eq. 9 with the most widely used algorithm for this type of problem, i.e., branch-and-bound. However, this algorithm was discarded because, for some problems, it took up to 5 days to obtain an optimal solution. Simulated annealing (SA), another widely used optimization method for MINLPs, found optimal solutions in a shorter computational time (although with no assurance of global optimality). Therefore, the SA algorithm was used to benchmark the optimization method discussed in this disclosure. For this purpose, caffeine dosing strategies were computed for Studies 1 to 4 (FIG. 30) that minimized alertness impairment, using the same total amount of caffeine as in the original countermeasures used in the studies. Table 5 shows the values of Z and CPU time for both approaches [SA and tabu search (TS)]. Whereas the Z values for the present TS optimization method were similar to those for the SA algorithm, the CPU time was orders of magnitude smaller for the present optimization method.

TABLE 5

| Study | Z | | CPU time (s) | |
|---|---|---|---|---|
| | SA | TS | SA | TS |
| 1 | 22 | 23 | 5173 | 8 |
| 2 | 19 | 20 | 2422 | 6 |
| 3 | 56 | 56 | 546 | 3 |
| 4 | 39 | 39 | 453 | 4 |

It should also be noted that the model was developed to predict the effects of sleep loss and caffeine consumption on simple neurobehavioral tasks, such as the PVT. Because an individual's performance level in simple tasks may not reflect that individual's performance in other neurocognitive tasks, the computed caffeine strategies may be suboptimal for other tasks. It also has been found that the benefits of caffeine decrease with accumulation of sleep debt (i.e., caffeine provides reduced benefits after 4 days of 5 hours of sleep per night). However, the implemented model does not currently account for the effects of sleep debt on the benefits of caffeine. Consequently, the strategies may potentially overestimate neurobehavioral performance or underestimate the amount of caffeine needed for long CSR scenarios. Moreover, the model does not consider individual differences in sensitivity, or the development of tolerance of caffeine, which could result in paradoxical effects. For example, the optimization method could predict too much caffeine for a caffeine-sensitive individual, which could lead to extended sleep onset, reduced recovery sleep and increased caffeine consumption. In contrast, individuals with low sensitivity to caffeine may require considerably more caffeine than the amount prescribed by the optimal dosing strategy for an average individual.

To assess the sensitivity of the model predictions to variability in the model parameters, a sensitivity analysis was carried out by performing 10,000 simulations. In each simulation, different values for the 12 parameters in the model (i.e., by uniformly sampling from within two standard errors of the nominal values in Table 6) were simultaneously selected, those values were used in the model to predict the PVT mean RT for the original caffeine strategy in Study 2, and computed the percentage of predictions after the first dose that fell within two standard errors of the experimental PVT mean RT. For the 10,000 simulations, this percentage was 66%. This means that, given the variability of the PVT data and the uncertainties in the model parameters, ~66% of the alertness model predictions were statistically indistinguishable from the experimental data. This was only slightly less than the percentage when using the nominal parameter values, which was 75%. This result suggests that, although not perfect, the implemented alertness model is robust to uncertainties in the model parameters. Nonetheless, ultimately, to assess the effectiveness of caffeine-dosing strategies proposed by the optimization method, prospective experimental validation studies will be done, where we compare and contrast different strategies.

TABLE 6

| Parameter | Value | |
|---|---|---|
| Caffeine-free model | | |
| U | 497 (31) | ms |
| $\tau_w$ | 23.0 (3.2) | h |
| $\tau_s$ | 4.0 (1.0) | h |
| $S_0$ | 176 (15) | ms |
| κ | 75 (7) | ms |
| φ | 2.5 (0.2) | h |
| $\tau_{LA}$ | 7.0 (2.6) | d |
| $L_0$ | 140 (14) | ms |
| Caffeine effect $g_{PD}$ model | | |
| $M_0$ | 3.59 (0.66) | $g^{-1}$ |
| $k_0$ | 0.49 (0.17) | $h^{-1}$ |
| z | 1.63 (1.61) | $g^{-1}$ |
| $k_a$ | 3.21 (0.78) | $h^{-1}$ |

Another limitation is that the parameters of the implemented model were estimated to capture a 'group-average' response to sleep loss and caffeine consumption. However, there may be considerable individual variability in both the response to sleep loss and the restorative effects of caffeine. Variation in the effect of caffeine is, in part, a result of genetic polymorphisms in the genes coding for the main caffeine-metabolizing enzyme, P-450, and the main caffeine targets, adenosine receptors A1 and A2A. To assess how well a group-average model captures individual differences, the RMSE was computed between the model predictions and the measured mean RT data from each subject after caffeine consumption. For example, using the original caffeine strategy for the 10 subjects in Study 2, the average RMSE was 56 ms (range, 31 to 96 ms). In contrast, the RMSE between the group-average model predictions and the group-average data was 33 ms, suggesting that the group-average model captures the mean alertness impairment of the group better than it does that of each individual in the group.

To further assess the suitability of using the group-average model predictions for different subjects, an estimate of how long the prediction error remained within a given threshold of the nominal parameter set predictions in the 10,000 simulations used for sensitivity analysis was made. For this purpose, the assumption was that the 10,000 random parameter sets represented 10,000 individual subjects and computed the prediction error as the absolute difference between the mean RT predicted with the nominal parameter set and each of the random parameter sets. Then, for each simulation, a determination was made for the time (after the first caffeine dose) for which the prediction error exceeded 25% of the mean RT predicted using the nominal parameters. For 53% of the cases, the predicted mean RT remained within 25% of the nominal mean RT predictions for the entire time (i.e., for the 59.8 hours from the first caffeine dose until the end of Study 2). For the remaining 47% of the cases, the average time to exceed 25% error was 13.6 hours (range, 5 minutes to 59.6 hours). In other words, for about half of the cases (representing 'average-like' subjects) the prediction error remained relatively small throughout the duration of the study, whereas for the other half (representing subjects highly vulnerable or resilient to sleep loss and/or highly sensitive to or tolerant of caffeine), on average, the error considerably increased after 13.6 hours. This result suggests that a group-average model cannot always be used to obtain optimal caffeine strategies at the individual level. Such inter-subject variability could be addressed in the future by coupling the caffeine optimization algorithm with an individualized prediction model to provide tailored, subject-specific interventions.

In summary, an optimization method for designing safe and effective caffeine countermeasure strategies to mitigate performance impairment for arbitrary sleep-loss conditions was developed. The unique capability of the implemented optimization method is that it combines a validated mathematical model with optimization methods to determine when and how much caffeine to consume to achieve peak performance at the most needed times.

In at least one embodiment, test points are solutions. In further embodiments to those defined in the claims, the claim dependency may be read in the multiple dependency structure where possible including the dependent method claims may be added to the other two independent method claims when no overlap exists.

c. Sleep Latency Model Validation

The data from Study D1 was used to estimate parameters of the sleep-latency model, and the data from the remaining 7 studies (Studies V1 to V7) were used to independently validate the model predictions. See FIG. 3A.

Study D1 (Borbely et al., 1989): Eight subjects slept from 0000 to 0700 on day 1 and remained awake until 1700 on day 2. Sleep latency was measured using the multiple sleep latency test [MSLT (Carskadon and Dement, 1979)] every 2 hours from 0700 to 1700 on day 1, then at 0000 and every 2 hours from 0500 to 1700 on day 2, yielding a total of 14 data points.

Study V1 (Richardson et al., 1982): Eight subjects between 19 and 23 years of age (four men) spent 3 days and nights in a laboratory, with time in bed (TIB) from 2330 to 0800. Each day, sleep latency was measured using the MSLT every 2 hours from 0930 to 2130. Sleep-latency values at each time point correspond to the average over the 3 days, yielding a total of 8 data points.

Study V2 (Carrier et al., 2007): Thirty-four subjects [mean age (standard error), 38.5 (3.6) years], including 14 men, were divided in two groups matched in terms of age and sex. Both groups spent a baseline night in the laboratory following their habitual sleep time. The habitual TIB was approximately from 2300 to 0700. For one group, sleep latency was measured using polysomnographic (PSG) sleep recordings at the habitual bedtime of each subject, whereas for the other group it was measured after 25 hours of wakefulness. This study yielded 2 data points.

Study V3 (Brooks and Lack, 2006): Twenty-four subjects [mean age (standard deviation), 22.5 (3.9) years], of which half were men, participated in a cross-over study with 5 conditions, separated by at least 2 nights between conditions. Each subject was assigned the order of the conditions randomly. In each condition, subjects slept at their homes from 0200 to 0700, after which they reported to the laboratory at 1300. Subsequently, the subjects were allowed to sleep for a brief period that ended at 1500 (0, 5, 10, 20, or 30 minutes, depending on the condition). Sleep latency was measured using PSG sleep recordings at the beginning of the sleep period, and at 1, 2, and 3 hours after subjects were awakened, yielding a total of 20 data points.

Study V4 (Rosenthal et al., 1993): Thirty-two men (20 to 35 years old) were divided in 4 groups, each of which was assigned a specified sleep period that ended at 0730 (0, 4, 6, or 8 hours). Sleep latency was then measured using the MSLT at 1000, 1200, 1400, and 1600, yielding a total of 16 data points.

Study V5 (Akerstedt and Gillberg, 1981): Six subjects (29 to 45 years old) participated in a cross-over study with 7 conditions. In each condition, subjects slept from 2300 to 0700 on day 1. Then, depending on the condition, the subjects stayed awake for 16, 20, 24, 28, 32, 36, or 40 hours. Sleep latency was measured based on electroencephalograms and electro-oculograms at the end of the wakefulness period, yielding 7 data points.

Study V6 (Akerstedt and Gillberg, 1986): Eight men (20 to 47 years old) participated in a cross-over study with 4 conditions. In each condition, subjects slept from 2300 to 0700 on day 1. Subsequently, the subjects were allowed to sleep for a specified period that ended at 0700 on day 2 (0, 2, 4 or 8 hours, depending on the condition). Sleep latency was measured based on electroencephalograms and electro-oculograms at 1100 on day 2, yielding a total of 4 data points.

Figure 3A:
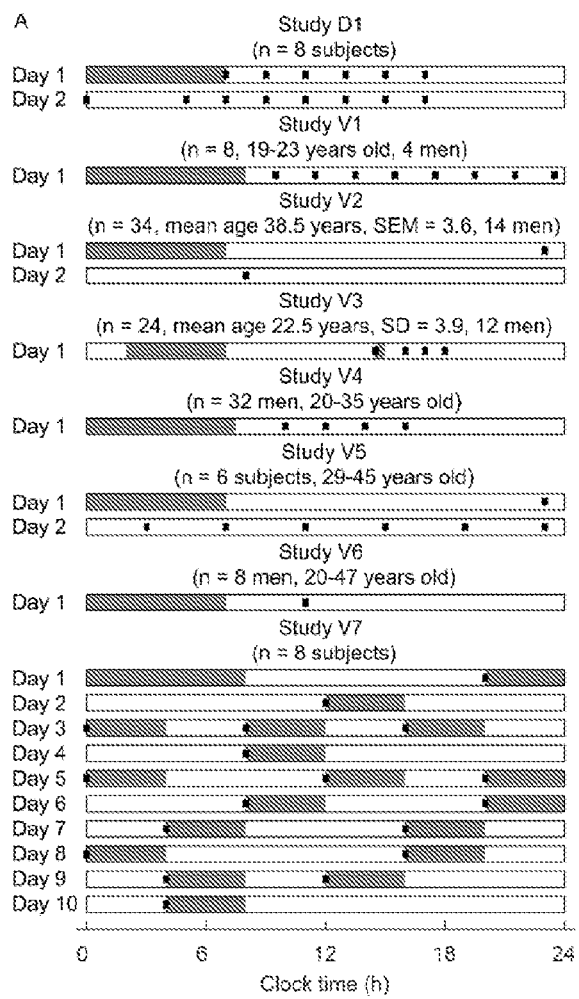
FIG. 3A shows sleep studies used to develop and validate a model to predict sleep latency.

Study V7 (Akerstedt and Folkard, 1996b): Eight subjects participated in a study involving an irregular sleep schedule (FIG. 3A). The study involved eighteen 4-hour sleep periods, each of which started either at 0000, 0400, 0800, 1200, 1600, or 2000 (3 periods for each starting time). Sleep latency was measured based on electroencephalograms at the beginning of each sleep period, yielding 18 data points.

The sleep-latency model was validated by comparing its predictions with the experimental values for the 75 different time points of Studies V1 to V7 (FIG. 3A). Table 7 shows the RMSEs between the sleep-latency predictions and the corresponding experimental values for each study. The average RMSE for the validation studies was 3.3 minutes, with 4 studies (V1, V4, V5, and V6) showing RMSEs of less than 3.0 minutes and Study V7 showing the largest RMSE (5.0 minutes). For comparison, the half width of the 95% confidence interval [i.e., 1.96×standard error of the mean (SEM)] of the experimental mean sleep latency was 3.1 minutes (based on the SEMs for Studies V2 and V4, which were the only values available). This indicates that, on average, the predictions for Studies V1, V4, V5, and V6 were not statistically different from the experimental values.

TABLE 7

| Study | RMSE | # Data points |
|---|---|---|
| Sleep latency | (min) | |
| D1 | 1.3 | 14 |
| V1 | 2.3 | 8 |
| V2 | 4.0 | 2 |
| V3 | 3.4 | 20 |
| V4 | 1.3 | 16 |
| V5 | 1.5 | 7 |
| V6 | 2.6 | 4 |
| V7 | 5.0 | 18 |
| Average (V1-V7) | 3.3 | 75 |
| Sleep duration | (h) | |
| D2 | 0.6 | 6 |
| V5 | 1.7 | 7 |
| V6 | 0.7 | 4 |
| V8 | 0.9 | 7 |
| Average (V5, V6, V8) | 1.3 | 18 |

Figure 3B:
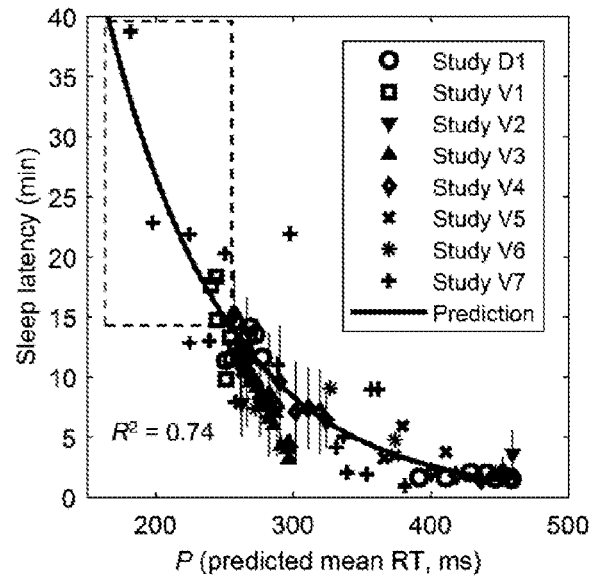
FIG. 3B shows sleep latency as function of predicted alertness impairment P across the data from the sleep studies.

FIG. 3B shows the experimental mean latency for Study D1 (black circles) plotted against the alertness impairment P (i.e., the mean RT) predicted by the alertness impairment model discussed above, as well as the fitted results of the sleep-latency model to Study D1 data (black line). The figure also shows the experimental sleep latencies for the validation studies (V1 to V7). For 52 of the 75 time points in the validation set (70%), the error between the predicted and experimental values (i.e., the prediction error) was less than 3 min, and was larger than 10 minutes for only one time point in Study V7. It should be noted that the model predictions remained accurate for the 7 data points outside the range of the data used to fit the model (3 from Study V1 and 4 from Study V7, shown within the rectangle depicted by dashed lines, with a RMSE=3.6 min). Overall, the sleep-latency model accounted for approximately 74% of the variance in the experimental values ($R^2$=0.74).

d. Sleep Duration Model Validation

Sleep-duration data was obtained for 4 previously published sleep studies having 24 distinct time points from 33 subjects. Data from one study (Study D2) was used to estimate parameters of a sleep-duration model, and data from the remaining 3 studies (Studies V5, V6, and V8) were used to validate the model predictions. FIG. 4D shows the sleep schedules and starting times of the periods for which sleep duration was reported in each study (for clarity, the diagrams for Studies V5 and V6 show only the starting time of the sleep periods instead of the entire periods). The following paragraphs provide brief descriptions of each study.

Study D2 (Dijk et al., 1999): Eleven men (21 to 30 years old) participated in a forced desynchrony study. After 3 baseline nights of sleep at their habitual time, subjects remained awake for 40 hours, and then completed 21 to 25 cycles of forced desynchrony. Each cycle consisted of a 9 hour, 20 minute sleep period and an 18 hour, 40 minute wakefulness period. The sleep periods started at 2300, 0300, 0700, 1100, 1500, or 1900, with each period occurring at the same time of day every 6 cycles. During sleep periods, subjects remained in bed in darkness and slept in one or more bouts. The authors of the study originally reported the sleep efficiency, which they averaged over the sleep periods starting at the same time of day. To compute the sleep duration, we multiplied the sleep efficiency by the duration of the sleep periods. This study yielded 6 data points.

Studies V5 and V6 were the same as those used to obtain sleep-latency measurements. Sleep duration was measured for the same sleep periods during which sleep latency was measured, yielding 7 and 4 data points for studies V5 and V6, respectively.

Study V8 (Akerstedt et al., 1993): Eight women (18 to 34 years old) participated in a study with an irregular sleep schedule (FIG. 4D). The study involved twelve 6-hour sleep periods that started either at 0300, 0900, 1500, or 2100 (3 periods for each starting time). Whenever the time between 6-hour sleep periods was 12 or 18 hours, 1 or 2 1-hour sleep periods, respectively, were scheduled between the periods. The total sleep time as the sleep duration for the seven 6-hour sleep periods reported in the original study was used (FIG. 4D).

Figure 4C:
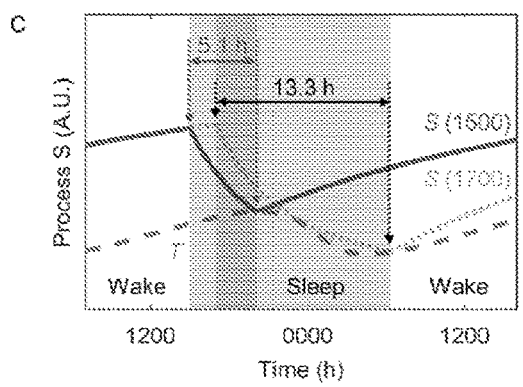
Figure 4E:
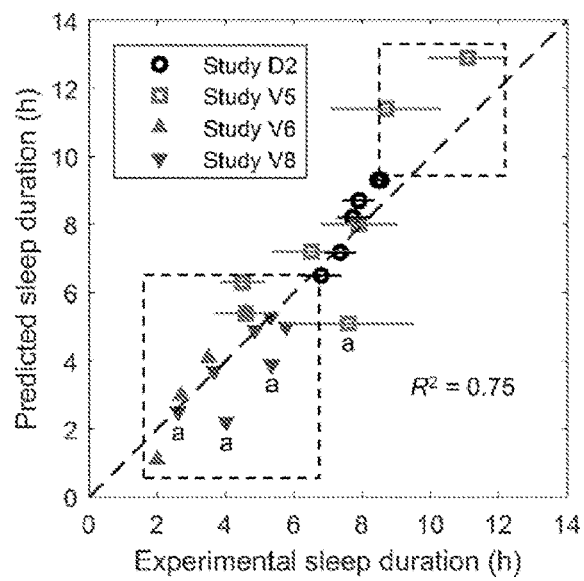
FIG. 4E shows experimental and predicted sleep durations for different sleep studies.

The sleep-duration model was validated by comparing its predictions with the experimental mean sleep durations for the 18 different time points of Studies V5, V6, and V8. Table 7 shows the RMSEs between the predicted and experimental sleep durations for each study. The predictions for Studies V6 and V8 showed RMSEs of less than 1.0 hour, whereas those for Study V5 showed the largest RMSE (1.7 hours). FIG. 4E shows the predictions of the sleep-duration model plotted against the experimental mean sleep durations for the model development (Study D2) and validation studies (Studies V5, V6, and V8). Most points fell around the diagonal (x=y), with a high concordance correlation coefficient of 0.9, where the model accounted for approximately 75% of the variance in the experimental values ($R^2$=0.75), indicating that it accurately predicted sleep duration. It should be noted that most of the time points in the validation studies fell outside the range of the data used to fit the model (shown within the rectangles depicted by dashed lines).

The predictions for Study V5 showed the largest deviations from the experimental values, where the model tended to over-predict sleep duration despite capturing the general trend of the experimental values. The model also under-predicted sleep duration when sleep started around 1500 in 3 of 4 periods (points labeled "a"). To explain this result, in FIG. 4C the model simulations are shown for the case when sleep started at 1500 in Study V5. In this scenario, at sleep onset, threshold T (dashed line) was on the upswing and process S (line) reached T just before the end of the upswing, resulting in sleep cessation 5.1 hours after sleep onset. Had sleep onset occurred 2 hours later (dotted line), however, process S would have missed this upswing in T, delaying sleep cessation until the following upswing, 13.3 hours after sleep onset. These simulations suggest that for sleep periods starting at around 1500, small perturbations of sleep-onset time may result in either short (~5 hours) or long bouts of sleep (>10 hours), with the resulting experimental sleep duration reflecting the average of a bimodal distribution. This was previously noted by Borbely (1982) and Akerstedt and Folkard (1996), who found that the sleep duration for a period starting at 1500 showed the largest mismatch between the simulated and experimental values. In fact, in the study in which the data were obtained, half of the subjects slept 3 hours while the other half slept 11 hours for that particular period.

The sleep-latency and sleep-duration models were validated against experimental data from a set of studies that were more comprehensive than the data used to validate previous models. The validation data sets included time points that probed different sleep conditions, such as prior wake time (1 to 40 hours), sleep restriction (2 to 6 hours of sleep), and naps (5 to 60 minutes), and which spanned the entire circadian cycle, amounting to a combined total of 93 distinct time points from 128 subjects. The models developed and comprehensively validated here, with their capability to predict an objective measure of alertness under various sleep conditions, offer a comprehensive approach to assess the effects of sleep history and time of day on sleep latency and duration.

Validation of the sleep-latency model showed that the average RMSE between the predicted and experimental values was 3.3 minutes. This is an acceptable error level for planning sleep schedules, because it is short relative to the long sleep latencies we would prefer to avoid (i.e., ~30 minutes).

Although the methods discussed in this disclosure are done without reference to particular flowcharts, it should be understood that the order of the steps shown to be varied from the order illustrated in other embodiments, that steps discussed as being separate can be combined (e.g., various displays and request for data can be combined into a single output screen), and that not all steps illustrated are necessarily required in all embodiments. Additionally, in at least one embodiment where the implementation uses a processor, the processor executes code for the steps as such is an example of means for performing the discussed function.

While a specific embodiment of the invention will be shown and described in detail to illustrate the application of the principles of the invention, it will be understood that the invention may be embodied otherwise without departing from such principles.

In the claims that follow this specification, it should be understood that the invention includes placing the claims into nested (or multiple levels) of multiple dependency form where no conflict exists between dependent claims.

What is claimed is:

1. A method for optimizing caffeine consumption for a future sleep-wake schedule for an individual to minimize an alertness impairment of the individual at a future time with a processor, the method comprising:
   creating a solution for the sleep-wake schedule having a plurality of caffeine doses;
   dividing the sleep-wake schedule into epochs;
   determining a score representing the alertness impairment for each epoch using a solution model;
   selecting the epoch having the largest score;
   when a sum of any cognitive performance term in the solution model is larger than a penalty term in the solution model, evaluating a plurality of test points to reduce the alertness impairment for at least one epoch by producing a series of scores for that epoch, otherwise evaluating a plurality of test points to reduce a total caffeine consumption level over the sleep-wake schedule by producing a series of scores for at least one epoch where each test point produces one score for at least one epoch;
   selecting the test point with the smallest score for the at least one epoch for the sleep-wake schedule solution;
   repeating the above steps with the sleep-wake schedule solution when neither a predetermined number of iterations has been reached nor no more mathematical feasible sleep-wake schedule solutions are left;
   providing the sleep-wake schedule solution to the individual; and
   consuming caffeine by the individual pursuant to the sleep-wake schedule solution.

2. The method according to claim 1, further comprising removing the test point for the selected epoch with the smallest score from subsequent iterations for the selected epoch.

3. The method according to claim 1, further comprising removing the test point for the selected epoch with the smallest score from subsequent iterations for any epoch.

4. The method according to claim 1, wherein the solution model includes the following equation:

$$\min_{t_i, D_i} Z = 50 \frac{AUC_C(t_i, D_i)}{AUC_{NC}} + 50 \frac{WP_C(t_i, D_i)}{WP_{NC}} + 250 \max\{C(t_i, D_i) - C_{max}, o\}$$

where $t_i$ represents a time into the solution for those $D_i$, i represents a number of the caffeine dose, $C(t_i, D_i)$ denotes a level of caffeine in the blood, subscripts C and NC denote caffeine and no caffeine, respectively, $C_{max}$ denotes a maximum caffeine level achieved by a single does, AUC is an area under an alertness impairment model-predicted psychomotor vigilance task (PVT) mean response time (RT) curve produced by an alertness impairment model above a baseline, and WP is a difference between a peak of the mean RT curve produced by the alertness impairment model and a baseline.

5. The method according to claim 1, wherein one cognitive performance term of the solution model is based on an area under a PVT mean response time curve above a baseline, where the response time curve is produced from a unified model of performance.

6. The method according to claim 5, wherein a second cognitive performance term of the solution model is based on a worst performance as determined based on a difference between the baseline and a peak of the mean response time curve as produced from the unified model of performance.

7. The method according to claim 1, wherein the penalty term includes a constraint on the solution model for a caffeine dosage level, a caffeine dosage frequency, and/or the total caffeine consumption within a predetermined consumption period.

8. The method according to claim 1, wherein the plurality of test points to reduce alertness impairment includes adding a new dose to a center of the epoch, adding a new dose at a beginning of the epoch, adding a new dose one hour before the epoch, adding a new dose one hour after the epoch, moving the dose to a beginning of the worst epoch from before the best epoch, adding a new dose to a center of the worst epoch from before the best epoch, and/or remove the dose before the best epoch.

9. The method according to claim 1, wherein the plurality of test points to reduce caffeine level includes removing a portion of the dose at the beginning of the epoch, reducing the dose before the worst epoch and adding the amount of the dose reduction to the dose before the epoch with a lowest caffeine consumption, moving the dose from epoch before the worst epoch one hour earlier, and moving the dose before the selected epoch one hour later.

10. The method according to claim 1, wherein the plurality of test points to reduce caffeine level and the plurality of test points to reduce alertness impairment each number at least four.

11. The method according to claim 1, wherein a plurality of caffeine doses is distributed during the wake time for the individual.

12. The method according to claim 1, wherein the epochs are between caffeine doses and/or sleep periods.

13. The method according to claim 1, wherein if the test point falls within a sleep period, the test point is relocated after the sleep period is complete.

14. The method according to claim 1, further comprising assessing whether the initial sleep-wake schedule solution satisfies user requirements before optimizing the initial sleep-wake schedule solution and when the initial sleep-wake schedule solution satisfies, ending the optimization.

15. The method according to claim 1, further comprising:
   generating reminders to the individual to consume caffeine and/or sleep;
   having the individual consume caffeine and/or sleep pursuant to the schedule and/or reminder; and
   receiving confirmation from the individual or said at least one motion detection sensor of consumption and/or sleep by the individual, when the consumption and/or sleep differs the sleep-wake solution in excess of a predetermined solution, creating a new solution.

16. A method for optimizing caffeine consumption for a future sleep-wake schedule for an individual to minimize an alertness impairment of the individual at a future time with a processor, the method comprising:

receiving a solution for the sleep-wake schedule having a plurality of caffeine doses from the individual, another individual, or storage;

dividing the sleep-wake schedule into epochs between caffeine doses and/or sleep periods;

determining a score representing the alertness impairment for each epoch using a solution model;

selecting the epoch having the largest score;

when a sum of any cognitive performance term in the solution model is larger than a penalty term in the solution model, evaluating a plurality of test points to reduce the alertness impairment for at least one epoch by producing a series of scores for that epoch, otherwise evaluating a plurality of test points to reduce a total caffeine consumption level over the sleep-wake schedule by producing a series of scores for at least one epoch where each test point produces one score for at least one epoch;

selecting the test point with the smallest score for the at least one epoch for the sleep-wake schedule solution;

repeating the above steps for the sleep-wake schedule solution when neither a predetermined number of iterations has been reached nor no more mathematical feasible sleep-wake schedule solutions are left;

providing the sleep-wake schedule solution to the individual; and consuming caffeine by the individual pursuant to the sleep-wake schedule solution, and wherein if the test point falls within a sleep period, the test point is relocated until after the sleep period is complete, and the at least one epoch is at least one peak alert epoch or all epochs in the sleep-wake schedule.

17. A system comprising:

a user interface having a display and a receiving means for receiving input from a user;

at least one motion detection sensor capable of detecting movement by an individual wearing said at least one motion detection sensor, at least one memory configured to store a sleep-wake history, an alertness impairment model, and data associated with the individual; and a processor in electrical communication with said user interface, said at least one motion detection sensor, and said memory; said processor configured to create a solution for the sleep-wake schedule having a plurality of caffeine doses;

divide the sleep-wake schedule into epochs;

determine a score representing an alertness impairment for each epoch using a solution model;

select the epoch having the largest score;

when a sum of any cognitive performance term in the solution model is larger than a penalty term in the solution model, evaluate a plurality of test points to reduce an alertness impairment for at least one epoch by producing a series of scores for that epoch, otherwise evaluate a plurality of test points to reduce a total caffeine consumption level over the sleep-wake schedule by producing a series of scores for at least one epoch where each test point produces one score for at least one epoch;

select the test point with the smallest score for the at least one epoch for the sleep-wake schedule solution; and repeat the above steps with the sleep-wake schedule solution when neither a predetermined number of iterations has been reached nor no more mathematical feasible sleep-wake schedule solutions are left;

providing the sleep-wake schedule solution to the individual;

generating reminders to the individual to consume caffeine and/or sleep;

having the individual consume caffeine and/or sleep pursuant to the schedule and/or reminder; and receiving confirmation from the individual or said at least one motion detection sensor of consumption and/or sleep by the individual, when the consumption and/or sleep differs the sleep-wake schedule solution in excess of a predetermined solution, creating a new solution.

18. The system according to claim 17, further comprising upon request, a predetermined schedule, when activity is detected or a combination of these, performing a response time test with said processor and said user interface; and wherein said processor is configured to perform the response time test by outputting a visual cue on said display, receiving a user response to the visual cue through said receiving means, calculating a response time, and repeating said outputting, receiving and calculating a plurality of times to determine a tested alertness impairment level;

determine an offset between the model-determined alertness impairment level and the tested alertness impairment level;

adjust at least one parameter weight in the alertness impairment model based on the determined offset.

19. The system according to claim 17, further comprising a server; and wherein said processor configured to transmit the alertness impairment model weights to a server;

said server capable of electrical communication with said processor, said server configured to receive alertness impairment model weights from said processor, store received alertness impairment model weights in a database associated with the user of said computing device that sent the alertness impairment model weights, analyze user data including user activity history, alertness impairment levels, caffeine consumption and weights to develop a new set of weights for future individuals matching a profile of current individuals, and provide a planning interface to model different timing and amounts of sleep and caffeine consumption to provide a forecast for future alertness impairment levels or a regression for past alertness impairment levels for the user associated with the alertness impairment model weights.

20. The system according to claim 17, wherein the solution model includes the following equation:

$$\min_{t_i,D_i} Z = 50 \frac{AUC_C(t_i, D_i)}{AUC_{NC}} + 50 \frac{WP_C(t_i, D_i)}{WP_{NC}} + 250\max\{C(t_i, D_i) - C_{max}, 0\}$$

where $t_i$ and $D_i$ represent a time into the solution, i represents a number of the caffeine dose, $C(t_i, D_i)$ denotes a level of caffeine in the blood, subscripts C and NC denote caffeine and no caffeine, respectively, $C_{max}$ denotes a maximum caffeine level achieved by a single does, AUC is an area under an alertness impairment model-predicted psychomotor vigilance task (PVT) mean response time (RT) curve produced by the alertness impairment model above a baseline, and WP is a difference between a peak of the mean RT curve produced by the alertness impairment model and the baseline.

* * * * *